US012380852B2

(12) United States Patent
Lee et al.

(10) Patent No.: US 12,380,852 B2
(45) Date of Patent: Aug. 5, 2025

(54) DISPLAY DEVICE AND METHOD FOR DRIVING THE SAME

(71) Applicant: Samsung Display Co., LTD., Yongin-si (KR)

(72) Inventors: Won Jun Lee, Yongin-si (KR); Yeon Kyung Kim, Yongin-si (KR); Kwi Hyun Kim, Yongin-si (KR); Dong Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/590,704

(22) Filed: Feb. 28, 2024

(65) Prior Publication Data

US 2024/0304146 A1 Sep. 12, 2024

(30) Foreign Application Priority Data

Mar. 9, 2023 (KR) ........................ 10-2023-0030926

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2320/0233* (2013.01)

(58) Field of Classification Search
CPC ... G09G 2300/0819; G09G 2320/0233; G09G 2300/0426; G09G 2300/043; G09G 2300/0809; G09G 2310/08; G09G 3/30–3291; G09G 2300/0842–0871; H10K 59/1213
See application file for complete search history.

(56) References Cited

U.S. PATENT DOCUMENTS

| | | | | |
|---|---|---|---|---|
| 10,229,635 | B2 * | 3/2019 | Kim | G09G 3/3233 |
| 10,311,767 | B2 * | 6/2019 | Choi | G09G 3/3233 |
| 11,309,373 | B2 * | 4/2022 | Kim | H10K 59/123 |
| 2002/0196212 | A1 * | 12/2002 | Nishitoba | G09G 3/3241 345/76 |
| 2004/0246202 | A1 * | 12/2004 | Yamashita | H05B 45/60 345/30 |

(Continued)

FOREIGN PATENT DOCUMENTS

| | | | |
|---|---|---|---|
| CN | 108389551 | A | 8/2018 |
| CN | 113643662 | A | 11/2021 |

(Continued)

*Primary Examiner* — Amy Onyekaba
(74) *Attorney, Agent, or Firm* — Womble Bond Dickinson (US) LLP

(57) ABSTRACT

The present disclosure relates to a display device, and more particularly, to a display device capable of improving image quality and a method for driving the same. The display device includes a data line; a driving transistor connected to the data line through a first node; a pixel electrode connected to the driving transistor; and an initialization transistor connected between the data line and the pixel electrode, wherein one of a source electrode or a drain electrode of the initialization transistor is directly connected to the data line, and an other one of the source electrode or the drain electrode of the initialization transistor is directly connected to the pixel electrode.

23 Claims, 35 Drawing Sheets

(56) References Cited

U.S. PATENT DOCUMENTS

| | | | | |
|---|---|---|---|---|
| 2005/0206591 | A1* | 9/2005 | Wang | G09G 3/3233 345/76 |
| 2010/0164847 | A1* | 7/2010 | Lee | G09G 3/3233 345/77 |
| 2016/0104419 | A1* | 4/2016 | Chung | G09G 3/3225 345/78 |
| 2016/0379560 | A1* | 12/2016 | Cho | G09G 3/3233 345/76 |
| 2017/0199616 | A1* | 7/2017 | Kim | G06F 3/0412 |
| 2018/0174518 | A1* | 6/2018 | Suk | G09G 3/3291 |
| 2019/0096323 | A1* | 3/2019 | Lee | G09G 3/3233 |
| 2021/0248961 | A1* | 8/2021 | Yang | G09G 3/3266 |
| 2021/0351260 | A1* | 11/2021 | Kim | H10K 59/131 |
| 2021/0407388 | A1* | 12/2021 | Tian | G09G 3/3233 |
| 2023/0063106 | A1* | 3/2023 | Kim | H10K 59/1216 |
| 2023/0410755 | A1* | 12/2023 | An | G09G 3/3233 |
| 2024/0021156 | A1* | 1/2024 | Lee | G09G 3/3233 |

FOREIGN PATENT DOCUMENTS

| | | | |
|---|---|---|---|
| CN | 114023262 | A | 2/2022 |
| JP | 5342111 | B2 | 11/2013 |
| KR | 10-2019-0020224 | A | 2/2019 |

* cited by examiner

DISPLAY DEVICE AND METHOD FOR DRIVING THE SAME

CROSS-REFERENCE TO RELATED APPLICATION

This application claims priority to and the benefit of Korean Patent Application No. 10-2023-0030926 filed on Mar. 9, 2023, in the Korean Intellectual Property Office, the entire content of which is incorporated by reference herein.

BACKGROUND

1. Field

The present disclosure relates to a display device, and more particularly, to a display device capable of improving image quality and a method for driving the same.

2. Description of the Related Art

An organic light emitting display device includes a display element of which luminance is changed by current, for example, an organic light emitting diode.

SUMMARY

Aspects of the present disclosure provide a display device capable of improving image quality and a method for driving the same.

The aspects and features of the present disclosure are not limited to those mentioned above and additional aspects and features of the present disclosure, which are not mentioned herein, will be clearly understood by those skilled in the art from the following description of the present disclosure.

According to one or more embodiments of the present disclosure, a display device including: a data line; a driving transistor connected to the data line through a first node; a pixel electrode connected to the driving transistor; and an initialization transistor connected between the data line and the pixel electrode, wherein one of a source electrode or a drain electrode of the initialization transistor is directly connected to the data line, and an other one of the source electrode or the drain electrode of the initialization transistor is directly connected to the pixel electrode.

In one or more embodiments, further including a gate line connected to a gate electrode of the initialization transistor.

In one or more embodiments, the data line is configured to transmit an initialization voltage in an initialization period, and is configured to transmit a data voltage in a data writing period.

In one or more embodiments, the initialization transistor is turned on during the initialization period.

In one or more embodiments, the data line is configured to transmit the initialization voltage in a threshold voltage detection period, and wherein the initialization transistor is turned on during the threshold voltage detection period.

In one or more embodiments, the threshold voltage detection period is located between the initialization period and the data writing period.

In one or more embodiments, in a period other than the initialization period and the threshold voltage detection period, the initialization transistor is turned off.

In one or more embodiments, a gate signal applied to the gate electrode of the initialization transistor has an active level in the initialization period and the threshold voltage detection period, and has a non-active level in a period other than the initialization period and the threshold voltage detection period.

In one or more embodiments, the display device further including: a first capacitor connected between the first node and a driving voltage line; a switching transistor connected between the data line and the first node; and a second capacitor connected between the switching transistor and the first node.

In one or more embodiments, the display device further including: a compensation transistor connected between the first node and a second node connected to the driving transistor; and an emission control transistor connected between the second node and the pixel electrode.

In one or more embodiments, a gate electrode of the driving transistor is connected to the first node, one of a source electrode or a drain electrode of the driving transistor is connected to the driving voltage line, and an other one of the source electrode or the drain electrode of the driving transistor is connected to the second node.

In one or more embodiments, the display device further including: a first gate line connected to a gate electrode of the switching transistor; a second gate line connected to a gate electrode of the compensation transistor; a third gate line connected to the gate electrode of the initialization transistor; and an emission control line connected to a gate electrode of the emission control transistor.

In one or more embodiments, in the initialization period, each of a first gate signal of the first gate line, a second gate signal of the second gate line, a third gate signal of the third gate line, and an emission control signal of the emission control line has an active level, in a threshold voltage detection period after the initialization period, each of the first gate signal, the second gate signal, and the third gate signal has the active level, in a data writing period after the threshold voltage detection period, the first gate signal has the active level, in an emission period after the data writing period, the emission control signal has the active level, in the initialization period and the threshold voltage detection period, an initialization voltage is applied to the data line, and in the data writing period, a data voltage is applied to the data line.

In one or more embodiments, in the threshold voltage detection period, the emission control signal has a non-active level, in the data writing period, each of the second gate signal, the third gate signal, and the emission control signal has the non-active level, and in the emission period, each of the first gate signal, the second gate signal, and the third gate signal has the non-active level.

In one or more embodiments, the initialization period, the threshold voltage detection period, and the data writing period are included in one horizontal period.

In one or more embodiments, the second gate signal and the third gate signal are substantially similar to each other.

In one or more embodiments, the second gate line and the third gate line are connected to each other.

In one or more embodiments, at least one of the second gate signal or the third gate signal has at least two discontinuous active levels in the initialization period.

In one or more embodiments, the initialization period includes at least two sub-periods, and at least one of the second gate signal or the third gate signal has the active level and a non-active level in adjacent sub-periods, respectively.

In one or more embodiments, at least one of the driving transistor, the initialization transistor, the switching transistor, the compensation transistor, or the emission control transistor is a P-type metal-oxide-semiconductor field effect transistor.

In one or more embodiments, the driving transistor is a dual gate transistor.

According to one or more embodiments of the present disclosure, a method for driving a display device including: a driving transistor having a gate electrode connected to a first node, a source electrode connected to a driving voltage line, and a drain electrode connected to a second node; a switching transistor having a gate electrode connected to a first gate line, a source electrode connected to a data line, and a drain electrode connected to the first node; a compensation transistor including a gate electrode connected to a second gate line, a source electrode connected to the first node, and a drain electrode connected to the second node; an initialization transistor having a gate electrode connected to a third gate line, a drain electrode connected to the data line, and a source electrode connected to a pixel electrode; an emission control transistor having a gate electrode connected to an emission control line, a source electrode connected to the second node, and a drain electrode connected to the pixel electrode; a first capacitor connected between the first node and a source electrode of the driving transistor; and a second capacitor connected between the drain electrode of the switching transistor and the first node, the method including: in an initialization period, applying an initialization voltage to the data line, applying a first gate signal of an active level to the first gate line, applying a second gate signal of the active level to the second gate line, applying a third gate signal of the active level to the third gate line, and applying an emission control signal of the active level to the emission control line.

In one or more embodiments, the method further including: in a threshold voltage detection period after the initialization period, applying the initialization voltage to the data line, applying the first gate signal of the active level to the first gate line, applying the second gate signal of the active level to the second gate line, and applying the third gate signal of the active level to the third gate line; in a data writing period after the threshold voltage detection period, applying a data voltage to the data line, and applying the first gate signal of the active level to the first gate line; and in an emission period after the data writing period, applying the initialization voltage to the data line, and applying the emission control signal of the active level to the emission control line.

In the display device according to the present disclosure, a threshold voltage of a driving transistor included in each pixel is compensated so that a luminance deviation between pixels may be minimized, thereby improving image quality.

In addition, since a data voltage is divided by capacitors, the range (e.g., grayscale expression range) of the data voltage may be extended even though the transistors are composed of MOSFETs.

The effects, aspects, and features according to the embodiments of the present disclosure are not limited to those mentioned above and more various effects, aspects, and features are included in the following description of the present disclosure.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
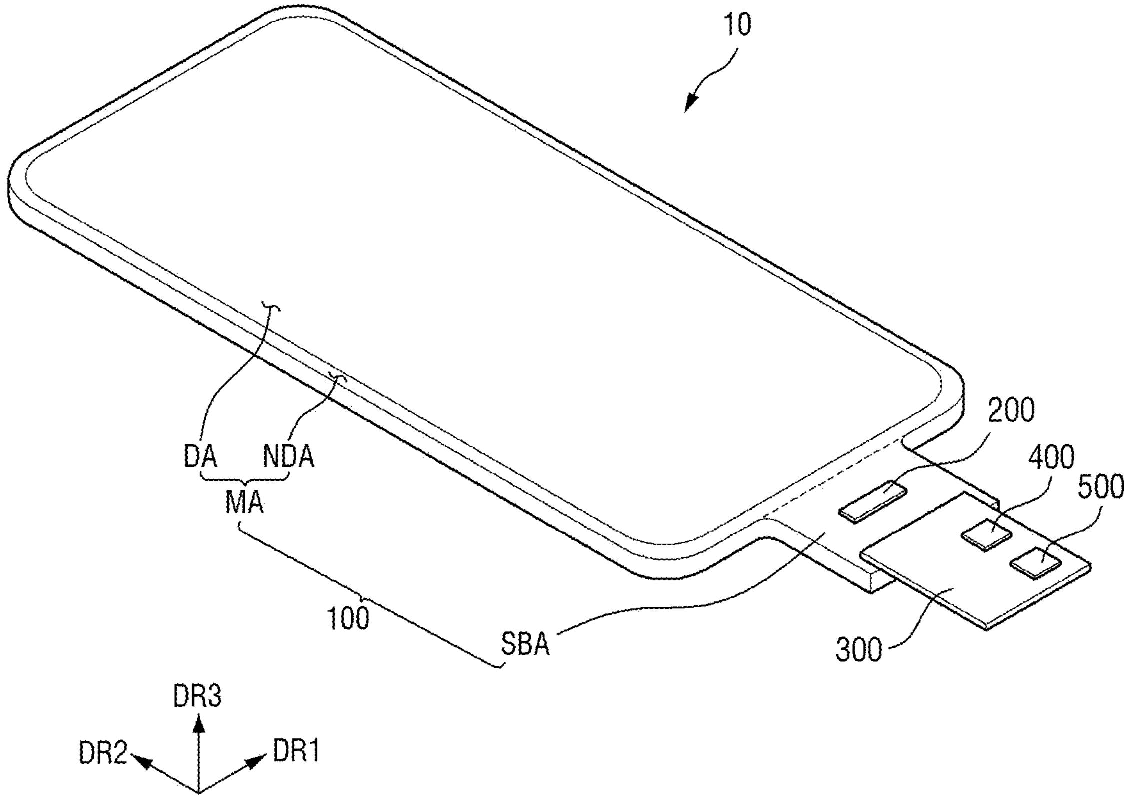
FIG. 1 is a perspective view showing a display device according to one or more embodiments.

The present disclosure will now be described more fully hereinafter with reference to the accompanying drawings, in which embodiments of the present disclosure are shown. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

It will also be understood that when a layer is referred to as being "on" another layer or substrate, it can be directly on the other layer or substrate, or intervening layers may also be present. The same reference numbers indicate the same components throughout the specification.

Each of the features of the various embodiments of the present disclosure may be combined or combined with each other, in part or in whole, and technically various interlocking and driving are possible. Each embodiment may be implemented independently of each other or may be implemented together in an association.

In the drawings, thicknesses of layers and areas are illustrated as being exaggerated for clarity. It is to be understood that the same reference numerals may indicate like elements throughout the specification.

It will be understood that, although the terms "first," "second," "third," etc. may be used herein to describe various elements, these elements should not be limited by these terms. These terms are used to distinguish one element from another element. For example, "a first element," could be termed "a second element" or "a third element" without departing from the teachings and scope herein. Similarly, "the second element" or "the third element" may be alternately termed.

It will be understood that when an element is referred to as being "connected" or "coupled" to another element, it can be directly connected or coupled to the element or intervening elements may be present. In contrast, when an element is referred to as being "directly connected" or "directly coupled" to another element, there are no intervening elements present.

The terms used herein are for the purpose of describing particular embodiments only and are not intended to limit the present disclosure. As used herein, the singular expression includes the plural expression unless it clearly indicates otherwise in the context. It will be understood that the terms "includes" or "have", when used in this specification, specify the presence of stated feature, number, step, operation, element, component, or their combination but do not preclude the presence or addition of one or more other features, numbers, steps, operations, elements, components or their combinations.

Unless otherwise defined, all terms (including technical and scientific terms) used herein have the same meaning as commonly understood by those having ordinary skill in the art to which the present disclosure belongs. It will be understood that terms, such as those defined in commonly used dictionaries, will not be interpreted in an idealized or overly formal sense unless expressly so defined herein.

The terms used herein are for the purpose of describing embodiments only and are not intended to limit the present disclosure. As used herein, the singular forms are intended to include the plural forms unless it clearly indicates otherwise in the context. The terms "and/or" indicates each of elements that are listed or their various combinations.

The terms such as "units," " . . . ors(ers)," "blocks," and "modules", which are used throughout the present disclosure, may refer to a unit for processing at least one function or operation. For example, the terms may refer to hardware components such as software, FPGA or ASIC, but are not limited to software or hardware. The terms such as "units," " . . . ors(ers)," "blocks," and "modules" may be configured to be in an addressable storage medium, or may be configured to reproduce one or more processors.

Therefore, as an example, "units," " . . . ors(ers)," "blocks," and "modules" include components such as software components, object-oriented software components, class components, and task components, processes, functions, attributes, procedures, subroutines, segments of program code, drivers, firmware, microcode, circuitry, data, databases, data structures, tables, arrays, and parameters. The functions provided in the components and "units," " . . . ors(ers)," "blocks," and "modules" may be combined into a smaller number of components, "units," " . . . ors(ers)," "blocks," and "modules" or divided into additional components and "units," " . . . ors(ers)," "blocks," and "modules".

Hereinafter, embodiments will be described in detail with reference to the accompanying drawings.

FIG. 1 is a perspective view showing a display device according to one or more embodiments.

Referring to FIG. 1, a display device 10 may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. For example, the display device 10 may be applied as a display unit of a television, a laptop, a monitor, a billboard, or an Internet-of-Things (IoT) device. For another example, the display device 10 may be applied to wearable devices such as a smart watch, a watch phone, a glasses type display, or a head mounted display (HMD).

The display device 10 may have a planar shape similar to a quadrilateral shape. For example, the display device 10 may have a planar shape similar to a quadrilateral shape having a short side in the first direction DR1 and a long side in the second direction DR2. A corner where the short side in the first direction DR1 and the long side in the second direction DR2 meet may be right-angled or rounded with a suitable curvature (e.g., a predetermined curvature). The planar shape of the display device 10 is not limited to a quadrilateral shape, and may be formed in a shape similar to another polygonal shape, a circular shape, or elliptical shape.

The display device 10 may include a display panel 100, a display driver 200, a circuit board 300, a touch driver 400, and a power supply unit 500.

The display panel 100 may include a main region MA and a sub-region SBA.

The main region MA may include the display area DA including pixels displaying an image and the non-display area NDA disposed around the display area DA. The display area DA may emit light from a plurality of emission areas or a plurality of opening areas. For example, the display panel 100 may include a pixel circuit including switching elements, a pixel defining layer defining an emission area or an opening area, and a self-light emitting element LEL.

For example, the self-light emitting element LEL may include at least one of an organic light emitting diode (LED) including an organic light emitting layer, a quantum dot LED including a quantum dot light emitting layer, an inorganic LED including an inorganic semiconductor, or a micro LED, but is not limited thereto.

The non-display area NDA may be an area outside the display area DA along an edge or periphery of the display area DA. The non-display area NDA may be defined as an edge area of the main region MA of the display panel 100. The non-display area NDA may include a gate driver that supplies gate signals to the gate lines, and fan-out lines that connect the display driver 200 to the display area DA.

The sub-region SBA may extend from one side of the main region MA. The sub-region SBA may include a flexible material which can be bent, folded, and/or rolled. For example, when the sub-region SBA is bent, the sub-region SBA may overlap the main region MA in a thickness direction (e.g., a third direction DR3). The sub-region SBA may include the display driver 200 and a pad portion connected to the circuit board 300. Optionally, the sub-region SBA may be omitted, and the display driver 200 and the pad portion may be arranged in the non-display area NDA.

The display driver 200 may output signals and voltages for driving the display panel 100. The display driver 200 may supply data voltages to data lines DL. The display driver 200 may supply a power voltage to the power line and may supply a gate control signal to the gate driver. The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-region SBA, and may overlap the main region MA in the thickness direction (third direction DR3) by bending of the sub-region SBA. For another example, the display driver 200 may be mounted on the circuit board 300.

The circuit board 300 may be attached to the pad portion of the display panel 100 by using an anisotropic conductive film (ACF). Lead lines of the circuit board 300 may be electrically connected to a pad portion of the display panel 100. The circuit board 300 may be a flexible printed circuit board, a printed circuit board, or a flexible film such as a chip on film.

A touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and may sense an amount of change in capacitance between the plurality of touch electrodes. For example, the touch driving signal may be a pulse signal having a suitable frequency (e.g., a predetermined frequency). The touch driver 400 may calculate whether an input is made and input coordinates based on an amount of change in capacitance between the plurality of touch electrodes. The touch driver 400 may be formed of an integrated circuit (IC).

The power supply unit 500 may be disposed on the circuit board 300 to supply a power voltage to the display driver 200 and the display panel 100. The power supply unit 500 may generate a driving voltage to supply it to a driving voltage line VDL, and may generate a common voltage to supply it to a common electrode that is common to the light emitting elements LEL of a plurality of pixels. For example, the driving voltage may be a high potential voltage for driving the light emitting element LEL, and the common voltage may be a low potential voltage for driving the light emitting element LEL.

Figure 2:
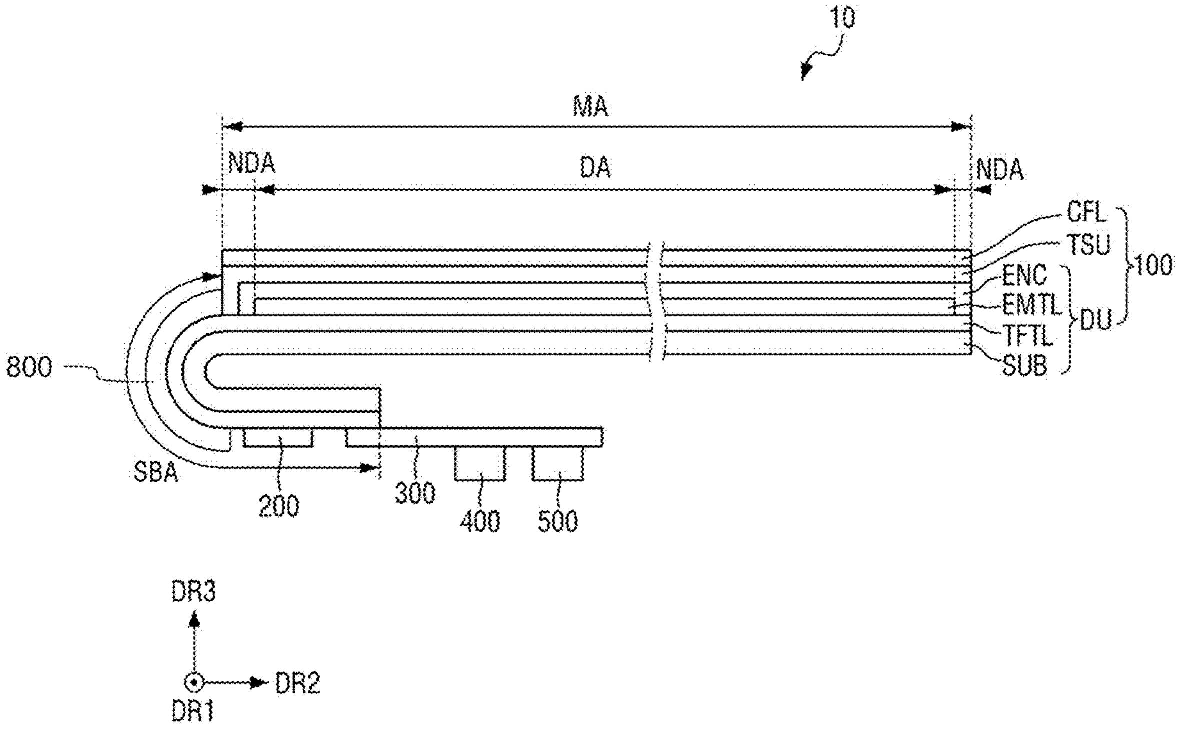
FIG. 2 is a cross-sectional view illustrating a display device according to one or more embodiments.

FIG. 2 is a cross-sectional view illustrating a display device according to one or more embodiments.

Referring to FIG. 2, the display panel 100 may include a display unit DU, a touch sensing unit TSU, and a color filter layer CFL. The display unit DU may include a substrate SUB, a thin film transistor layer TFTL, a light emitting element layer EMTL, and an encapsulation layer ENC.

The substrate SUB may be a base substrate or a base member. The substrate SUB may be a flexible substrate which can be bent, folded, and/or rolled. For example, the substrate SUB may include a polymer resin such as polyimide (PI), but is not limited thereto. For another example, the substrate SUB may include a glass material or a metal material.

The thin film transistor layer TFTL may be disposed on the substrate SUB. The thin film transistor layer TFTL may include a plurality of thin film transistors constituting a pixel circuit of pixels. The thin film transistor layer TFTL may further include the gate lines, the data lines DL, the power lines, gate control lines, the fan-out lines that connect the display driver 200 to the data lines DL, and the lead lines that connect the display driver 200 to the pad portion. Each of the thin film transistors may include a semiconductor region, a source electrode, a drain electrode, and a gate electrode. For example, when the gate driver is formed on one side of the non-display area NDA of the display panel 100, the gate driver may include thin film transistors.

The thin film transistor layer TFTL may be disposed in the display area DA, the non-display area NDA, and the sub-region SBA. Thin film transistors, gate lines, data lines DL, and power lines of each of the pixels of the thin film transistor layer TFTL may be disposed in the display area DA. Gate control lines and fan-out lines of the thin film transistor layer TFTL may be disposed in the non-display area NDA. The lead lines of the thin film transistor layer TFTL may be disposed in the sub-region SBA.

The light emitting element layer EMTL may be disposed on the thin film transistor layer TFTL. The light emitting element layer EMTL may include the plurality of light emitting elements LEL in which a pixel electrode, a light emitting layer, and a common electrode are sequentially stacked to emit light, and the pixel defining layer defining the pixels. The plurality of light emitting elements LEL of the light emitting element layer EMTL may be disposed in the display area DA.

For example, the light emitting layer may be an organic light emitting layer including an organic material. The light emitting layer may include a hole transporting layer, an organic light emitting layer, and an electron transporting layer. When the pixel electrode receives a suitable voltage (e.g., a predetermined voltage) through the thin film transistor of the thin film transistor layer TFTL and the common electrode receives the cathode voltage, holes and electrons may be transferred to the organic light emitting layer through the hole transporting layer and the electron transporting layer, respectively and may be combined with each other to emit light in the organic light emitting layer. For example, the pixel electrode may be an anode electrode, and the common electrode may be a cathode electrode, but the present disclosure is not limited thereto.

For another example, the plurality of light emitting elements LEL may include a quantum dot light emitting diode including a quantum dot light emitting layer, an inorganic light emitting diode including an inorganic semiconductor, or a micro light emitting diode.

The encapsulation layer ENC may cover the top surface and the side surface of the light emitting element layer EMTL, and may protect the light emitting element layer EMTL. The encapsulation layer ENC may include at least one inorganic layer and at least one organic layer for encapsulating the light emitting element layer EMTL.

The touch sensing unit TSU may be disposed on the encapsulation layer ENC. The touch sensing unit TSU may include a plurality of touch electrodes for sensing a user's touch in a capacitive manner, and touch lines connecting the plurality of touch electrodes to the touch driver 400. For example, the touch sensing unit TSU may sense the user's touch by using a mutual capacitance method or a self-capacitance method.

For another example, the touch sensing unit TSU may be disposed on a separate substrate disposed on the display unit DU. In this case, the substrate supporting the touch sensing unit TSU may be a base member that encapsulates the display unit DU.

The plurality of touch electrodes of the touch sensing unit TSU may be disposed in a touch sensor area overlapping the display area DA. The touch lines of the touch sensing unit TSU may be disposed in a touch peripheral area that overlaps the non-display area NDA.

The color filter layer CFL may be disposed on the touch sensing unit TSU. The color filter layer CFL may include a plurality of color filters respectively corresponding to the plurality of emission areas. Each of the color filters may selectively transmit light of a specific wavelength and may block or absorb light of a different wavelength. The color filter layer CFL may absorb a part of light coming from the outside of the display device 10 to reduce reflected light due to external light. Accordingly, the color filter layer CFL may prevent color distortion caused by reflection of the external light.

Because the color filter layer CFL is directly disposed on the touch sensing unit TSU, the display device 10 may not require a separate substrate for the color filter layer CFL. Therefore, the thickness of the display device 10 may be relatively reduced.

The sub-region SBA of the display panel 100 may extend from one side of the main region MA. The sub-region SBA may include a flexible material which can be bent, folded, and/or rolled. For example, when the sub-region SBA is bent, the sub-region SBA may overlap the main region MA in a thickness direction (third direction DR3). The sub-region SBA may include the display driver 200 and the pad portion electrically connected to the circuit board 300.

When the sub-region SBA is bent, as shown in FIG. 2, a protective layer 800 may be further disposed on the bent portion of the sub-region SBA.

Figure 3:
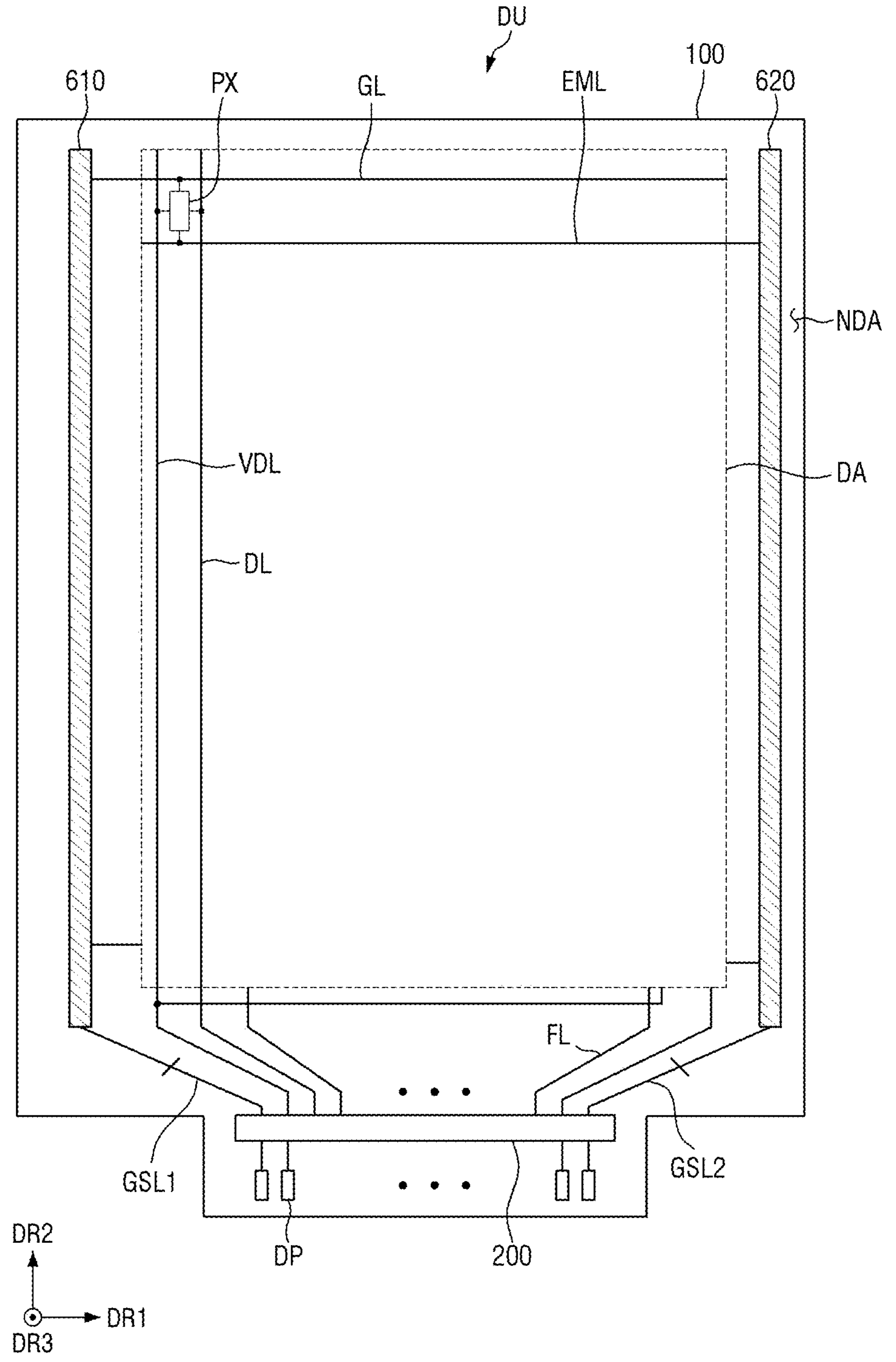
FIG. 3 is a plan view illustrating a display unit of a display device according to one or more embodiments.
Figure 4:
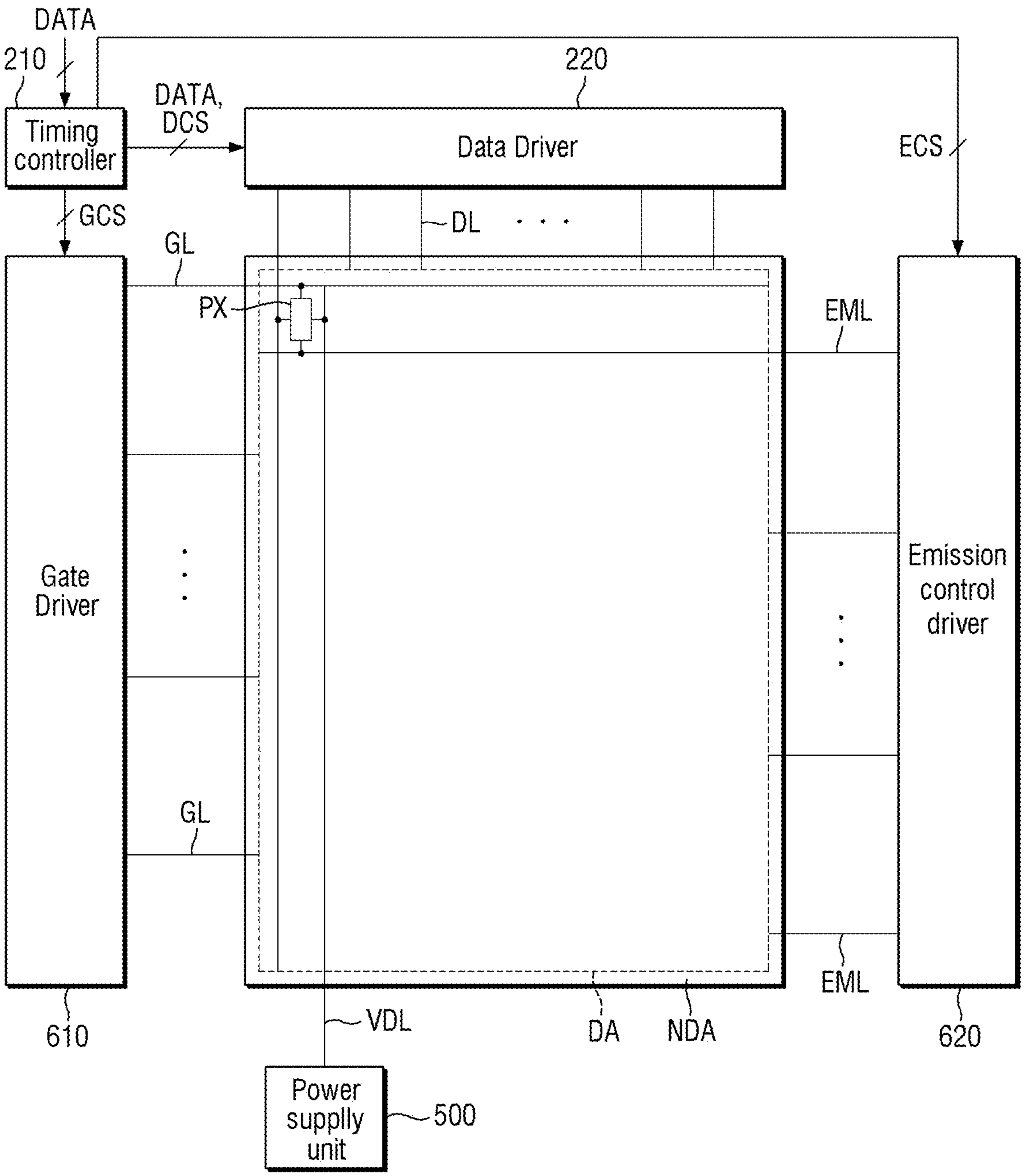
FIG. 4 is a block diagram illustrating a display panel and a display driver according to one or more embodiments.

FIG. 3 is a plan view illustrating a display unit of a display device according to one or more embodiments. FIG. 4 is a block diagram illustrating a display panel and a display driver according to one or more embodiments.

Referring to FIGS. 3 and 4, the display panel 100 may include the display area DA and the non-display area NDA.

The display area DA may include a plurality of pixels PX, and a plurality of driving voltage lines VDL, a plurality of common voltage lines VSL (see FIG. 5), a plurality of gate lines GL, a plurality of emission control lines EML, and a plurality of data lines DL connected to the plurality of pixels PX.

Each of the plurality of pixels PX may be connected to the gate line GL, the data line DL, the emission control line EML, the driving voltage line VDL, and the common voltage line VSL. Each of the pixels PX may include at least one transistor, the light emitting element LEL and a capacitor.

Each of the plurality of gate lines GL may extend in the first direction DR1 and may be spaced from each other in the second direction DR2 crossing the first direction DR1. The gate lines GL may be arranged along the second direction DR2. The gate lines GL may sequentially supply gate signals to the plurality of pixels PX.

The emission control lines EML may extend in the first direction DR1 and may be spaced from each other in the second direction DR2. The emission control line EML may be arranged along the second direction DR2. The emission control lines EML may sequentially supply an emission control signal EM to the plurality of pixels PX.

The data lines DL may extend in the second direction DR2 and may be spaced from each other in the first direction DR1. The data lines DL may be arranged along the first direction DR1. The data lines DL may supply data voltages to the plurality of pixels PX. The data voltage may determine the luminance of each of the pixels PX.

The driving voltage lines VDL may extend in the second direction DR2 and may be spaced from each other in the first direction DR1. The driving voltage lines VDL may be arranged along the first direction DR1. The driving voltage lines VDL may supply a driving voltage to the plurality of pixels PX. The driving voltage may be a high potential voltage for driving the light emitting element LEL of the pixels PX.

The non-display area NDA may be around (e.g., may surround) the display area DA along the edge or periphery of the display area DA. The non-display area NDA may include a gate driver 610, an emission control driver 620, fan-out lines FL, a first gate control line GSL1, and a second gate control line GSL2.

The fan-out lines FL may extend from the display driver 200 to the display area DA. The fan-out lines FL may supply the data voltage received from the display driver 200 to the plurality of data lines DL.

The first gate control line GSL1 may extend from the display driver 200 to the gate driver 610. The first gate control line GSL1 may supply a gate control signal GCS received from the display driver 200 to the gate driver 610.

The second gate control line GSL2 may extend from the display driver 200 to the emission control driver 620. The second gate control line GSL2 may supply a control signal ECS received from the display driver 200 to the emission control driver 620.

The sub-region SBA may extend from one side of the non-display area NDA. The sub-region SBA may include the display driver 200 and the pad portion DP. The pad portion DP may be disposed closer to one edge of the sub-region SBA than the display driver 200. The pad portion DP may be electrically connected to the circuit board 300 through an anisotropic conductive film ACF.

The display driver 200 may include a timing controller 210 and a data driver 220.

The timing controller 210 may receive a digital video data signal DATA and timing signals from the circuit board 300. The timing controller 210 may generate, based on the timing signals, a data control signal DCS to control the operation timing of the data driver 220, the gate control signal GCS to control the operation timing of the gate driver 610, and the control signal ECS to control the operation timing of the emission control driver 620. The timing controller 210 may supply the gate control signal GCS to the gate driver 610 through the first gate control line GSL1. The timing controller 210 may supply the control signal ECS to the emission control driver 620 through the second gate control line GSL2. The timing controller 210 may supply the digital video data signal DATA and the data control signal DCS to the data driver 220.

The data driver 220 may convert the digital video data signal DATA into analog data voltages and supply them to the data lines DL through the fan-out lines FL. The gate signals of the gate driver 610 may select the pixels PX to which the data voltage is supplied, and the selected pixels PX may receive the data voltage through the data lines DL.

The power supply unit 500 may be disposed on the circuit board 300 to supply a power voltage to the display driver 200 and the display panel 100. The power supply unit 500 may generate a driving voltage to supply it to the driving voltage line VDL, and may generate a common voltage to supply it to a common electrode that is common to the light emitting elements LEL of a plurality of pixels.

The gate driver 610 may be disposed at one external side of the display area DA or at one side of the non-display area NDA. The emission control driver 620 may be disposed at the other external side of the display area DA or at the other side of the non-display area NDA. However, the present disclosure is not limited thereto. As another example, the gate driver 610 and the emission control driver 620 may be disposed at any one of one side and the other side of the non-display area NDA.

The gate driver 610 may include a plurality of transistors for generating gate signals based on the gate control signal GCS. The emission control driver 620 may include a plurality of transistors that generate the emission control signals EM based on the control signal ECS. For example, the transistors of the gate driver 610 and the transistors of the emission control driver 620 may be formed on the same layer as the transistors of each of the pixels PX. The gate driver 610 may supply the gate signals to the gate lines GL, and the emission control driver 620 may supply the emission control signals EM to the emission control lines EML.

Figure 5:
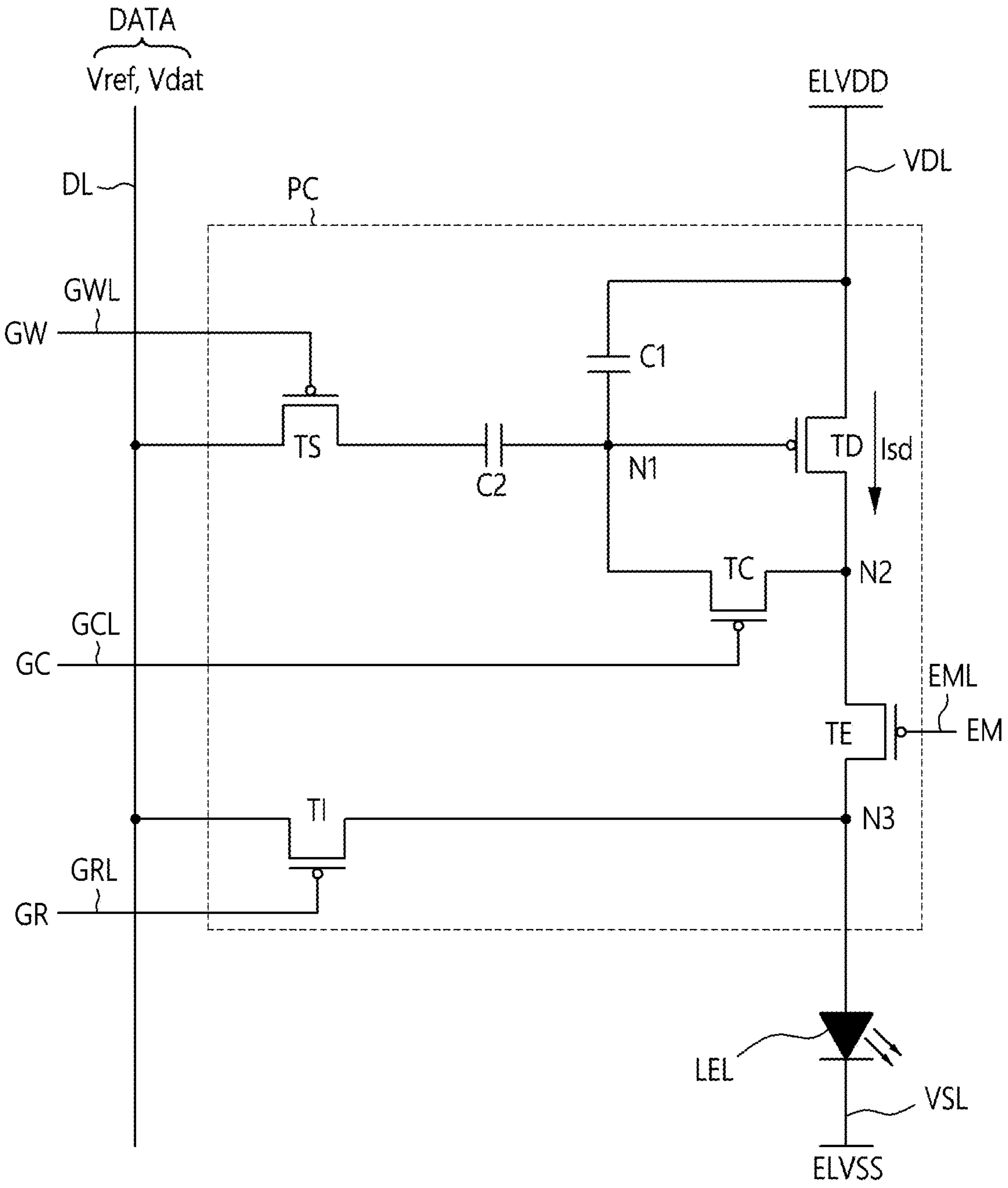
FIG. 5 is a circuit diagram of one pixel of a display device according to one or more embodiments.

FIG. 5 is a circuit diagram of one pixel of a display device according to one or more embodiments.

The pixel PX may be connected to a first gate line GWL, a second gate line GCL, a third gate line GRL, the emission control line EML, the data line DL, the driving voltage line VDL, the common voltage line VSL. Here, the common voltage line VSL may be connected to the common electrode (e.g., cathode electrode) of the light emitting element LEL.

The pixel PX may include a pixel circuit PC and the light emitting element LEL. The pixel circuit PC may include a driving transistor TD, a switching transistor TS, a compensation transistor TC, an initialization transistor TI, an emission control transistor TE, a first capacitor C1, and a second capacitor C2.

The driving transistor TD may include a gate electrode, a source electrode, and a drain electrode. The driving transistor TD may control a source-drain current (hereinafter referred to as a driving current) according to the data voltage applied to the gate electrode of the driving transistor TD. The driving current (e.g., Isd) flowing through a channel region of the driving transistor TD may be proportional to the square of a difference between the threshold voltage Vth and the voltage Vsg between the source electrode and the gate electrode of the driving transistor TD (e.g., $Isd=k\times(Vsg-Vth)^2$). Here, k is a proportional coefficient determined by the structure and physical characteristics of the driving transistor TD, Vsg is a source-gate voltage of the driving transistor TD, and Vth is a threshold voltage of the driving transistor TD.

The light emitting element LEL may emit light by receiving the driving current Isd. The emission amount or the luminance of the light emitting element LEL may be proportional to the magnitude of the driving current Isd.

The light emitting element LEL may be an organic light emitting diode including a first electrode, a second electrode, and an organic light emitting layer disposed between the first electrode and the second electrode. For another example, the light emitting element LEL may be an inorganic light emitting element including a first electrode, a second electrode, and an inorganic semiconductor disposed between the first electrode and the second electrode. For still another example, the light emitting element LEL may be a quantum dot light emitting element including a first electrode, a second electrode, and a quantum dot light emitting layer disposed between the first electrode and the second electrode. For still another example, the light emitting element LEL may be a micro light emitting diode.

The first electrode of the light emitting element LEL may be electrically connected to a third node N3. The first electrode of the light emitting element LEL may be connected to the drain electrode of the emission control transistor TE and the source electrode of the initialization transistor TI through the third node N3. The second electrode of the light emitting element LEL may be connected to the common voltage line VSL. The second electrode of the light emitting element LEL may receive a common voltage (e.g., low potential voltage) from the common voltage line VSL.

The switching transistor TS may be turned on by a first gate signal GW of the first gate line GWL to electrically connect the data line DL to a first node N1, which is the gate electrode of the driving transistor TD. As the switching transistor TS is turned on in response to the first gate signal GW, an initialization voltage Vref or a data voltage Vdat of the data line DL may be supplied to the first node N1. The gate electrode of the switching transistor TS may be electrically connected to the first gate line GWL, the source electrode thereof may be electrically connected to the data line DL, and the drain electrode thereof may be electrically connected to the first node N1 through the second capacitor C2. In order for the initialization voltage Vref and data voltage Vdat to be supplied to the data line DL, the above-described data driver 220 may generate the initialization voltage Vref and the data voltage Vdat, which are analog voltages, based on the digital video data signal DATA supplied from the outside, and may supply the generated initialization voltage Vref and data voltage Vdat to the data line DL in different periods. The initialization voltage Vref may have a value smaller than a driving voltage ELVDD and greater than a common voltage ELVSS. In this case, the initialization voltage Vref may have a value smaller than the threshold voltage of the light emitting element LEL.

The compensation transistor TC may be turned on by a second gate signal GC of the second gate line GCL to electrically connect the first node N1, which is the gate electrode of the driving transistor TD, to a second node N2, which is the drain electrode of the driving transistor TD. The compensation transistor TC may be connected (e.g., connected in series) between the first node N1 and the second node N2. The gate electrode of the compensation transistor TC may be electrically connected to the second gate line GCL, the source electrode thereof may be electrically connected to the first node N1, and the drain electrode thereof may be electrically connected to the second node N2.

The initialization transistor TI may be turned on by a third gate signal GR of the third gate line GRL to electrically connect the data line DL to the third node N3 which is the first electrode of the light emitting element LEL. The initialization transistor TI may be connected (e.g., connected in series) between the data line DL and the third node N3. The gate electrode of the initialization transistor TI may be electrically connected to the third gate line GRL, the drain electrode thereof may be electrically connected to the data line DL, and the source electrode thereof may be electrically connected to the third node N3. The drain electrode of the initialization transistor TI may be connected to the source electrode of the switching transistor TS through the data line DL.

The emission control transistor TE may be turned on by the emission control signal EM of the emission control line EML to electrically connect the second node N2, which is the drain electrode of the driving transistor TD, to the third node N3, which is the first electrode of the light emitting element LEL. The gate electrode of the emission control transistor TE may be electrically connected to the emission control line EML, the source electrode thereof may be electrically connected to the second node N2, and the drain electrode thereof may be electrically connected to the third node N3.

The first capacitor C1 may be connected between the first node N1, which is the gate electrode of the driving transistor TD, and the source electrode of the driving transistor TD (or driving voltage line VDL). The first electrode of the first capacitor C1 may be connected to the first node N1, and the second electrode of the first capacitor C1 may be connected to the source electrode of the driving transistor TD and the driving voltage line VDL. The first capacitor C1 may store, for example, the threshold voltage Vth of the driving transistor TD.

The second capacitor C2 may be electrically connected between the switching transistor TS and the first node N1 which is the gate electrode of the driving transistor TD. The first electrode of the second capacitor C2 may be electrically connected to the drain electrode of the switching transistor TS, and the second electrode of the second capacitor C2 may be electrically connected to the first node N1. The second capacitor C2 may store, for example, the data voltage Vdat supplied from the data line DL through the switching transistor TS.

When the driving transistor TD and the emission control transistor TE are turned on, a driving current (e.g., Isd) may be supplied to the light emitting element LEL, so that the light emitting element LEL may emit light.

At least one of the driving transistor TD, the switching transistor TS, the compensation transistor TC, the initialization transistor TI, and the emission control transistor TE described above may be a metal-oxide-semiconductor field effect transistor (MOSFET). For example, each of the driving transistor TD, the switching transistor TS, the compensation transistor TC, the initialization transistor TI, and the emission control transistor TE may be a P-type MOSFET. As another example, each of the driving transistor TD, the switching transistor TS, the compensation transistor TC, the initialization transistor TI, and the emission control transistor TE may be an N-type MOSFET. As still another example, some of the driving transistor TD, the switching transistor TS, the compensation transistor TC, the initialization transistor TI, and the emission control transistor TE may be P-type MOSFETs, and the other transistors may be N-type MOSFETs.

Figure 6:
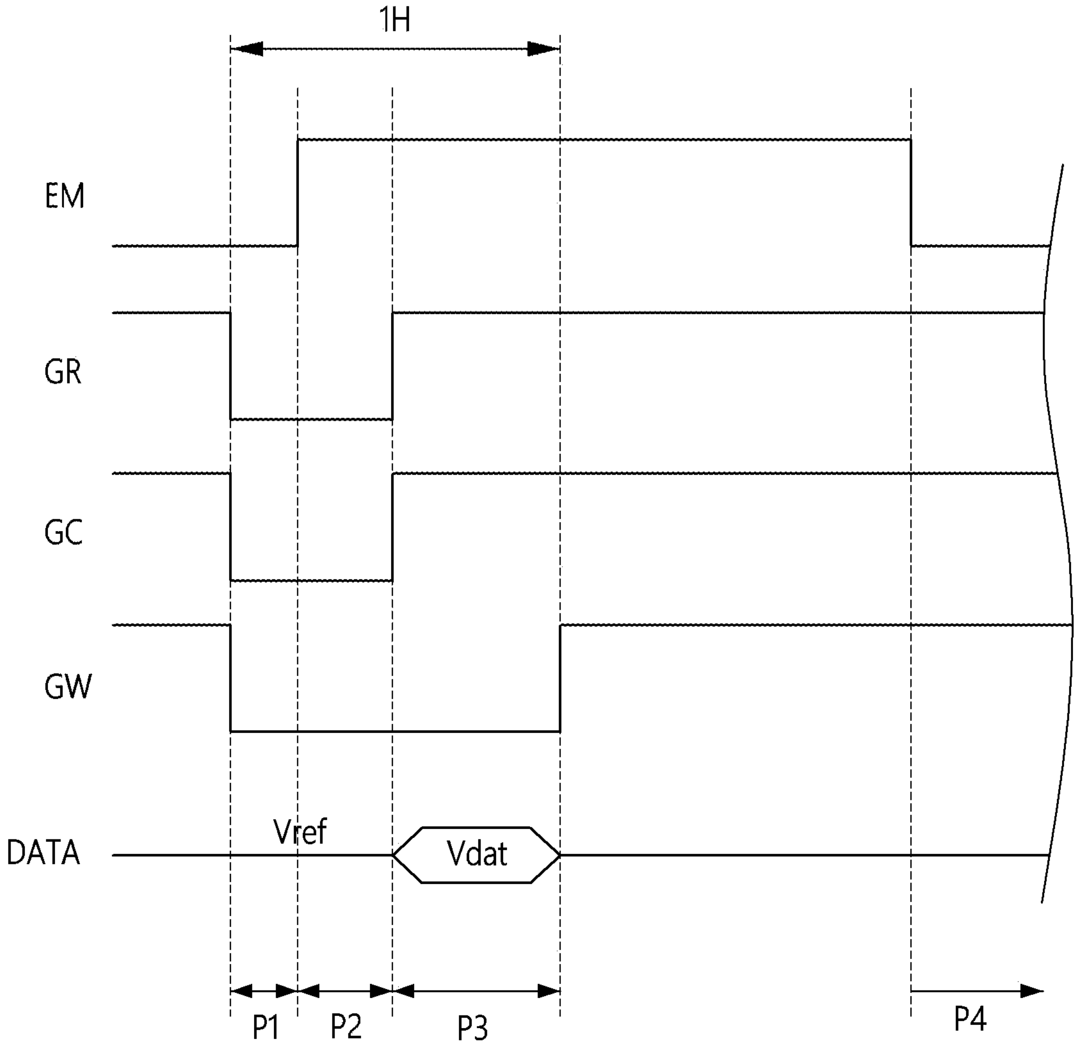
FIG. 6 is a timing diagram of the first to third gate signals GW, GC, and GR, the emission control signal EM, and the data signal DATA of FIG. 5.

FIG. 6 is a timing diagram of the first to third gate signals GW, GC, and GR, the emission control signal EM, and the data signal DATA of FIG. 5.

As in the example shown in FIG. 6, the display device 1 of the present disclosure may operate based on an initialization period P1, a threshold voltage detection period P2, a data writing period P3, and an emission period P4. Here, the threshold voltage detection period P2 may refer to a period in which the threshold voltage Vth of the driving transistor TD is detected.

The initialization period P1, the threshold voltage detection period P2, the data writing period P3, and the emission period P4 may be sequentially and cyclically repeated. For example, the threshold voltage detection period P2 may proceed after the initialization period P1, the data writing period P3 may proceed after the threshold voltage detection period P2, the emission period P4 may proceed after the data writing period P3, and the initialization period P1 may proceed again after the emission period P4. After the initialization period P1, the preceding periods may be repeated again.

In one or more embodiments, the initialization period P1, the threshold voltage detection period P2, and the data writing period P3 that are adjacent may correspond to one horizontal period 1H. In other words, one horizontal period 1H may include the initialization period P1, the threshold voltage detection period P2, and the data writing period P3. Here, the horizontal period 1H may refer to a period during which pixels (e.g., pixels in one row) arranged in a horizontal direction (e.g., first direction) are driven. Here, the pixels in one row may refer to a plurality of pixels connected to a gate line (e.g., first gate line GWL) in common and respectively connected to a plurality of different data lines DL.

The first gate signal GW, the second gate signal GC, the third gate signal GR, and the emission control signal EM may each have an active level or a non-active level for each period. Here, the active level of each signal may mean a voltage at a level capable of turning on a corresponding transistor to which the corresponding signal is applied. In other words, the active level signal may have a value greater than the threshold voltage of the corresponding transistor. For example, as shown in FIG. 5, when each transistor is a P-type transistor, the active level of each signal may be a low level. In one or more embodiments, the non-active level of each signal may be a voltage at a level capable of turning off a corresponding transistor. In other words, the non-active level signal may have a smaller value than the threshold voltage of the corresponding transistor. For example, as shown in FIG. 5, when each transistor is a P-type transistor, the non-active level of each signal may be a high level. In one or more embodiments, when each transistor is an N-type transistor, the active level of each signal may be a high level, and the non-active level of each signal may mean a low level.

During the initialization period P1, the first gate signal GW, the second gate signal GC, the third gate signal GR, and the emission control signal EM may have the active level (e.g., the low level). In the initialization period P1, the data signal DATA may have the level of the initialization voltage Vref. In other words, the data signal DATA of the initialization period P1 may be the initialization voltage Vref. The initialization voltage Vref may have a smaller value than, for example, the common voltage ELVSS.

Thereafter, during the threshold voltage detection period P2, the first gate signal GW, the second gate signal GC, and the third gate signal GR may have the active level (e.g., the low level), while the emission control signal EM may have the non-active level (e.g., the high level). For example, the first gate signal GW, the second gate signal GC, and the third gate signal GR may be continuously maintained at the active level (e.g., the low level) during the initialization period P1 and the threshold voltage detection period P2. On the other hand, the emission control signal EM may be changed from the active level (e.g., the low level) to the non-active level (e.g., the high level) in the threshold voltage detection period P2. During the threshold voltage detection period P2, the data signal DATA may be maintained at the level of the aforementioned initialization voltage Vref.

Next, during the data writing period P3, the first gate signal GW may have the active level (e.g., the low level), while the second gate signal GC, the third gate signal GR, and the emission control signal EM may have the non-active level (e.g., the high level). For example, the first gate signal GW may be continuously maintained at the active level (e.g., the low level) during the initialization period P1, the threshold voltage detection period P2, and the data writing period P3. On the other hand, the second gate signal GC and the third gate signal GR may be changed from the active level (e.g., the low level) to the non-active level (e.g., the high level) in the data writing period P3. In one or more embodiments, the emission control signal EM may be continuously maintained at the non-active level (e.g., the high level) during the threshold voltage detection period P2 and the data writing period P3. In the data writing period P3, the data signal may be changed to the level of the data voltage. In other words, the data signal DATA of the data writing period P3 may be the data voltage Vdat having a value corresponding to a specific grayscale of an image to be displayed.

Subsequently, during the emission period P4, the emission control signal EM may have the active level (e.g., the low level), while the first to third gate signals GW, GC, and GR may each have the non-active level (e.g., the high level). For example, the emission control signal EM may be changed from the non-active level (e.g., the high level) to the active level (e.g., the low level) in the emission period P4. On the other hand, the first gate signal GW may be changed from the active level (e.g., the low level) to the non-active level (e.g., the high level) in the emission period P4. In addition, the second and third gate signals GC and GR may be continuously maintained at the non-active level (e.g., the high level) during the data writing period P3 and the emission period P4. During the emission period P4, the data signal DATA may be maintained at the level of the initialization voltage Vref.

The operation of the display device according to one or more embodiments of the present disclosure will be described with reference to FIGS. 7 to 10. In FIGS. 7 to 10, a transistor surrounded by a solid line box means that the transistor is in a turn-on state, whereas a transistor surrounded by a dotted line box filled with a gray color means that the transistor is in a turn-off state. In addition, arrows in FIGS. 7 to 10 indicate current flow.

First, the operation of the display device in the initialization period P1 will be described with reference to FIGS. 6 and 7.

Figure 7:
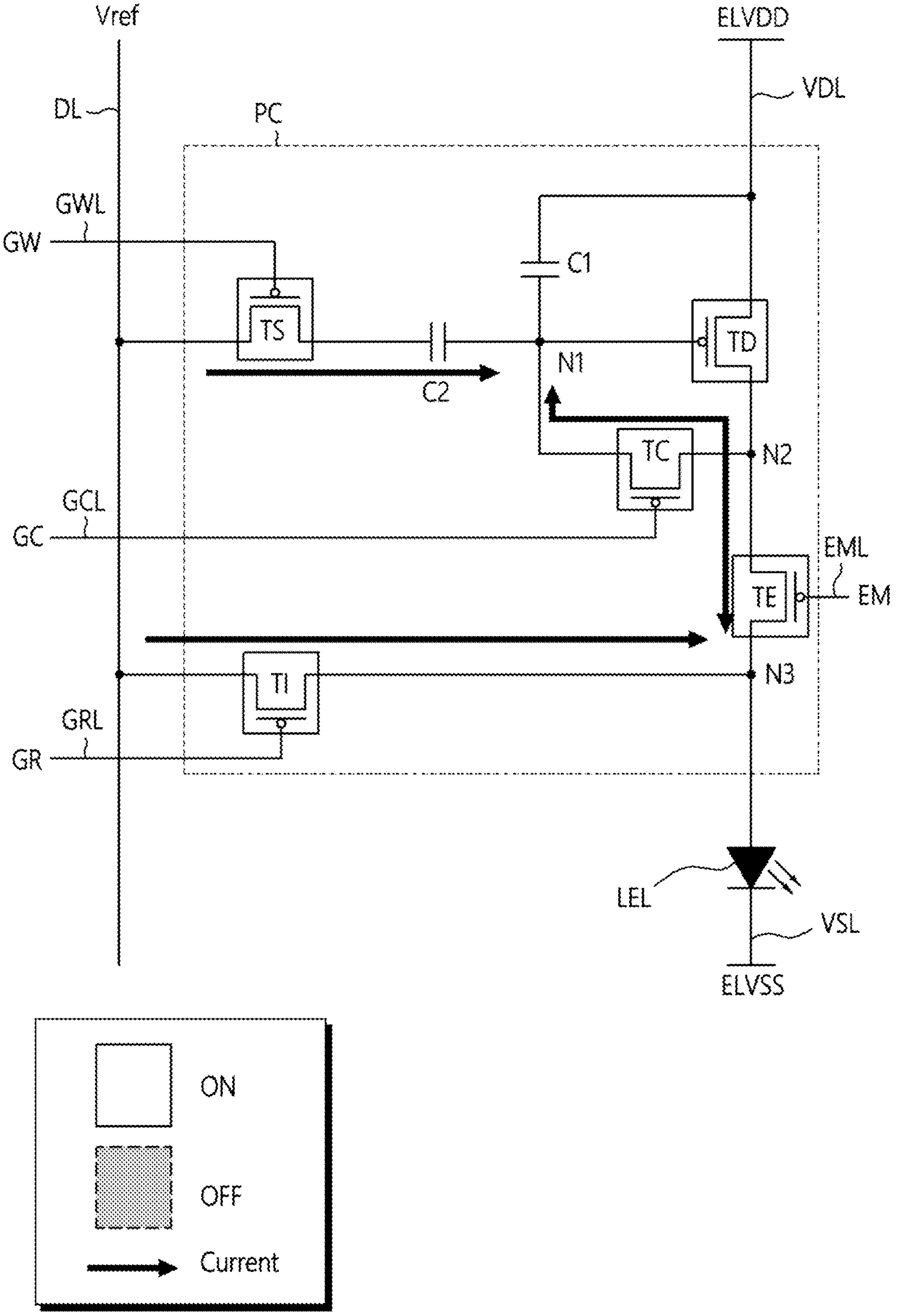
FIG. 7 is a circuit diagram illustrating an operation of the one pixel of the display device of FIG. 5 in the initialization period of FIG. 6.

FIG. 7 is a diagram illustrating an operation of the display device of FIG. 5 in the initialization period P1 of FIG. 6.

As shown in FIG. 6, during the initialization period P1, the first gate signal GW, the second gate signal GC, the third gate signal GR, and the emission control signal EM may each have the active level (e.g., low level). Also, during the initialization period P1, the data signal DATA may have the level of the initialization voltage Vref.

As shown in FIG. 7, the first gate signal GW of the active level (e.g., the low level) may be applied to the gate electrode of the switching transistor TS through the first gate line GWL. Accordingly, the switching transistor TS may be turned on.

As shown in FIG. 7, the second gate signal GC of the active level (e.g., the low level) may be applied to the gate electrode of the compensation transistor TC through the second gate line GCL. Accordingly, the compensation transistor TC may be turned on.

As shown in FIG. 7, the third gate signal GR of the active level (e.g., the low level) may be applied to the gate electrode of the initialization transistor TI through the third gate line GRL. Accordingly, the initialization transistor TI may be turned on.

As shown in FIG. 7, the emission control signal EM of the active level (e.g., the low level) may be applied to the gate electrode of the emission control transistor TE through the emission control line EML. Accordingly, the emission control transistor TE may be turned on.

As shown in FIG. 7, the initialization voltage Vref may be applied to each of the drain electrode of the switching transistor TS and the source electrode of the initialization transistor TI through the data line DL.

As the switching transistor TS, the compensation transistor TC, the initialization transistor TI, and the emission control transistor TE described above are turned on in the initialization period P1, the voltage of each of the gate electrode (e.g., first node N1) of the driving transistor TD, the drain electrode (e.g., second node N2) of the driving transistor TD, and the first electrode (e.g., third node N3) of the light emitting element LEL may be initialized. For example, the initialization voltage Vref (e.g., initialization voltage Vref in a transient state) from the data line DL may be applied to the first node N1, which is the gate electrode of the driving transistor TD, through the turned-on switching transistor TS and the second capacitor C2. In addition, the initialization voltage Vref from the data line DL may be applied to the second node N2, which is the drain electrode of the driving transistor TD, through the turned-on switching transistor TS, the second capacitor C2, the first node N1, and the turned-on compensation transistor TC. In addition, the initialization voltage Vref from the data line DL may be applied to the first electrode (the third node N3; e.g., anode electrode or pixel electrode) of the light emitting element LEL through the turned-on switching transistor TS, the second capacitor C2, the first node N1, the turned-on compensation transistor TC, the second node N2, and the turned-on emission control transistor TE. In addition, the initialization voltage Vref from the data line DL may be directly applied to the first electrode of the light emitting element LEL through the turned-on initialization transistor TI. Accordingly, the voltage of each of the gate electrode of the driving transistor TD, the drain electrode of the driving transistor TD, and the first electrode of the light emitting element LEL may be initialized (or discharged) to the initialization voltage Vref. Because the source electrode of the driving transistor TD is connected to the driving voltage line VDL to which the driving voltage ELVDD, which is a constant voltage, is provided, the voltage of the source electrode of the driving transistor TD may be maintained at or initialized to the driving voltage ELVDD.

As such, during the initialization period P1, the gate electrode, the source electrode, and the drain electrode of the driving transistor TD may be initialized, and the first electrode of the light emitting element LEL may be initialized. In this case, because the initialization voltage Vref is smaller than the threshold voltage of the light emitting element LEL, the light emitting element LEL does not emit light during the initialization period P1. Therefore, during the initialization period P1, the light emitting element LEL may be maintained in a non-emission state (or off state). In other words, because the light emitting element LEL is prevented from emitting light during a period other than the emission period P4, degradation of image quality may be reduced or minimized.

Next, the operation of the display device in the threshold voltage detection period P2 will be described with reference to FIGS. 6 and 8.

Figure 8:
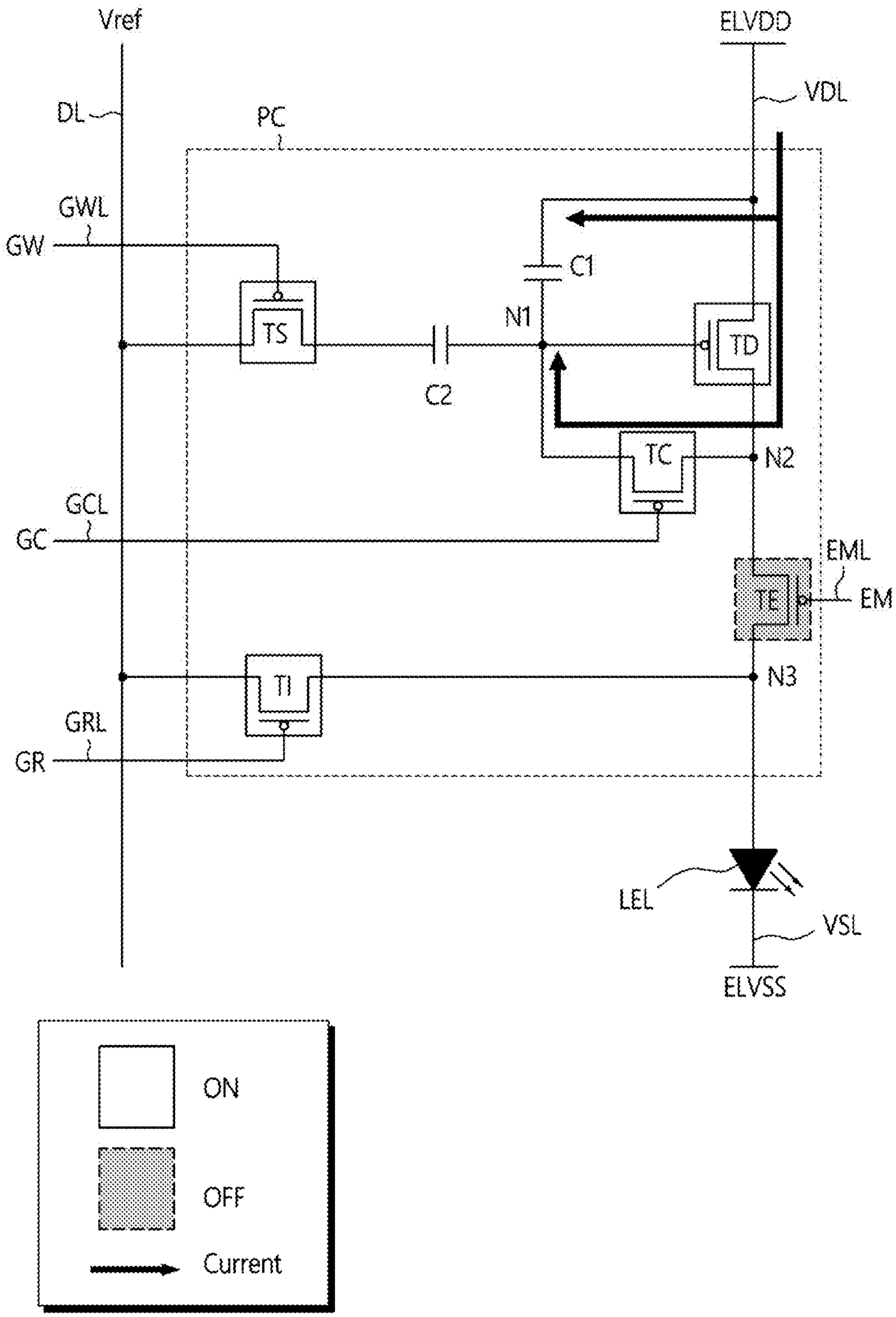
FIG. 8 is a diagram illustrating an operation of the one pixel of the display device of FIG. 5 in the threshold voltage detection period of FIG. 6.

FIG. 8 is a diagram illustrating an operation of the display device of FIG. 5 in the threshold voltage detection period P2 of FIG. 6.

As shown in FIG. 6, during the threshold voltage detection period P2, the first gate signal GW, the second gate signal GC, and the third gate signal GR may each have the active level (e.g., low level), while the emission control signal EM may have the non-active level (e.g., high level). During the threshold voltage detection period P2, the data signal may have the level of the initialization voltage Vref.

As shown in FIG. 8, the first gate signal GW of the active level (e.g., the low level) may be applied to the gate electrode of the switching transistor TS through the first gate line GWL. Accordingly, the switching transistor TS may be turned on.

As shown in FIG. 8, the second gate signal GC of the active level (e.g., the low level) may be applied to the gate electrode of the compensation transistor TC through the second gate line GCL. Accordingly, the compensation transistor TC may be turned on.

As shown in FIG. 8, the third gate signal GR of the active level (e.g., the low level) may be applied to the gate electrode of the initialization transistor TI through the third gate line GRL. Accordingly, the initialization transistor TI may be turned on.

As shown in FIG. 8, the emission control signal EM of the non-active level (e.g., the high level) may be applied to the gate electrode of the emission control transistor TE through the emission control line EML. Accordingly, the emission control transistor TE may be turned off.

As shown in FIG. 8, the initialization voltage Vref may be applied to each of the drain electrode of the switching transistor TS and the source electrode of the initialization transistor TI through the data line DL.

As the switching transistor TS, the compensation transistor TC, and the initialization transistor TI described above are turned on in the threshold voltage detection period P2, the threshold voltage Vth of the driving transistor TD may be detected and stored in the first capacitor C1. For example, in the threshold voltage detection period P2, because the turned-on switching transistor TS applies the same initialization voltage Vref as in the previous period (i.e., initialization period P1) to the first electrode of the second capacitor C2, the voltage supplied to the first electrode of the second capacitor C2 in the threshold voltage detection period P2 is the same DC voltage (e.g., DC voltage in a normal state) as in the initialization period P1 which is the previous period. Thus, substantially, the second capacitor C2 may block the initialization voltage Vref (e.g., DC voltage in a normal state rather than a transient voltage in the initialization period P1) in the threshold voltage detection period P2. Accordingly, a connection between the first node N1, which is the gate electrode of the driving transistor TD, and the switching transistor TS may be blocked. In addition, as the emission control transistor TE is turned off in the threshold voltage detection period P2, a connection between the second node N2, which is the drain electrode of the driving transistor TD, and the light emitting element LEL may be blocked. In this way, during the threshold voltage detection period P2, in a state where the gate electrode and the drain electrode of the driving transistor TD are floating from the switching transistor TS and the light emitting element LEL, as the gate electrode and the drain electrode of the driving transistor TD are connected to each other through the turned-on compensation transistor TC, the driving transistor TD may operate as a diode (e.g., the driving transistor TD may be diode-connected). In other words, during the threshold voltage detection period P2, the driving transistor TD connected in a diode manner may be turned on by the driving voltage ELVDD applied to the drain electrode thereof, and the first capacitor C1 may be charged by the turned-on driving transistor TD. When the first capacitor C1 starts to be charged and the voltage across the first capacitor C1 reaches the threshold voltage Vth of the driving transistor TD, the driving transistor TD is turned off. In other words, as the first capacitor C1 is charged, the voltage of the first node N1, which is one electrode of the first capacitor C1, gradually increases, and when the voltage of the first node N1 reaches the sum (i.e., driving voltage VD+threshold voltage Vth of the driving transistor TD) of the driving voltage and the threshold voltage of the driving transistor TD, the driving transistor TD is turned off. Accordingly, the threshold voltage Vth of the driving transistor TD may be stored in the first capacitor C1 when the driving transistor TD is turned off.

As such, during the threshold voltage detection period P2, the threshold voltage Vth of the driving transistor TD may be detected and maintained by the first capacitor C1.

Next, the operation of the display device in the data writing period P3 will be described with reference to FIGS. 6 and 9.

Figure 9:
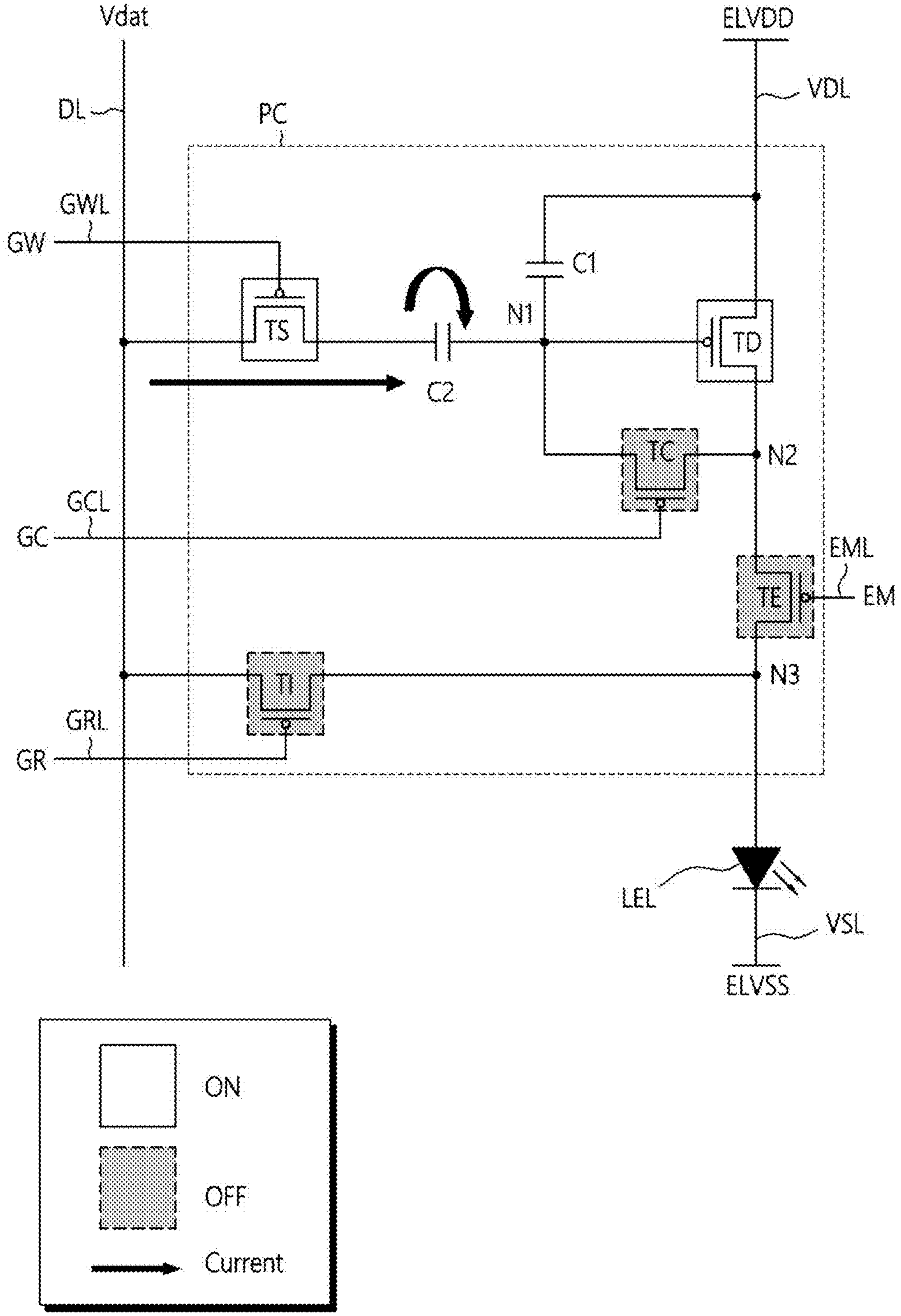
FIG. 9 is a diagram illustrating an operation of the one pixel of the display device of FIG. 5 in the data writing period of FIG. 6.

FIG. 9 is a diagram illustrating an operation of the display device of FIG. 5 in the data writing period P3 of FIG. 6.

As shown in FIG. 6, during the data writing period P3, the first gate signal GW may have the active level (e.g., low level), while the second gate signal GC, the third gate signal GR, and the emission control signal EM may have the non-active level (e.g., high level). The data signal DATA may have the level of the data voltage Vdat during the data writing period P3. In other words, the data signal DATA in the data writing period P3 may be the data voltage Vdat.

As shown in FIG. 9, the first gate signal GW of the active level (e.g., the low level) may be applied to the gate electrode of the switching transistor TS through the first gate line GWL. Accordingly, the switching transistor TS may be turned on.

As shown in FIG. 9, the second gate signal GC of the non-active level (e.g., the high level) may be applied to the gate electrode of the compensation transistor TC through the second gate line GCL. Accordingly, the compensation transistor TC may be turned off.

As shown in FIG. 9, the third gate signal GR of the non-active level (e.g., the high level) may be applied to the gate electrode of the initialization transistor TI through the third gate line GRL. Accordingly, the initialization transistor TI may be turned off.

As shown in FIG. 9, the emission control signal EM of the non-active level (e.g., the high level) may be applied to the gate electrode of the emission control transistor TE through the emission control line EML. Accordingly, the emission control transistor TE may be turned off.

As shown in FIG. 9, the data voltage Vdat may be applied to each of the drain electrode of the switching transistor TS and the source electrode of the initialization transistor TI through the data line DL.

As the compensation transistor TC and the emission control transistor TE described above are turned off in the data writing period P3, the first node N1, which is the gate electrode of the driving transistor TD, may be in a floating state. With the first node N1 floating as described above, the data voltage Vdat from the data line DL may be applied to the first node N1 through the turned-on switching transistor TS and the second capacitor C2 in the data writing period P3. For example, the data voltage Vdat from the data line DL may be applied to the first node N1, which is the gate electrode of the driving transistor TD, through coupling with the turned-on switching transistor TS and the second capacitor C2. Here, because the first node N1 is in a floating state as described above, the voltage of the first node N1 may further increase by a voltage (e.g., data voltage Vdat) coupled by the second capacitor C2. Specifically, the magnitude of the data voltage Vdat added to the voltage of the first node N1 may be determined by a ratio between the capacitance of the second capacitor C2 and the capacitance of the first capacitor C1. For example, the voltage added to the first node N1 may have a value corresponding to "data voltage*(capacitance of C2/(capacitance of C1+capacitance of C2))." In this case, because the data voltage is divided by the first capacitor C1 and the second capacitor C2, a range (e.g., grayscale expression range) of the data voltage may be extended.

During the data writing period P3, a difference voltage (e.g., gate-source voltage) between the first node N1, which is the gate electrode of the driving transistor TD, and the source electrode of the driving transistor TD may be maintained by the first capacitor C1. The gate-source voltage may include the threshold voltage Vth of the driving transistor TD as well as the data voltage Vdat. During the data writing period P3, the driving transistor TD may be turned on. However, because the emission control transistor TE is in a turn-off state during the data writing period P3, the driving current generated through the turned-on driving transistor TD may not be supplied to the light emitting element LEL.

In one or more embodiments, as the initialization transistor TI is turned off in the data writing period P3, the data voltage Vdat of the data line DL may not be applied to the first electrode (e.g., the third node N3) of the light emitting element LEL. Accordingly, because the voltage of the first electrode of the light emitting element LEL may be maintained at the initialization voltage Vref during the data writing period P3, the light emitting element LEL may be maintained in an off state during the data writing period P3.

In this way, during the data writing period P3, the voltage of the first node N1, which is the gate electrode of the driving transistor TD, may have, for example, a value obtained by adding the data voltage Vdat to the voltage (e.g., threshold voltage Vth of the driving transistor TD) of the threshold voltage detection period P2. Accordingly, the voltage across the first capacitor C1, e.g., the gate-source voltage of the driving transistor TD may have a value in which the threshold voltage Vth of the driving transistor TD is reflected.

Next, the operation of the display device in the emission period P4 will be described with reference to FIGS. 6 and 10.

Figure 10:
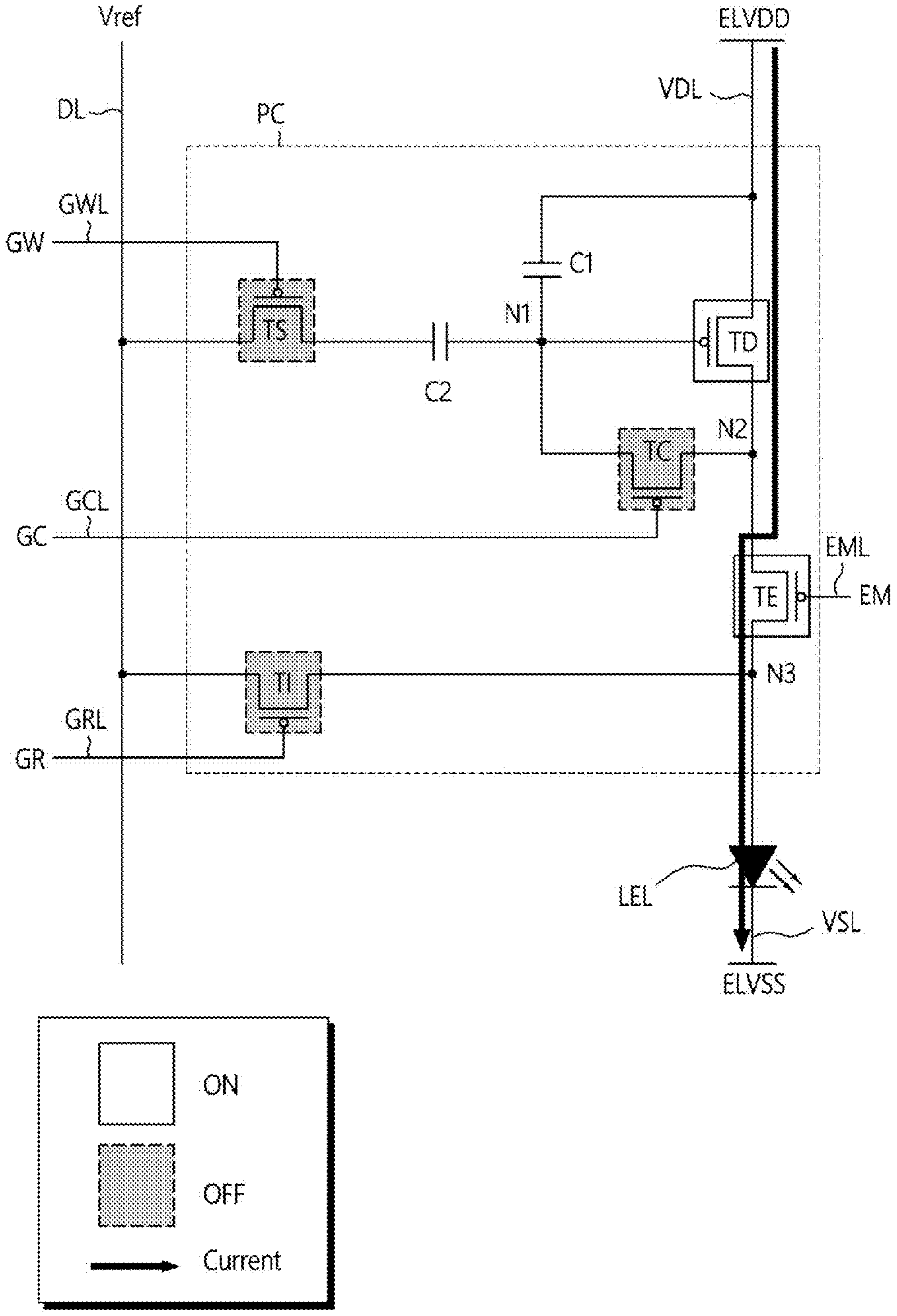
FIG. 10 is a diagram illustrating an operation of the display device of FIG. 5 in the data writing period of FIG. 6.

FIG. 10 is a diagram illustrating an operation of the display device of FIG. 5 in the data writing period P3 of FIG. 6.

As shown in FIG. 6, during the emission period P4, the emission control signal EM may have the active level (e.g., the low level), while the first to third gate signals GW, GC, and GR may each have the non-active level (e.g., the high level). The data signal DATA may have the level of the initialization voltage Vref during the emission period P4. In other words, the data signal DATA of the emission period P4 may be the initialization voltage Vref.

As shown in FIG. 10, the first gate signal GW of the non-active level (e.g., the high level) may be applied to the gate electrode of the switching transistor TS through the first gate line GWL. Accordingly, the switching transistor TS may be turned off.

As shown in FIG. 10, the second gate signal GC of the non-active level (e.g., the high level) may be applied to the gate electrode of the compensation transistor TC through the second gate line GCL. Accordingly, the compensation transistor TC may be turned off.

As shown in FIG. 10, the third gate signal GR of the non-active level (e.g., the high level) may be applied to the gate electrode of the initialization transistor TI through the third gate line GRL. Accordingly, the initialization transistor TI may be turned off.

As shown in FIG. 10, the emission control signal EM of the active level (e.g., the low level) may be applied to the gate electrode of the emission control transistor TE through the emission control line EML. Accordingly, the emission control transistor TE may be turned on.

As shown in FIG. 10, the initialization voltage Vref may be applied to each of the drain electrode of the switching transistor TS and the source electrode of the initialization transistor TI through the data line DL.

During the emission period P4, the driving transistor TD may be turned on by the gate-source voltage maintained by the first capacitor C1.

In this way, in the emission period P4, from among the driving transistor TD, the switching transistor TS, the compensation transistor TC, the initialization transistor TI, and the emission control transistor TE, as the driving transistor TD and the emission control transistor TE are turned on, the driving voltage ELVDD may be applied to the first electrode (e.g., the third node N3) of the light emitting element LEL through the turned-on driving transistor TD and the turned-on emission control transistor TE. In this case, because the gate-source voltage maintained by the first capacitor C1 includes the threshold voltage Vth of the driving transistor TD, the amount of the driving current flowing to the light emitting element LEL through the turned-on driving transistor TD may be determined based on the data voltage Vdat and the threshold voltage Vth of the driving transistor TD. Accordingly, the driving current supplied to the light emitting element LEL may accurately reflect the magnitude of the data voltage Vdat. In other words, the aforementioned driving current (e.g., Isd) may have an accurate value in which the threshold voltage Vth of the transistor TD is compensated. As such, because the threshold voltage Vth of the driving transistor TD of each pixel PX is compensated to determine the driving current of each pixel, luminance deviation between the pixels PX depending on a deviation of the threshold voltage Vth between the driving transistors TD of the pixels may be reduced or minimized. Accordingly, the image quality of the display device may be improved.

Figure 11:
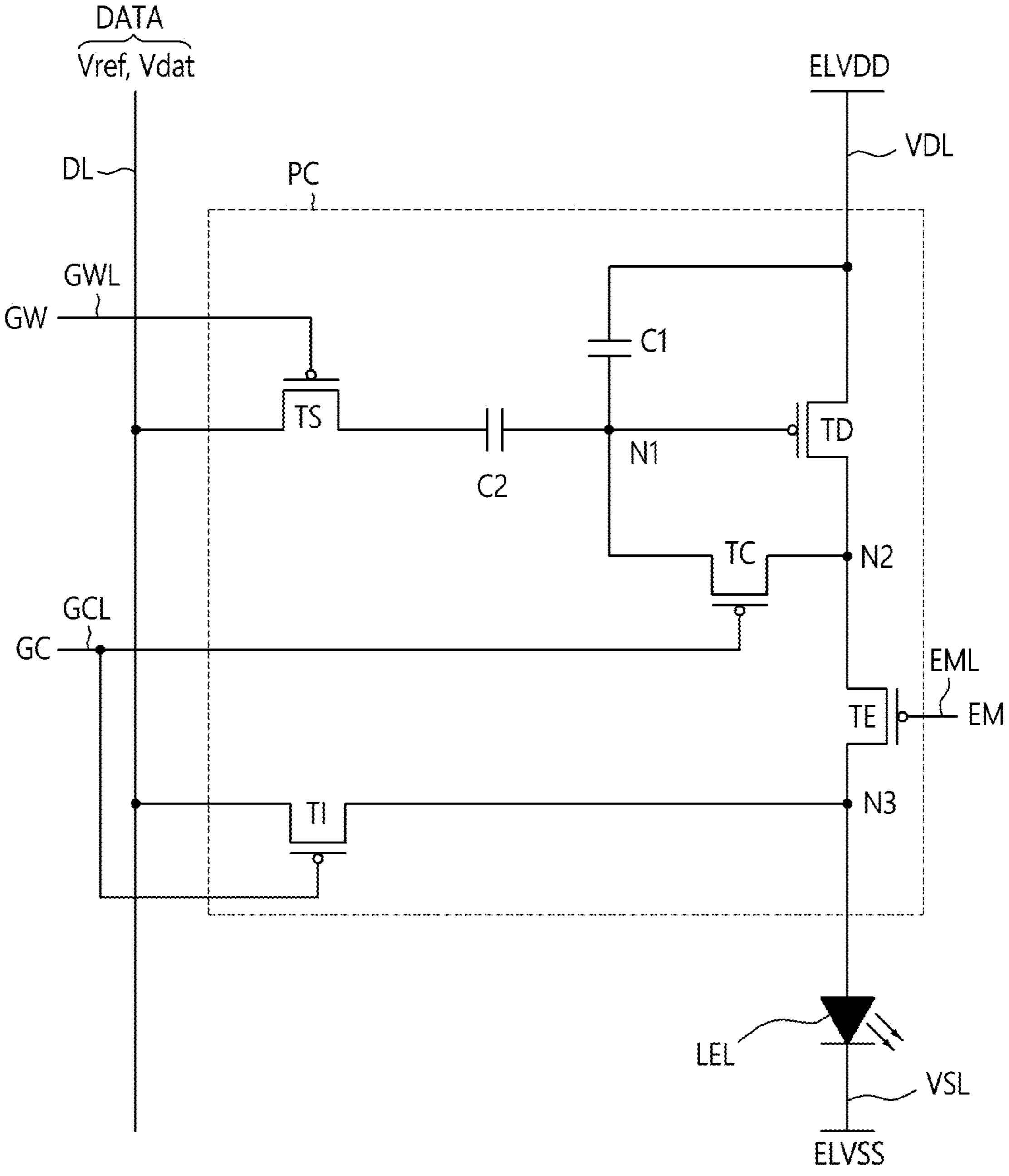
FIG. 11 is a circuit diagram of one pixel of a display device according to one or more embodiments.

FIG. 11 is a circuit diagram of one pixel of a display device according to one or more embodiments.

The pixel shown in FIG. 11 differs from the aforementioned pixel of FIG. 5 in that the gate electrode of the compensation transistor TC and the gate electrode of the initialization transistor TI are connected in common to one gate line (e.g., second gate line GCL), and thus, the following description will focus on the difference.

As in the example shown in FIG. 11, the gate electrode of the compensation transistor TC and the gate electrode of the initialization transistor TI may be connected in common to the second gate line GCL. In other words, because a gate signal applied to the gate electrode of the compensation transistor TC and a signal applied to the gate electrode of the initialization transistor TI are the same (or substantially the same), the compensation transistor TC and the initialization transistor TI may be connected to the same gate line (e.g., GCL). In this case, the number of gate lines may be reduced.

In one or more embodiments, the gate electrode of the compensation transistor TC and the gate electrode of the initialization transistor TI may be connected in common to the third gate line GRL.

Figure 12:
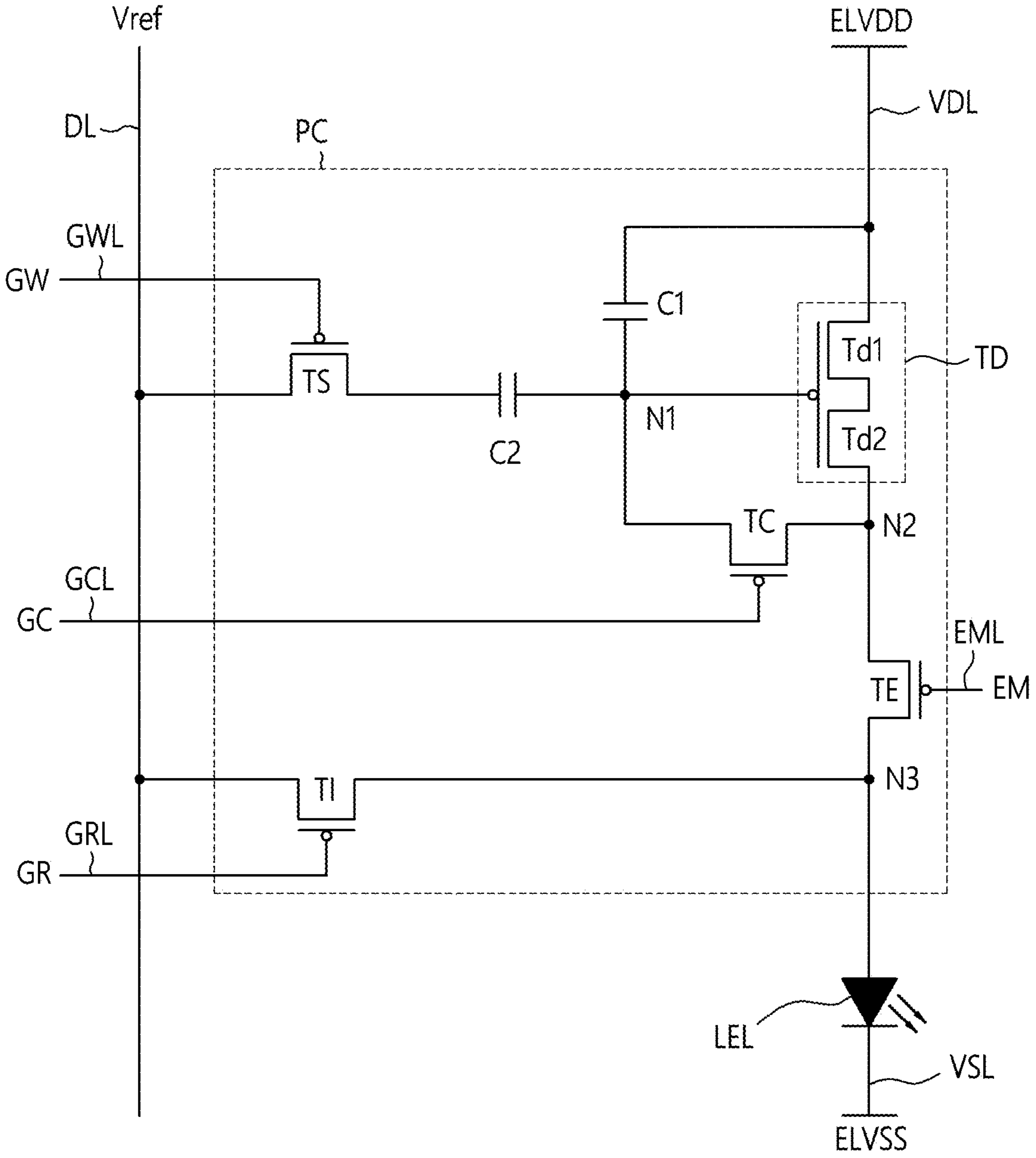
FIG. 12 is a circuit diagram of one pixel of a display device according to one or more embodiments.

FIG. 12 is a circuit diagram of one pixel of a display device according to one or more embodiments.

The pixel of the embodiment shown in FIG. 12 differs from the aforementioned pixel of FIG. 5 in that the driving transistor TD is composed of a dual gate transistor, and thus the following description will focus on this difference.

As in the example shown in FIG. 12, the driving transistor TD may include a first sub-transistor Td1 and a second sub-transistor Td2 connected in series between the second node N2 and the driving voltage line VDL.

The gate electrode of the first sub-transistor Td1 may be connected to the first node N1, the source electrode of the first sub-transistor Td1 may be connected to the driving voltage line VDL, and the drain electrode of the first sub-transistor Td1 may be connected to the source electrode of the second sub-transistor Td2.

The gate electrode of the second sub-transistor Td2 may be connected to the first node N1, the source electrode of the second sub-transistor Td2 may be connected to the drain electrode of the first sub-transistor Td1, and the drain electrode of the second sub-transistor Td2 may be connected to the second node N2.

The gate electrode of the first sub-transistor Td1 and the gate electrode of the second sub-transistor Td2 may be integrally formed.

Figure 13:
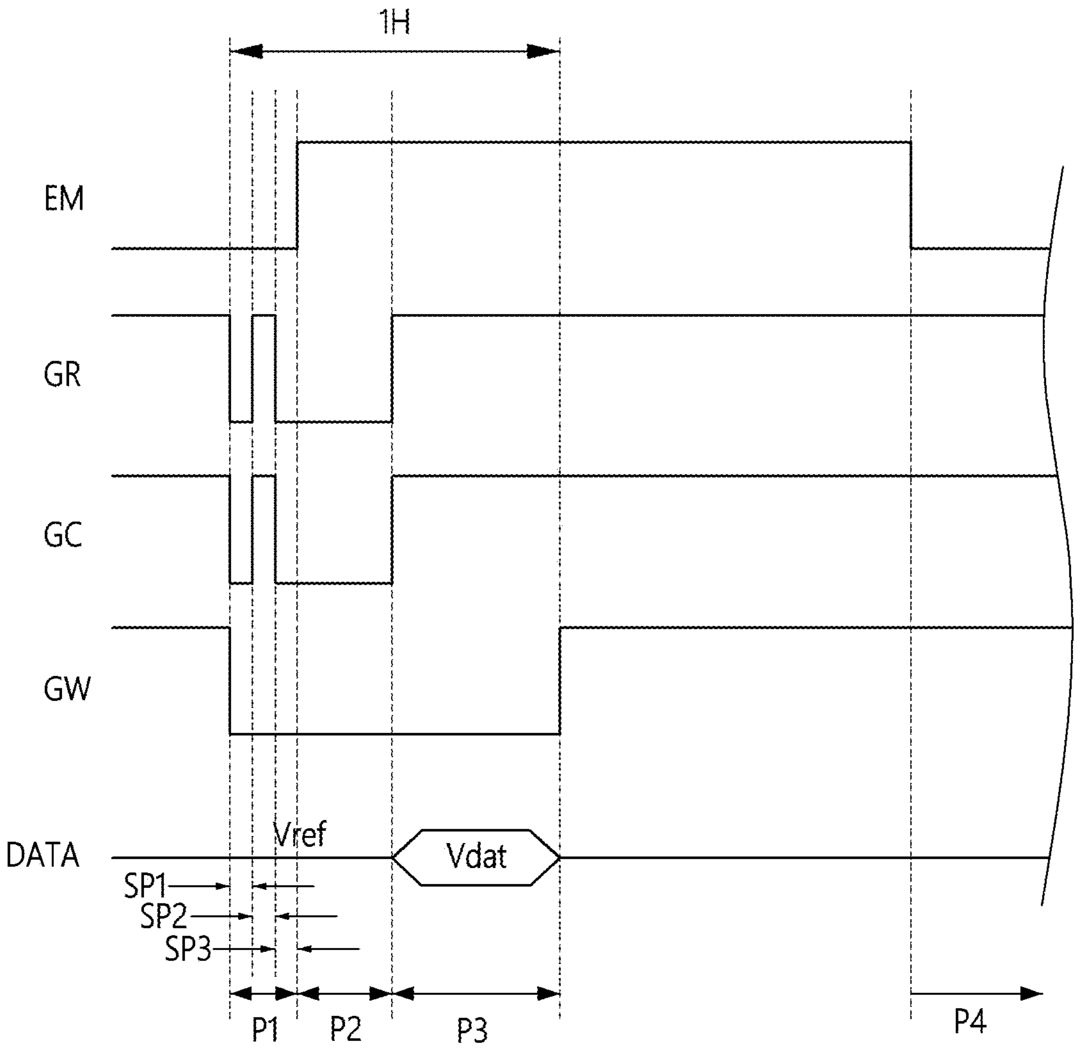
FIG. 13 is a timing diagram of the first to third gate signals, the emission control signal, and the data signal according to one or more embodiments.

FIG. 13 is a timing diagram of the first to third gate signals GW, GC, and GR, the emission control signal EM, and the data signal DATA according to one or more embodiments.

The embodiment of FIG. 13 differs from the embodiment of FIG. 6 in that the second gate signal GC and the third gate signal GR have at least two discontinuous active levels during the initialization period P1, and thus the following description will focus on this difference.

As in the example shown in FIG. 13, the initialization period P1 may include a plurality of sub-periods SP1, SP2, and SP3. For example, the initialization period P1 may include a first sub-period SP1, a second sub-period SP2, and a third sub-period SP3 in succession. After the first sub-period SP1, the second sub-period SP2 may proceed, and after the second sub-period SP2 proceeds, the third sub-period SP3 may proceed.

The second gate signal GC may have the active level (e.g., the low level) in each of the first sub-period SP1 and the third sub-period SP3. The second gate signal GC may have the non-active level (e.g., the high level) in the second sub-period SP2.

The third gate signal GR may have the active level (e.g., the low level) in each of the first sub-period SP1 and the third sub-period SP3. The third gate signal GR may have the non-active level in the second sub-period SP2.

The second gate signal GC and the third gate signal GR of the pixel circuit PC of FIGS. 5, 11, and 12 described above may have the same shape as the second gate signal GC and the third gate signal GR of FIG. 13.

Figure 14:
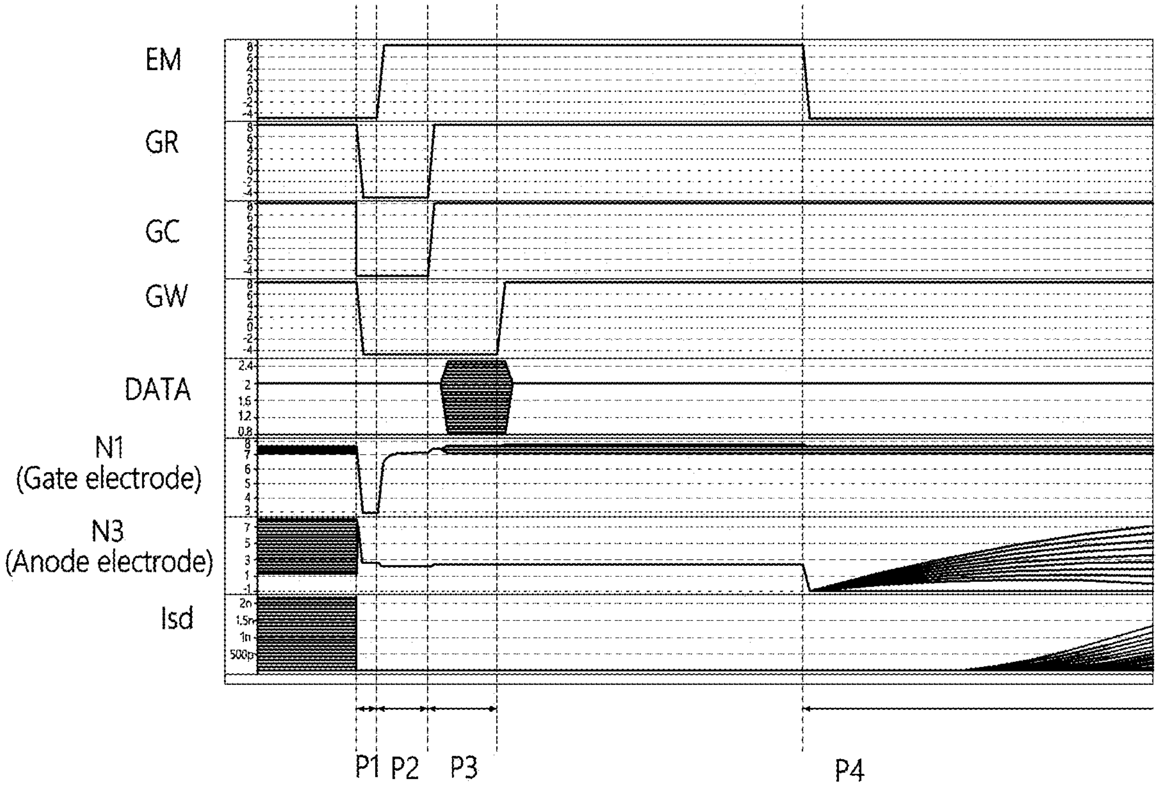
FIG. 14 illustrates simulation waveforms for a timing diagram of the first to third gate signals, the emission control signal, and the data signal according to one or more embodiments.

FIG. 14 illustrates simulation waveforms for a timing diagram of the first to third gate signals GW, GC, and GR, the emission control signal EM, the data signal DATA, the voltages at the nodes N1 and N3, and the driving current Isd according to one or more embodiments.

The timing diagram of the first to third gate signals GW, GC, and GR, the emission control signal EM, and the data signal DATA shown in FIG. 14 may correspond to the aforementioned timing diagram of the first to third gate signals GW, GC, and GR, the emission control signal EM, and the data signal DATA of FIG. 6.

During the initialization period P1, the voltage of the first node N1, which is the gate electrode of the driving transistor TD, may drop to the level of the initialization voltage Vref. Thereafter, during the threshold voltage detection period P2, the voltage of the first node N1 may increase due to the driving voltage ELVDD.

Next, during the data writing period P3, the voltage of the first node N1 may increase due to the data voltage Vdat and the second capacitor C2. Then, during the emission period P4, the voltage of the first node N1 may be maintained by the first capacitor C1.

During the initialization period P1, the voltage of the third node N3, which is the first electrode of the light emitting element LEL, may drop to the level of the initialization voltage Vref.

Thereafter, during the threshold voltage detection period P2, as the emission control transistor TE is turned off, the voltage of the third node N3 may further drop due to the parasitic capacitor of the emission control transistor TE.

Next, during the data writing period P3, the voltage of the third node N3 may further increase in synchronization with the rising time point of the voltage of the data line DL due to the influence of coupling by the parasitic capacitor between the drain electrode (e.g., data line DL) of the initialization transistor TI and the source electrode of the initialization transistor TI although the initialization transistor TI has been turned off.

Subsequently, during the emission period P4, the driving voltage may be applied to the first electrode (e.g., the third node N3) of the light emitting element LEL by the turned-on driving transistor TD and the turned-on emission control transistor TE. In this case, after the voltage at the third node N3 drops by the threshold voltage of the light emitting element LEL, the voltage at the third node N3 may gradually increase as the parasitic capacitor of the light emitting element LEL is charged by the driving current.

Figure 15:
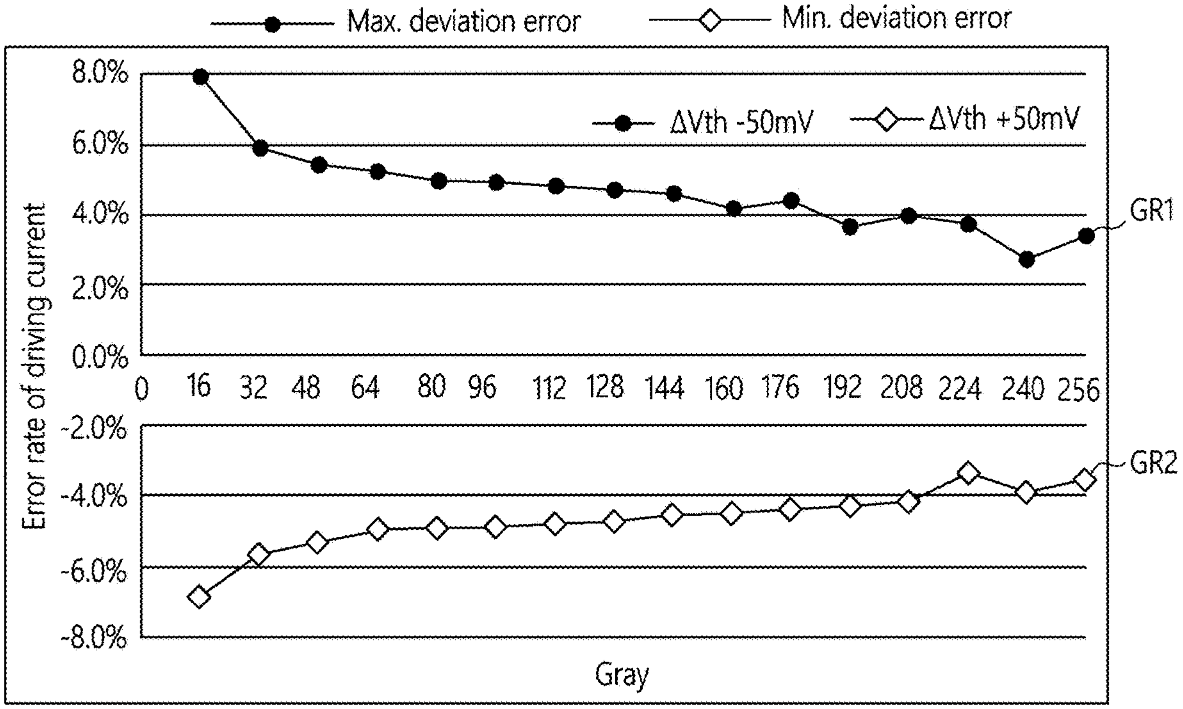
FIG. 15 is a diagram illustrating effects of a display device according to one or more embodiments.

FIG. 15 is a diagram illustrating effects of a display device (e.g., error rate of the driving current) according to one or more embodiments.

In FIG. 15, an X-axis means grayscale, and a Y-axis means the error rate of the driving current.

A first curve GR1 of FIG. 15 is a characteristic curve showing the error rate of the driving current Isd when the threshold voltage Vth of the driving transistor TD of the present disclosure is distributed in a negative direction. The error rate of the driving current Isd was observed to be less than about 8% in a high grayscale section, and less than about 4% in a low grayscale section. Here, the deviation of the threshold voltage Vth in the negative direction may be, for example, about −50 mV.

A second curve GR2 of FIG. 15 is a characteristic curve showing the error rate of the driving current Isd when the threshold voltage Vth of the driving transistor TD of the present disclosure is distributed in a positive direction. The error rate of the driving current Isd was observed to be less than about 8% in the high grayscale section, and less than about 4% in the low grayscale section. Here, the deviation of the threshold voltage Vth in the positive direction may be, for example, about +50 mV.

As described above, according to the display device of the present disclosure, because the threshold voltage Vth of the driving transistor TD is compensated to calculate the driving current Isd, the error rate of the driving current Isd may be located within 10% which is an allowable reference value. Therefore, the luminance deviation between the pixels PX may be prevented despite the deviation of the threshold voltage Vth between the pixels PX, so that the image quality of the display device may be improved.

Figure 16:
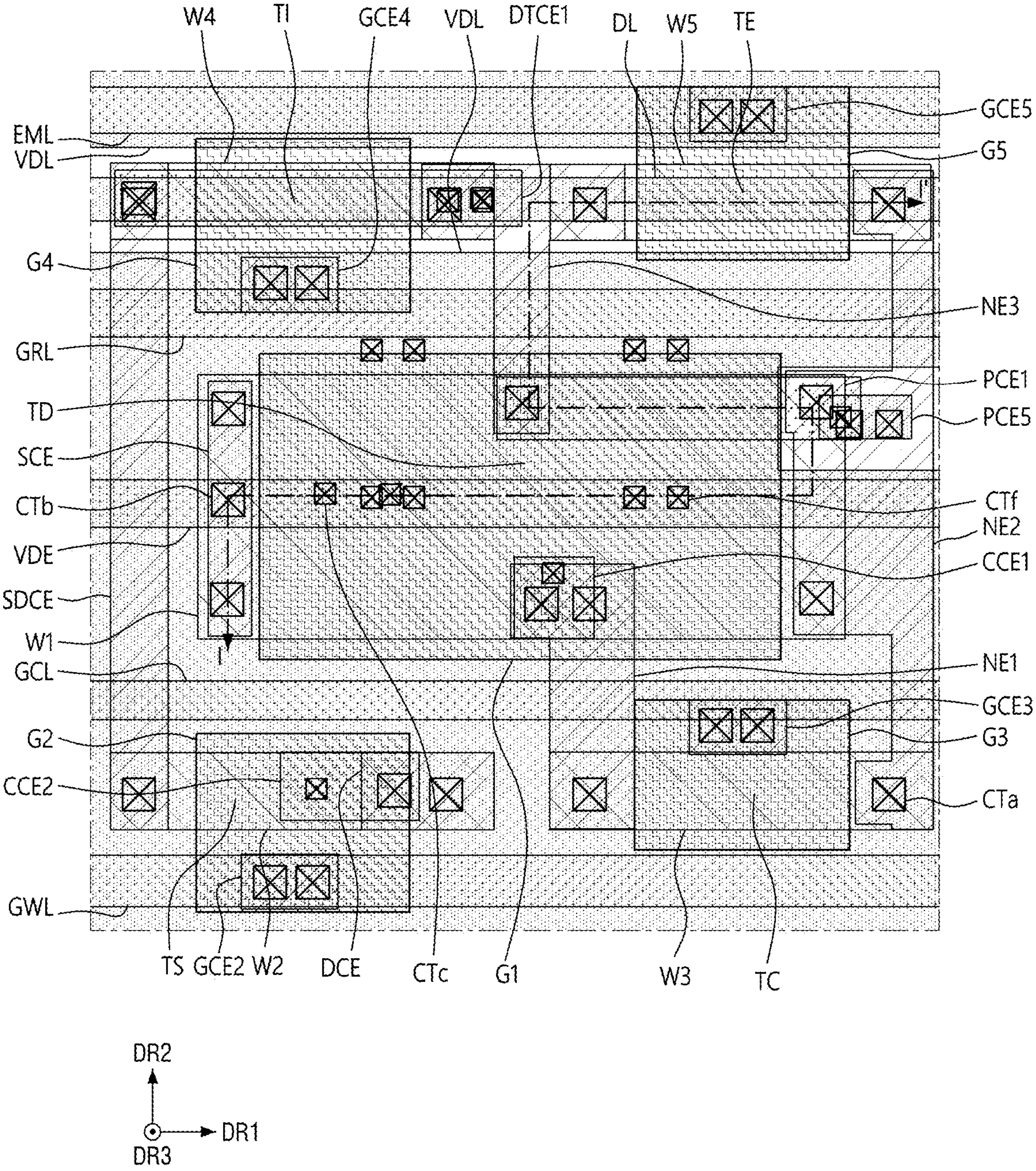
FIG. 16 is a plan view of a pixel array according to one or more embodiments.
Figure 17:
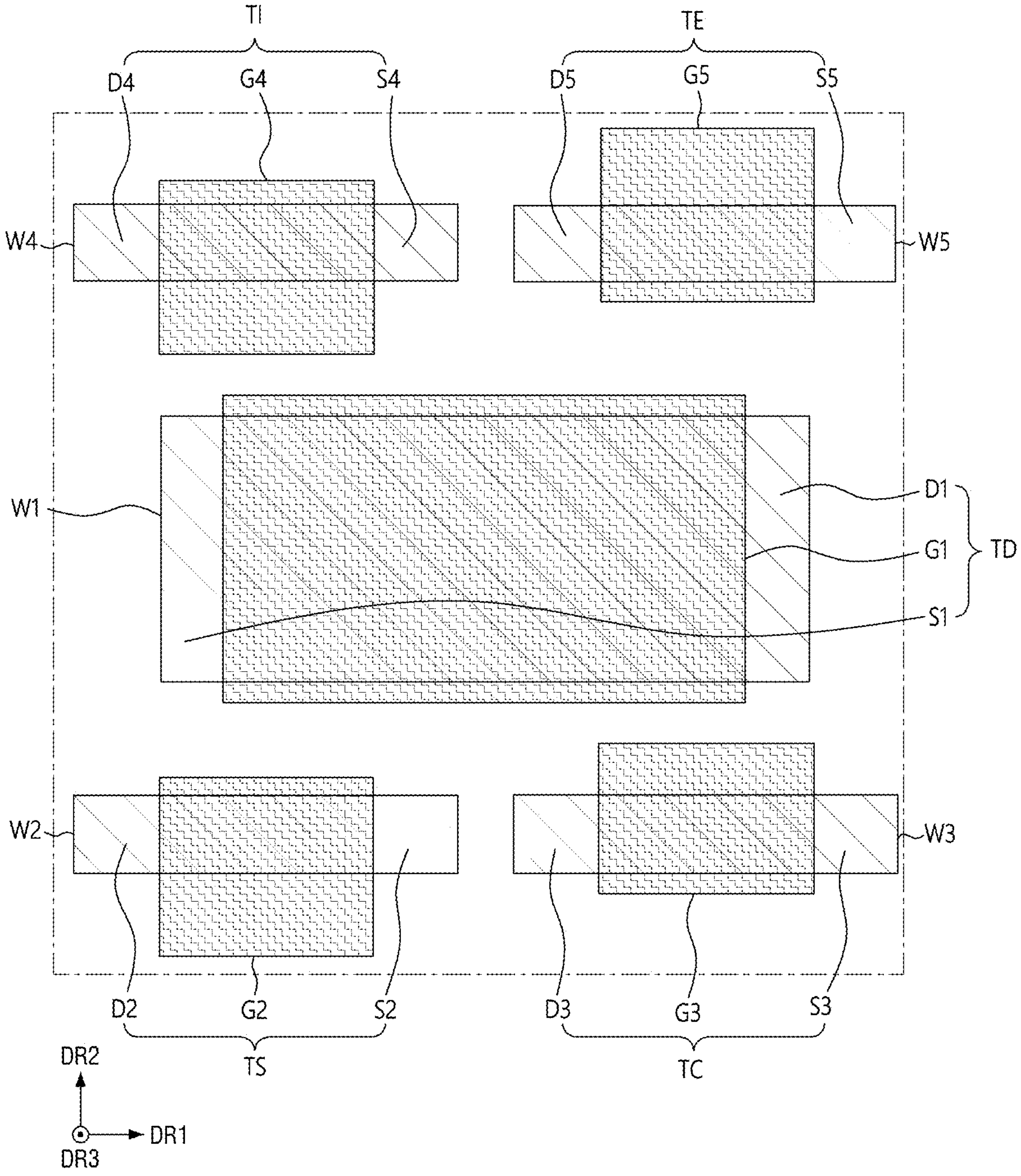
FIG. 17 is a diagram selectively illustrating well regions and gate electrodes from among the components of FIG. 16.
Figure 18:
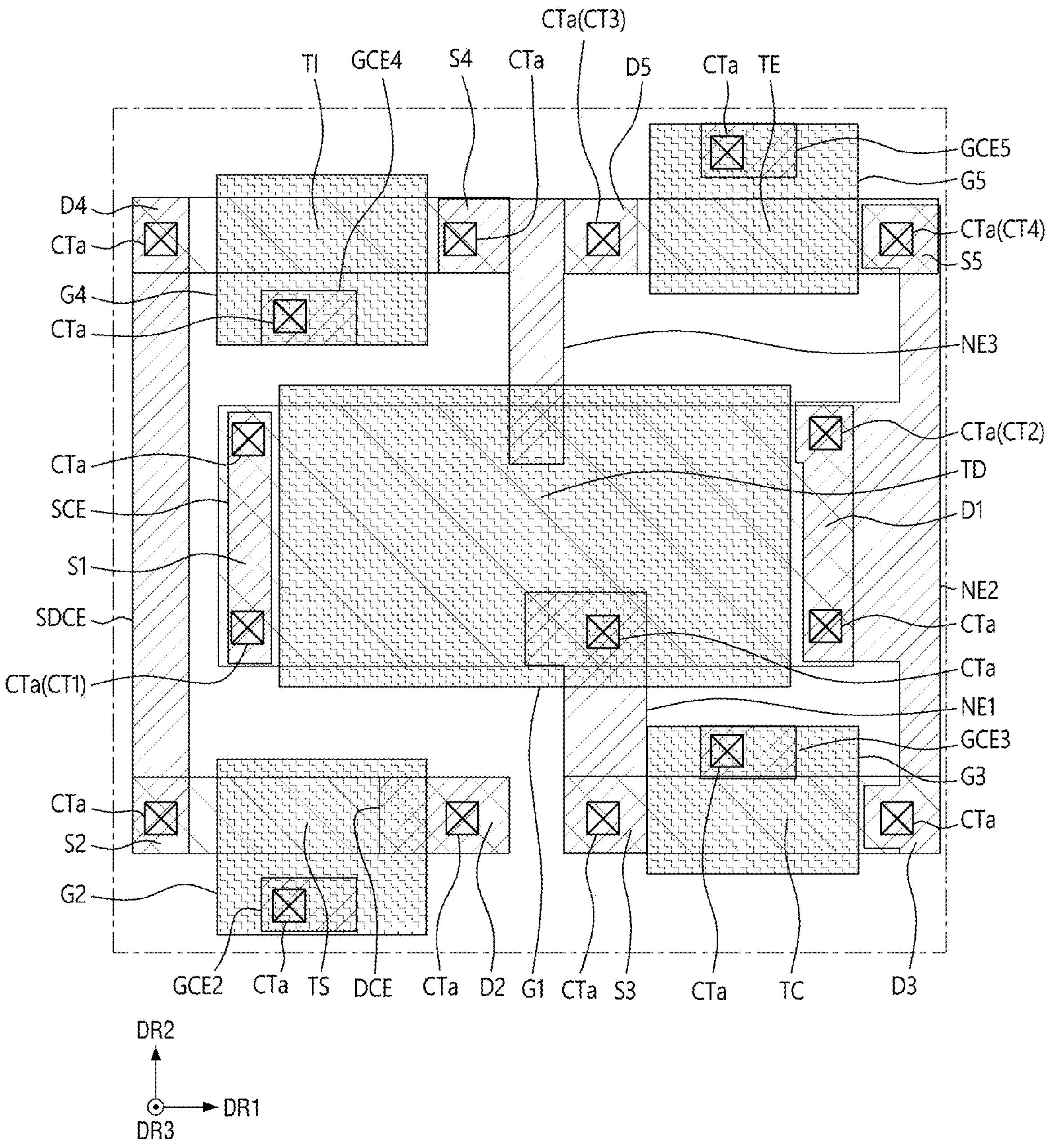
FIG. 18 is a diagram selectively illustrating only well regions, gate electrodes, a first metal layer, and a first type contact hole from among the components of FIG. 16.
Figure 19:
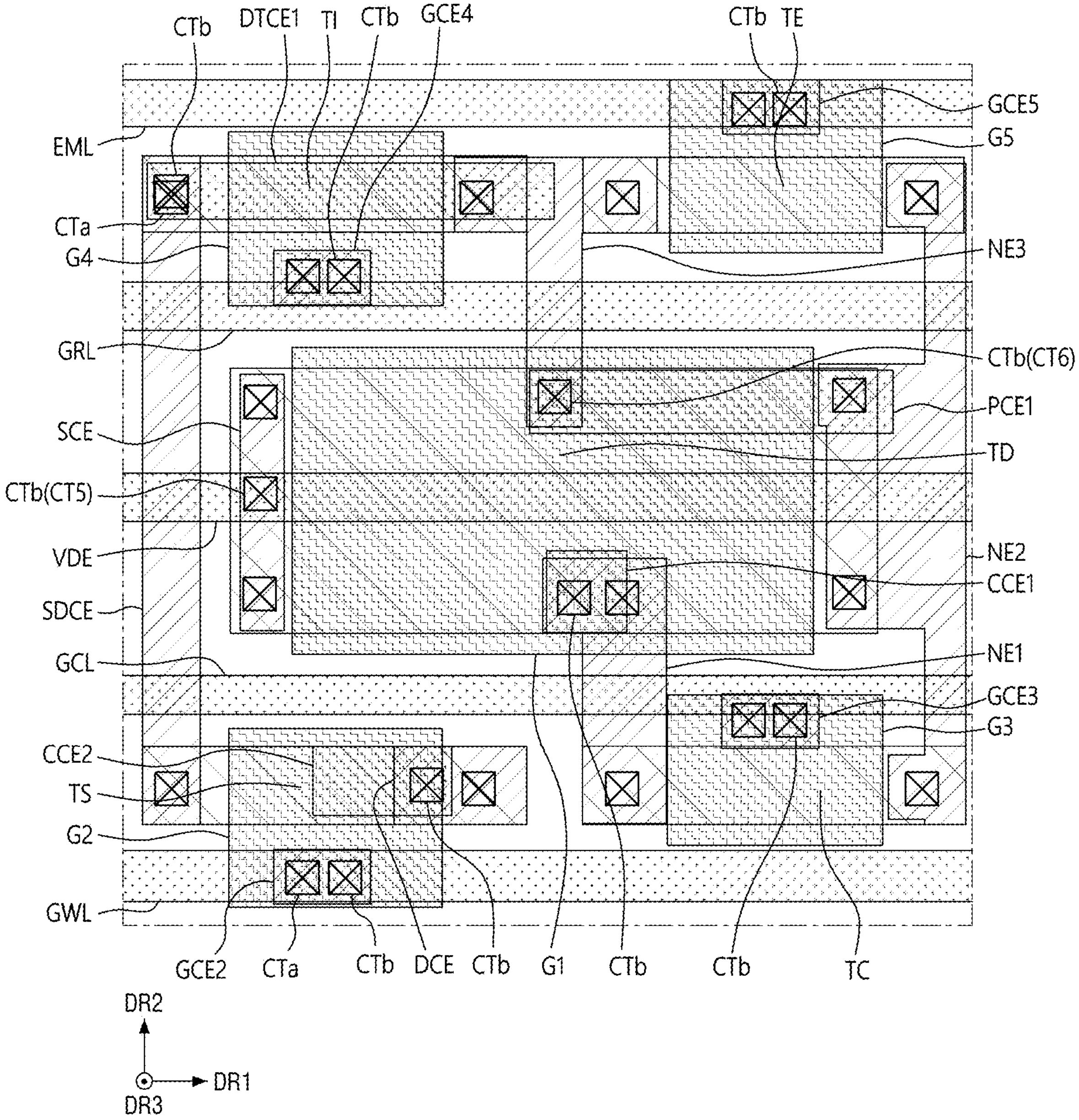
FIG. 19 is a diagram selectively illustrating only well regions, gate electrodes, a first metal layer, a second metal layer, a first type contact hole, and a second type contact hole from among the components of FIG. 16.
Figure 20:
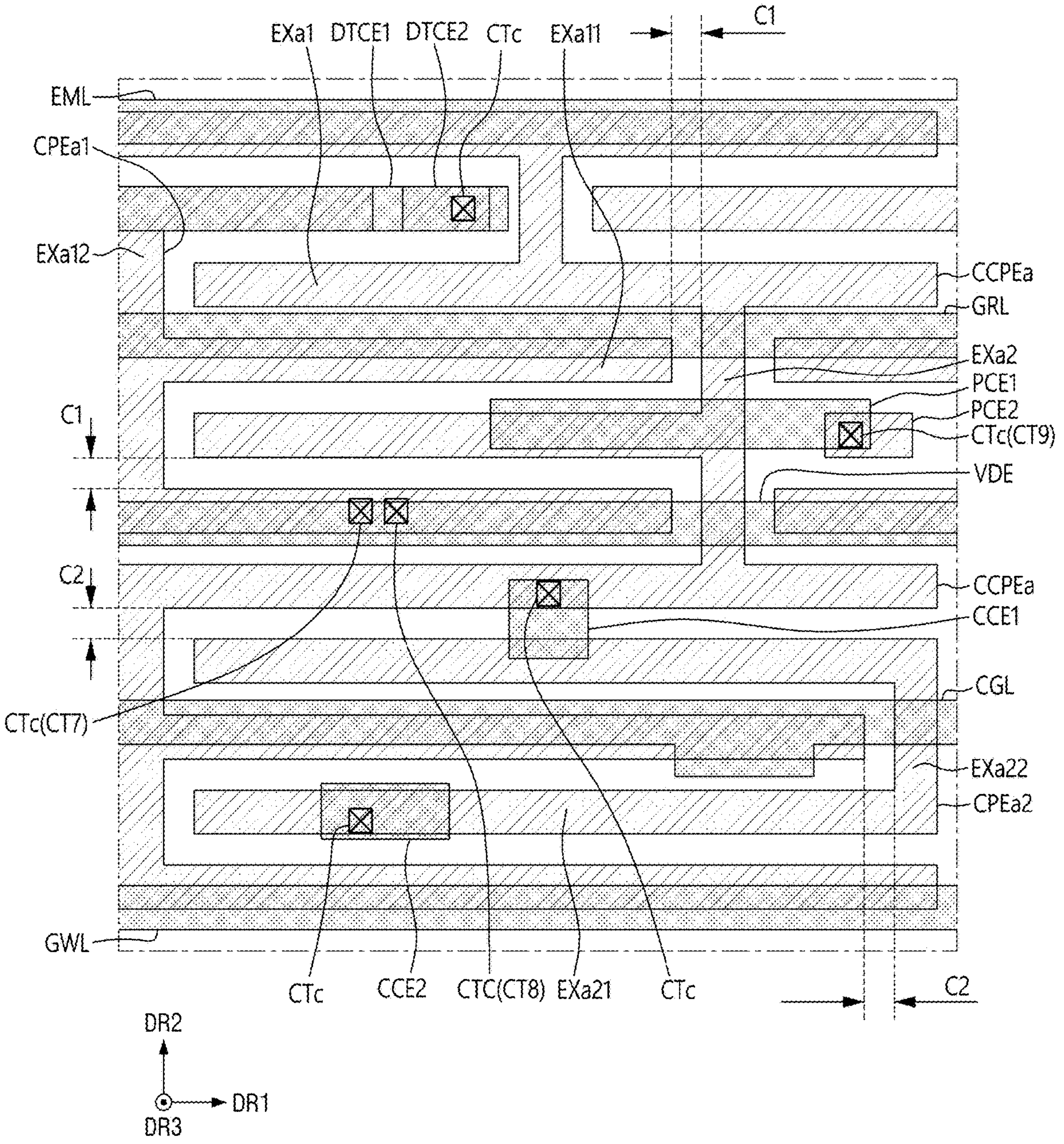
FIG. 20 is a diagram selectively illustrating a third type contact hole and a third metal layer connected to a second metal layer of FIG. 16.
Figure 21:
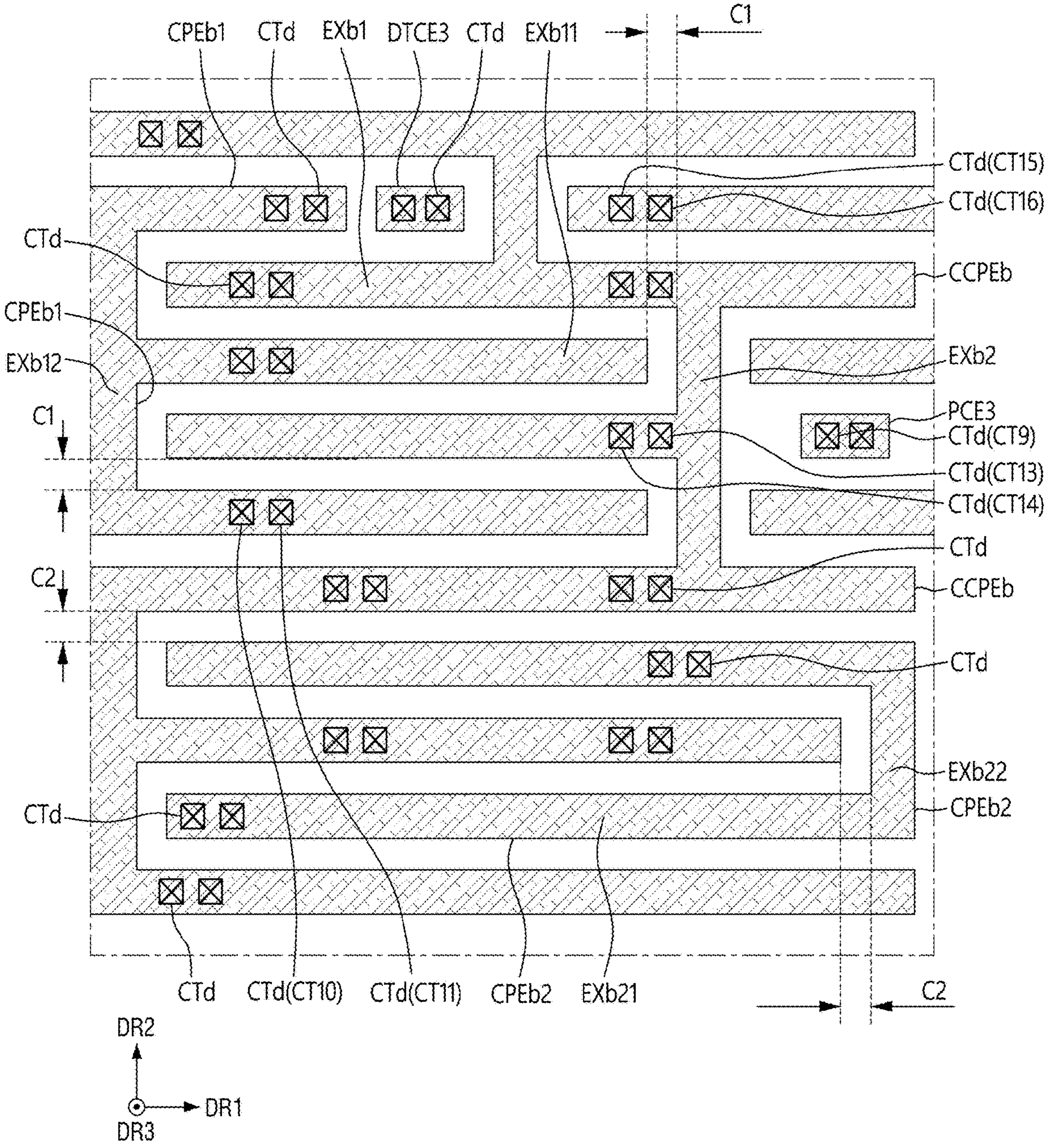
FIG. 21 is a diagram illustrating a fourth type contact hole and a fourth metal layer connected to a third metal layer of FIG. 20.
Figure 22:
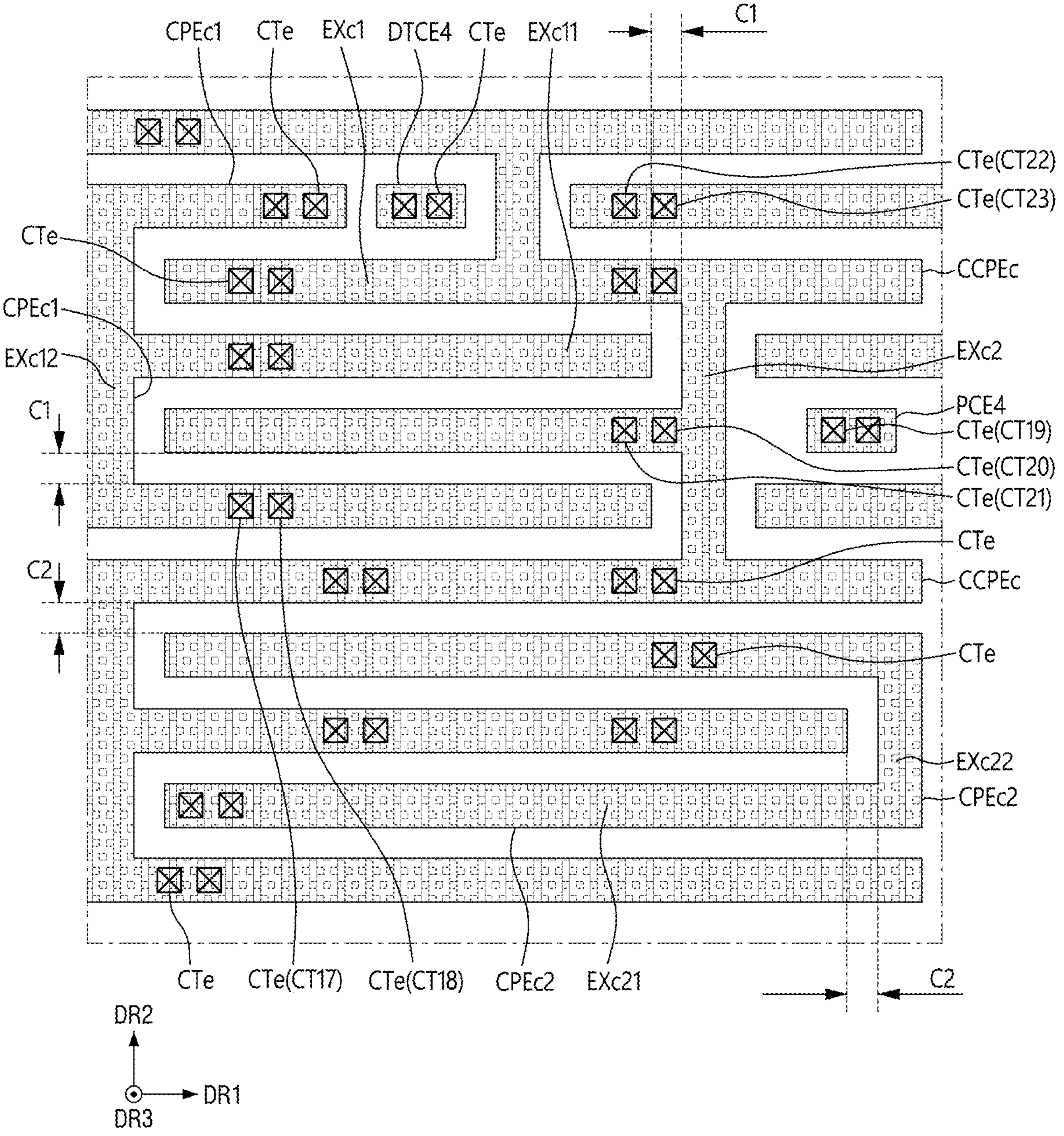
FIG. 22 is a diagram illustrating a fifth type contact hole and a fifth metal layer connected to a fourth metal layer of FIG. 21.
Figure 23:
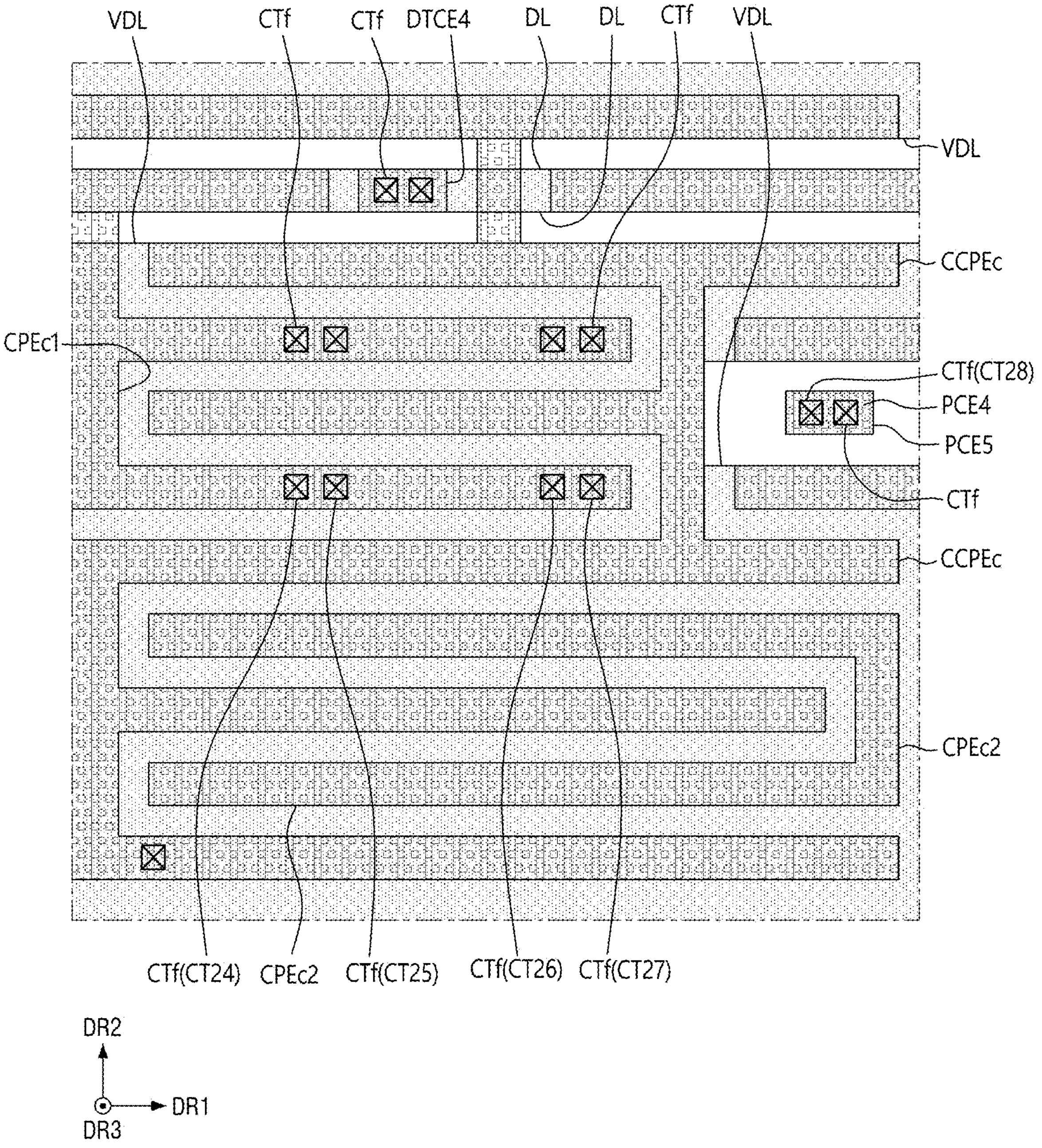
FIG. 23 is a diagram illustrating a sixth type contact hole and a sixth metal layer connected to a fifth metal layer of FIG. 22.
Figure 24:
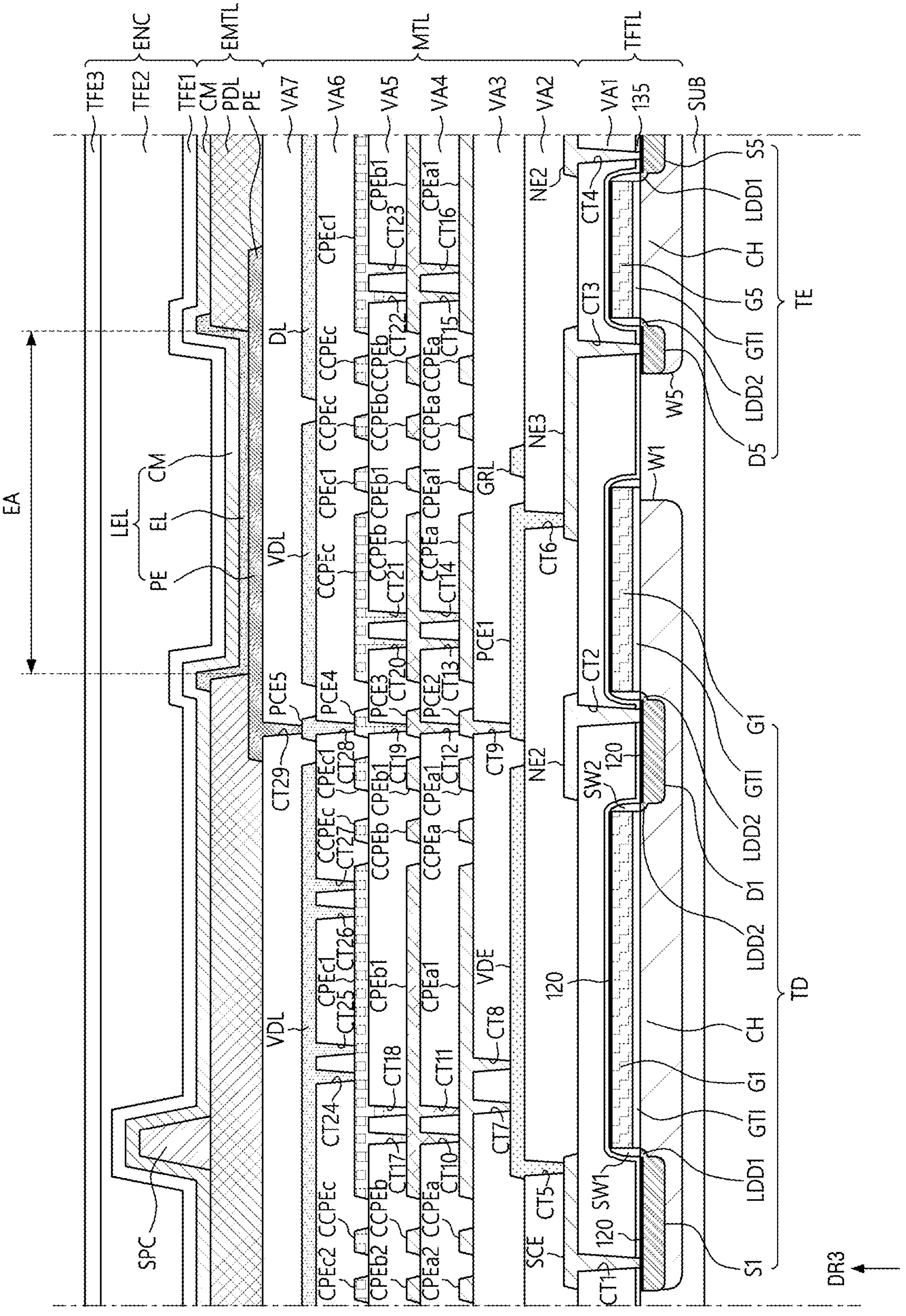
FIG. 24 is a cross-sectional view taken along the line I-I' of FIG. 16.

FIG. 16 is a plan view of a pixel array according to one or more embodiments. FIG. 17 is a diagram selectively illustrating well regions and gate electrodes from among the components of FIG. 16. FIG. 18 is a diagram selectively illustrating only well regions, gate electrodes, a first metal layer, and a first type contact hole CTa from among the components of FIG. 16. FIG. 19 is a diagram selectively illustrating only well regions, gate electrodes, a first metal layer, a second metal layer, a first type contact hole CTa, and a second type contact hole CTb from among the components of FIG. 16. FIG. 20 is a diagram selectively illustrating a third type contact hole CTc and a third metal layer connected to a second metal layer of FIG. 16. FIG. 21 is a diagram illustrating a fourth type contact hole CTd and a fourth metal layer connected to a third metal layer of FIG. 20. FIG. 22 is a diagram illustrating a fifth type contact hole CTe and a fifth metal layer connected to a fourth metal layer of FIG. 21. FIG. 23 is a diagram illustrating a sixth type contact hole CTf and a sixth metal layer connected to a fifth metal layer of FIG. 22. FIG. 24 is a cross-sectional view taken along the line I-I' of FIG. 16.

As shown in FIG. 24, the display device 10 of the present disclosure may include the substrate SUB, the thin film transistor layer TFTL, a metal layer MTL, the light emitting element layer EMTL, and the encapsulation layer ENC that are sequentially stacked along the third direction DR3.

As shown in FIG. 24, the substrate SUB may be a silicon substrate, a germanium substrate, or a silicon-germanium substrate. The substrate SUB may be a substrate doped with a first type impurities.

As shown in FIGS. 16, 17, and 24, a first well region W1, a second well region W2, a third well region W3, a fourth well region W4, and a fifth well region W5 may be disposed on the substrate SUB.

Each of the first to fifth well regions W1 to W5 may be a region doped with second type impurities. The second type impurity may be different from the aforementioned first type impurity. For example, when the first type impurity is a p-type impurity, the second type impurity may be an n-type impurity. When the first type impurity is an n-type impurity, the second type impurity may be a p-type impurity.

In each of the well regions W1 to W5, a source region, a drain region, and a channel region of a corresponding transistor may be disposed.

For example, as shown in FIG. 17, a first source region S1 and a first drain region D1 of the driving transistor TD may be disposed in the first well region W1. Each of the first source region S1 and the first drain region D1 may be a region doped with the aforementioned first type impurities. A first gate electrode G1 of the driving transistor TD may cross and overlap the first well region W1. In a plan view, the first well region W1 crossing the first gate electrode G1 may be defined as two parts, and the first source region S1 may be disposed in any one of the two parts, and the first drain region D1 may be disposed in the other part thereof. In other words, in the first well region W1, the first source region S1 and the first drain region D1 may be disposed on both sides of the first gate electrode G1, respectively, with the first gate electrode G1 interposed therebetween. A channel region CH of the driving transistor TD may be disposed in a part of the first well region W1 overlapping the first gate electrode G1.

In addition, as shown in FIG. 24, the first source region S1 may include a first low-concentration impurity region LDD1 having an impurity concentration relatively lower than those of other portions of the first source region S1. In other words, a portion of the first source region S1 may include a lower concentration of impurities than other portions of the first source region S1. The first drain region D1 may include a second low-concentration impurity region LDD2 having an impurity concentration relatively lower than those of other portions of the first drain region D1. In other words, a portion of the first drain region D1 may include a lower concentration of impurities than other portions of the first drain region D1.

The first low-concentration impurity region LDD1 and the second low-concentration impurity region LDD2 may be disposed close to the channel region CH of the driving transistor TD. For example, the first low-concentration impurity region LDD1 may be disposed close to the channel region to overlap a first spacer SW1, and the second low-concentration impurity region LDD2 may be disposed close to the channel region CH to overlap a second spacer SW2. As such, a distance between a high-concentration impurity region of the first source region S1 and a high-concentration impurity region of the first drain region D1 may increase by the first low-concentration impurity region LDD1 and the second low-concentration impurity region LDD2, and as the distance increases, the length of the channel region CH may eventually increase. Accordingly, punch-through and hot carrier phenomena caused by a short channel may be prevented.

As shown in FIG. 17, a second source region S2 and a second drain region D2 of the switching transistor TS may be disposed in the second well region W2. Each of the second source region S2 and the second drain region D2 may be a region doped with the aforementioned first type impurities. A second gate electrode G2 of the switching transistor TS may cross and overlap the second well region W2. In a plan view, the second well region W2 crossing the second gate electrode G2 may be defined as two parts, and the second source region S2 may be disposed in any one of the two parts, and the second drain region D2 may be disposed in the other part thereof. In other words, in the second well region W2, the second source region S2 and the second drain region D2 may be disposed on both sides of the second gate electrode G2, respectively, with the second gate electrode G2 interposed therebetween. The channel region of the switching transistor TS may be disposed in a part of the second well region W2 overlapping the second gate electrode G2. The second source region S2 and the second drain region D2 may include the aforementioned first low-concentration impurity region LDD1 and second low-concentration impurity region LDD2, respectively.

As shown in FIG. 17, a third source region S3 and a third drain region D3 of the compensation transistor TC may be disposed in the third well region W3. Each of the third source region S3 and the third drain region D3 may be a region doped with the aforementioned first type impurities. A third gate electrode G3 of the compensation transistor TC may cross and overlap the third well region W3. In a plan view, the third well region W3 crossing the third gate electrode G3 may be defined as two parts, and the third source region S3 may be disposed in any one of the two parts, and the third drain region D3 may be disposed in the other part thereof. In other words, in the third well region W3, the third source region S3 and the third drain region D3 may be disposed on both sides of the third gate electrode G3, respectively, with the third gate electrode G3 interposed therebetween. The channel region of the compensation transistor TC may be disposed in a part of the third well region W3 overlapping the third gate electrode G3. The third source region S3 and the third drain region D3 may include the aforementioned first low-concentration impurity region LDD1 and second low-concentration impurity region LDD2, respectively.

As shown in FIG. 17, a fourth source region S4 and a fourth drain region D4 of the initialization transistor TI may be disposed in the fourth well region W4. Each of the fourth source region S4 and the fourth drain region D4 may be a region doped with the aforementioned first type impurities. A fourth gate electrode G4 of the initialization transistor TI may cross and overlap the fourth well region W4. In a plan view, the fourth well region W4 crossing the fourth gate electrode G4 may be defined as two parts, and the fourth source region S4 may be disposed in any one of the two parts, and the fourth drain region D4 may be disposed in the other part thereof. In other words, in the fourth well region W4, the fourth source region S4 and the fourth drain region D4 may be disposed on both sides of the fourth gate electrode G4, respectively, with the fourth gate electrode G4 interposed therebetween. The channel region of the initialization transistor TI may be disposed in a part of the fourth well region W4 overlapping the fourth gate electrode G4. The fourth source region S4 and the fourth drain region D4 may include the aforementioned first low-concentration impurity region LDD1 and second low-concentration impurity region LDD2, respectively.

As shown in FIGS. 17 and 24, a fifth source region S5 and a fifth drain region D5 of the emission control transistor TE may be disposed in the fifth well region W5. Each of the fifth source region S5 and the fifth drain region D5 may be a region doped with the aforementioned first type impurities. A fifth gate electrode G5 of the emission control transistor TE may cross and overlap the fifth well region W5. In a plan view, the fifth well region W5 crossing the fifth gate electrode G5 may be defined as two parts, and the fifth source region S5 may be disposed in any one of the two parts, and the fifth drain region D5 may be disposed in the other part thereof. In other words, in the fifth well region W5, the fifth source region S5 and the fifth drain region D5 may be disposed on both sides of the fifth gate electrode G5, respectively, with the fifth gate electrode G5 interposed therebetween. The channel region CH of the emission control transistor TE may be disposed in a part of the fifth well region W5 overlapping the fifth gate electrode G5. The fifth source region S5 and the fifth drain region D5 may include the aforementioned first low-concentration impurity region LDD1 and second low-concentration impurity region LDD2, respectively.

As shown in FIG. 24, a gate insulating layer GTI may be disposed on each of the well regions W1 to W5. For example, the gate insulating layer GTI may be disposed on the channel region of each well region. As an example, the gate insulating layer GTI may be disposed on the channel region CH of the driving transistor TD in the first well region W1, and may be disposed on the channel region CH of the emission control transistor TE in the fifth well region W5.

The gate insulating layer GTI may be formed of, for example, silicon oxide. The gate insulating layer GTI may be formed by an atomic layer deposition (ALD) method.

As shown in FIGS. 17 and 24, a first gate electrode G1, a second gate electrode G2, a third gate electrode G3, a fourth gate electrode G4, and a fifth gate electrode G5 may be disposed on the gate insulating layer GTI.

The first gate electrode G1 may be disposed on the gate insulating layer GTI to overlap a part of the first well region W1. The first gate electrode G1 may extend in a direction crossing the first well region W1 on the gate insulating layer GTI.

The second gate electrode G2 may be disposed on the gate insulating layer GTI to overlap a part of the second well region W2. The second gate electrode G2 may extend in a direction crossing the second well region W2 on the gate insulating layer GTI.

The third gate electrode G3 may be disposed on the gate insulating layer GTI to overlap a part of the third well region W3. The third gate electrode G3 may extend in a direction crossing the third well region W3 on the gate insulating layer GTI.

The fourth gate electrode G4 may be disposed on the gate insulating layer GTI to overlap a part of the fourth well region W4. The fourth gate electrode G4 may extend in a direction crossing the fourth well region W4 on the gate insulating layer GTI.

The fifth gate electrode G5 may be disposed on the gate insulating layer GTI to overlap a part of the fifth well region W5. The fifth gate electrode G5 may extend in a direction crossing the fifth well region W5 on the gate insulating layer GTI.

The first to fifth gate electrodes G1 to G5 may be formed of, for example, polycrystalline silicon or polycrystalline silicon doped with first type impurities.

As shown in FIG. 24, the first spacer SW1 may be disposed on one side surface of each of the gate electrodes G1 to G5, and the second spacer SW2 may be disposed on the other side surface of each of the gate electrodes G1 to G5. As an example, the first spacer SW1 may be disposed on a first side surface of the first gate electrode G1, and the second spacer SW2 may be disposed on a second side surface of the first gate electrode G1. The first spacer SW1 may be disposed on the first low-concentration impurity region LDD1, and the second spacer SW2 may be disposed on the second low-concentration impurity region LDD2. Each of the first and second spacers SW1 and SW2 may be formed of an oxide layer, a nitride layer, or an oxynitride layer.

As shown in FIG. 24, an ohmic contact layer 120 may be disposed on each of the gate electrodes G1 to G5, each of the source regions S1 to S5, and each of the drain regions D1 to D5. As an example, the ohmic contact layer 120 may be disposed on the first gate electrode G1, the first source region S1, the first drain region D1, the fifth gate electrode G5, the fifth source region S5, and the fifth drain region D5. In this case, the ohmic contact layer 120 may be disposed in a region (e.g., a first high-concentration impurity region) other than the first low-concentration impurity region LDD1 in each of the source regions S1 to S5. Further, the ohmic contact layer 120 may be disposed in a region (e.g., a second high-concentration impurity region) other than the second low-concentration impurity region LDD2 in each of the drain regions D1 to D5.

The ohmic contact layer 120 may be formed of, for example, a silicide layer. For example, the silicide layer may be a cobalt silicide layer. The silicide layer may be manufactured by, for example, a self-aligned silicide process.

As shown in FIG. 24, a passivation layer 135 may be disposed on each ohmic contact layer 120 and each of the spacers SW1 and SW2. For example, the passivation layer 135 may be disposed on the entire surface of the substrate SUB including the ohmic contact layer 120 and the spacers SW1 and SW2. The passivation layer 135 may be formed of, for example, a silicon nitride layer (SiNx).

As shown in FIG. 24, a first interlayer insulating layer VA1 may be disposed on the passivation layer 135. The first interlayer insulating layer VA1 may be disposed on the entire surface of the substrate including the passivation layer 135.

The first interlayer insulating layer VA1 may be formed of, for example, at least one of a silicon oxide layer (SiOx) or a silicon nitride layer (SiNx).

As shown in FIGS. 18 and 24, a first metal layer may be disposed on the first interlayer insulating layer VA1. As in the example shown in FIG. 18, the first metal layer may include a first node electrode NE1, a second node electrode NE2, a third node electrode NE3, a second gate connection electrode GCE2, a third gate connection electrode GCE3, a fourth gate connection electrode GCE4, a fifth gate connection electrode GCE5, a source connection electrode SCE, a drain connection electrode DCE, and a source-drain connection electrode SDCE. As an example, FIG. 24 illustrates that the source connection electrode SCE, the second node electrode NE2, and the third node electrode NE3 are disposed on the first interlayer insulating layer VA1.

As shown in FIG. 18, the first node electrode NE1 may be connected to the first gate electrode G1 of the driving transistor TD and the third source region S3 (or a third source electrode) of the compensation transistor TC through the first type contact hole CTa penetrating the first interlayer insulating layer VA1 and the passivation layer 135.

As shown in FIG. 18, the second node electrode NE2 may be connected to the first drain region D1 (or a first drain electrode) of the driving transistor TD, the third drain region D3 (or a third drain electrode) of the compensation transistor TC, and the fifth source region S5 (or a fifth source electrode) of the emission control transistor TE through the first type contact hole CTa penetrating the first interlayer insulating layer VA1 and the passivation layer 135. For example, as shown in FIG. 24, the second node electrode NE2 may be connected to the first drain region D1 (or the first drain electrode) of the driving transistor TD through a second contact hole CT2 penetrating the first interlayer insulating layer VA1 and the passivation layer 135. In addition, as shown in FIG. 24, the second node electrode NE2 may be connected to the fifth source region S5 (or the fifth source electrode) of the emission control transistor TE through a fourth contact hole CT4 penetrating the first interlayer insulating layer VA1 and the passivation layer 135. The second contact hole CT2 and the fourth contact hole CT4 may belong to the first type contact hole CTa described above.

As shown in FIG. 18, the third node electrode NE3 may be connected to the fourth source region S4 (or a fourth source electrode) of the initialization transistor TI and the fifth drain region D5 (or a fifth drain electrode) of the emission control transistor TE through the first type contact hole CTa penetrating the first interlayer insulating layer VA1 and the passivation layer 135. For example, as shown in FIG. 24, the third node electrode NE3 may be connected to the fifth drain region D5 (or the fifth drain electrode) of the emission control transistor TE through a third contact hole CT3 penetrating the first interlayer insulating layer VA1 and the passivation layer 135. The third contact hole CT3 may belong to the first type contact hole CTa described above.

As shown in FIG. 18, the second gate connection electrode GCE2 may be connected to the second gate electrode G2 of the switching transistor TS through the first type contact hole CTa penetrating the first interlayer insulating layer VA1 and the passivation layer 135.

As shown in FIG. 18, the third gate connection electrode GCE3 may be connected to the third gate electrode G3 of the compensation transistor TC through the first type contact hole CTa penetrating the first interlayer insulating layer VA1 and the passivation layer 135.

As shown in FIG. 18, the fourth gate connection electrode GCE4 may be connected to the fourth gate electrode G4 of the initialization transistor TI through the first type contact hole CTa penetrating the first interlayer insulating layer VA1 and the passivation layer 135.

As shown in FIG. 18, the fifth gate connection electrode GCE5 may be connected to the fifth gate electrode G5 of the emission control transistor TE through the first type contact hole CTa penetrating the first interlayer insulating layer VA1 and the passivation layer 135.

As shown in FIG. 18, the source connection electrode SCE may be connected to the first source region S1 (or a first source electrode) of the driving transistor TD through the first type contact hole CTa penetrating the first interlayer insulating layer VA1 and the passivation layer 135. For example, as shown in FIG. 24, the source connection electrode SCE may be connected to the first source region S1 (or the first source electrode) of the driving transistor TD through a first contact hole CT1 penetrating the first interlayer insulating layer VA1 and the passivation layer 135. The first contact hole CT1 may belong to the first type contact hole CTa described above.

As shown in FIG. 18, the drain connection electrode DCE may be connected to the second drain region D2 (or a second drain electrode) of the switching transistor TS through the first type contact hole CTa penetrating the first interlayer insulating layer VA1 and the passivation layer 135.

As shown in FIG. 18, the source-drain connection electrode SDCE may be connected to the second source region S2 (or the second source electrode) of the switching transistor TS and the fourth drain region D4 (or a fourth drain electrode) of the initialization transistor TI through the first type contact hole CTa penetrating the first interlayer insulating layer VA1 and the passivation layer 135.

The first metal layer may be formed of, for example, tungsten (W).

In one or more embodiments, an adhesive layer and a diffusion barrier layer may be further disposed between the first metal layer and the inner wall of the first type contact hole CTa. The adhesive layer may serve to improve adhesion between the first metal layer and the inner wall of the first contact hole CT1 (e.g., the material of the first interlayer insulating layer VA1). The diffusion barrier layer may serve to prevent diffusion of the first metal layer in the first type contact hole CTa. The adhesive layer may be disposed between the inner wall of the first contact hole CT1 and the first metal layer. The diffusion barrier layer may be disposed between the adhesive layer and the first metal layer.

The adhesive layer may be formed of, for example, titanium. The diffusion barrier layer may be formed of a titanium nitride layer.

As shown in FIG. 24, a second interlayer insulating layer VA2 may be disposed on the first metal layer. For example, the second interlayer insulating layer VA2 may be disposed on the entire surface of the substrate SUB including the first node electrode NE1, the second node electrode NE2, the third node electrode NE3, the second gate connection electrode GCE2, the third gate connection electrode GCE3, the fourth gate connection electrode GCE4, the fifth gate connection electrode GCE5, the source connection electrode SCE, the drain connection electrode DCE, and the source-drain connection electrode SDCE described above.

The second interlayer insulating layer VA2 may be made of the same material as the first interlayer insulating layer VA1 described above.

As shown in FIGS. 19 and 24, a second metal layer may be disposed on the second interlayer insulating layer VA2. As in the example shown in FIG. 19, the second metal layer may include the first gate line GWL, the second gate line GCL, the third gate line GRL, the emission control line EML, a driving connection electrode VDE, a first data connection electrode DTCE1, a first pixel connection electrode PCE1, a first capacitor connection electrode CCE1, and a second capacitor connection electrode CCE2. As an example, FIG. 24 illustrates that the driving connection electrode VDE, the first pixel connection electrode PCE1, and the third gate line GRL are disposed on the second interlayer insulating layer VA2.

As shown in FIG. 19, the first gate line GWL may be connected to the second gate electrode G2 through the second type contact hole CTb penetrating the second interlayer insulating layer VA2.

As shown in FIG. 19, the second gate line GCL may be connected to the third gate electrode G3 through the second type contact hole CTb penetrating the second interlayer insulating layer VA2.

As shown in FIG. 19, the third gate line GRL may be connected to the fourth gate electrode G4 through the second type contact hole CTb penetrating the second interlayer insulating layer VA2.

As shown in FIG. 19, the emission control line EML may be connected to the fifth gate electrode G5 through the second type contact hole CTb penetrating the second interlayer insulating layer VA2.

As shown in FIG. 19, the driving connection electrode VDE may be connected to the source connection electrode SCE through the second type contact hole CTb penetrating the second interlayer insulating layer VA2. For example, as shown in FIG. 24, the driving connection electrode VDE may be connected to the source connection electrode SCE through a fifth contact hole CT5 penetrating the second interlayer insulating layer VA2. The fifth contact hole CT5 may belong to the second type contact hole CTb described above.

As shown in FIG. 19, the first data connection electrode DTCE1 may be connected to the source-drain connection electrode SDCE through the second type contact hole CTb penetrating the second interlayer insulating layer VA2.

As shown in FIG. 19, the first pixel connection electrode PCE1 may be connected to the third node electrode NE3 through the second type contact hole CTb penetrating the second interlayer insulating layer VA2. For example, as shown in FIG. 24, the first pixel connection electrode PCE1 may be connected to the third node electrode NE3 through a sixth contact hole CT6 penetrating the second interlayer insulating layer VA2. The sixth contact hole CT6 may belong to the second type contact hole CTb described above.

As shown in FIG. 19, the first capacitor connection electrode CCE1 may be connected to the first node electrode NE1 through the second type contact hole CTb penetrating the second interlayer insulating layer VA2.

As shown in FIG. 19, the second capacitor connection electrode CCE2 may be connected to the drain connection electrode DCE through the second type contact hole CTb penetrating the second interlayer insulating layer VA2.

The second metal layer may be made of, for example, titanium (Ti) and/or aluminum (Al). In addition, the second metal layer may have, for example, a multilayer structure including titanium and aluminum described above.

In one or more embodiments, an adhesive layer and a diffusion barrier layer may be further disposed between the second metal layer and the inner wall of the second type contact hole CTb. The adhesive layer may serve to improve adhesion between the second metal layer and the inner wall of the second type contact hole CTb (e.g., the material of the second interlayer insulating layer VA2). The diffusion barrier layer may serve to prevent diffusion of the second metal layer in the second type contact hole CTb. The adhesive layer may be disposed between the inner wall of the second type contact hole CTb and the second metal layer. The diffusion barrier layer may be disposed between the adhesive layer and the second metal layer.

The adhesive layer may be formed of, for example, titanium. The diffusion barrier layer may be formed of a titanium nitride layer.

As shown in FIG. 24, a third interlayer insulating layer VA3 may be disposed on the second metal layer. For example, the third interlayer insulating layer VA3 may be disposed on the entire surface of the substrate SUB including the first gate line GWL, the second gate line GCL, the third gate line GRL, the emission control line EML, the driving connection electrode VDE, the first data connection electrode DTCE1, the first pixel connection electrode PCE1, the first capacitor connection electrode CCE1, and the second capacitor connection electrode CCE2 described above.

The third interlayer insulating layer VA3 may be made of the same material as the first interlayer insulating layer VA1 described above.

As shown in FIGS. 20 and 24, a third metal layer may be disposed on the third interlayer insulating layer VA3. As in the example shown in FIG. 20, the third metal layer may include a lower common capacitor electrode CCPEa, a first lower capacitor electrode CPEa1, a second lower capacitor electrode CPEa2, a second data connection electrode DTCE2, and a second pixel connection electrode PCE2. As an example, FIG. 24 illustrates that the lower common capacitor electrode CCPEa, the first lower capacitor electrode CPEa1, the second lower capacitor electrode CPEa2, and the second pixel connection electrode PCE2 are disposed on the third interlayer insulating layer VA3.

As shown in FIG. 20, the lower common capacitor electrode CCPEa may be connected to the first capacitor connection electrode CCE1 through the third type contact hole CTc penetrating the third interlayer insulating layer VA3. The lower common capacitor electrode CCPEa may include at least one first extension electrode EXa1 extending along the first direction DR1 and at least one second extension electrode EXa2 extending along the second direction DR2. The first extension electrode EXa1 and the second extension electrode EXa2 may be integrally formed.

As shown in FIG. 20, the first lower capacitor electrode CPEa1 may be connected to the driving connection electrode VDE through the third type contact hole CTc penetrating the third interlayer insulating layer VA3. For example, as shown in FIG. 24, the first lower capacitor electrode CPEa1 may be connected to the driving connection electrode VDE through a seventh contact hole CT7 and an eighth contact hole CT8 penetrating the third interlayer insulating layer VA3. The seventh contact hole CT7 and the eighth contact hole CT8 may belong to the third type contact hole CTc described above. As shown in FIG. 20, the first lower capacitor electrode CPEa1 may include at least one first extension electrode EXa11 extending along the first direction DR1 and at least one second extension electrode EXa12 extending along the second direction DR2. The first extension electrode EXa11 and the second extension electrode EXa12 may be integrally formed. The first extension electrode EXa11 of the first lower capacitor electrode CPEa1 may be disposed adjacent to the first extension electrode EXa1 of the lower common capacitor electrode CCPEa. The first capacitor C1 may be formed between the lower common capacitor electrode CCPEa and the first lower capacitor electrode CPEa1. For example, the lower common capacitor electrode CCPEa may include the first electrode of the first capacitor C1, and the first lower capacitor electrode CPEa1 may include the second electrode of the first capacitor C1.

As shown in FIG. 20, the second lower capacitor electrode CPEa2 may be connected to the second capacitor connection electrode CCE2 through the third type contact hole CTc penetrating the third interlayer insulating layer VA3. The second lower capacitor electrode CPEa2 may include at least one first extension electrode EXa21 extending along the first direction DR1 and at least one second extension electrode EXa22 extending along the second direction DR2. The first extension electrode EXa21 and the second extension electrode EXa22 may be integrally formed. The first extension electrode EXa21 of the second lower capacitor electrode CPEa2 may be disposed adjacent to the first extension electrode EXa1 of the lower common capacitor electrode CCPEa. The second capacitor C2 may be formed between the lower common capacitor electrode CCPEa and the second lower capacitor electrode CPEa2. For example, the lower common capacitor electrode CCPEa may include the second electrode of the second capacitor C2, and the second lower capacitor electrode CPEa2 may include the first electrode of the second capacitor C2.

As shown in FIG. 20, the second data connection electrode DTCE2 may be connected to the first data connection electrode DTCE1 through the third type contact hole CTc penetrating the third interlayer insulating layer VA3.

As shown in FIG. 20, the second pixel connection electrode PCE2 may be connected to the first pixel connection electrode PCE1 through the third type contact hole CTc penetrating the third interlayer insulating layer VA3. For example, as shown in FIG. 24, the second pixel connection electrode PCE2 may be connected to the first pixel connection electrode PCE1 through a ninth contact hole CT9 penetrating the third interlayer insulating layer VA3. The ninth contact hole CT9 may belong to the third type contact hole CTc described above.

The third metal layer may be made of, for example, titanium (Ti) and/or aluminum (Al). In addition, the third metal layer may have, for example, a multilayer structure including titanium and aluminum described above.

In one or more embodiments, an adhesive layer and a diffusion barrier layer may be further disposed between the third metal layer and the inner wall of the third type contact hole CTc. The adhesive layer may serve to improve adhesion between the third metal layer and the inner wall of the third type contact hole CTc (e.g., the material of the third interlayer insulating layer VA3). The diffusion barrier layer may serve to prevent diffusion of the third metal layer in the third type contact hole CTc. The adhesive layer may be disposed between the inner wall of the third type contact hole CTc and the third metal layer. The diffusion barrier layer may be disposed between the adhesive layer and the third metal layer.

The adhesive layer may be formed of, for example, titanium. The diffusion barrier layer may be formed of a titanium nitride layer.

As shown in FIG. 24, a fourth interlayer insulating layer VA4 may be disposed on the third metal layer. For example, the fourth interlayer insulating layer VA4 may be disposed on the entire surface of the substrate SUB including the lower common capacitor electrode CCPEa, the first lower capacitor electrode CPEa1, the second lower capacitor electrode CPEa2, the second data connection electrode DTCE2, and the second pixel connection electrode PCE2 described above.

The fourth interlayer insulating layer VA4 may be made of the same material as the first interlayer insulating layer VA1 described above.

As shown in FIGS. 21 and 24, a fourth metal layer may be disposed on the fourth interlayer insulating layer VA4. As in the example shown in FIG. 21, the fourth metal layer may include an intermediate common capacitor electrode CCPEb, a first intermediate capacitor electrode CPEb1, a second intermediate capacitor electrode CPEb2, a third data connection electrode DTCE3, and a third pixel connection electrode PCE3. As an example, FIG. 24 illustrates that the intermediate common capacitor electrode CCPEb, the first intermediate capacitor electrode CPEb1, the second intermediate capacitor electrode CPEb2, and the third pixel connection electrode PCE3 are disposed on the fourth interlayer insulating layer VA4.

As shown in FIG. 21, the intermediate common capacitor electrode CCPEb may be connected to the lower common capacitor electrode CCPEa through the fourth type contact hole CTd penetrating the fourth interlayer insulating layer VA4. For example, as shown in FIG. 24, the intermediate common capacitor electrode CCPEb may be connected to the lower common capacitor electrode CCPEa through a thirteenth contact hole CT13 and a fourteenth contact hole CT14 penetrating the fourth interlayer insulating layer VA4. The intermediate common capacitor electrode CCPEb may have the same shape and the same size (e.g., the same size in the first direction DR1, the second direction DR2, and the third direction DR3) as, for example, the lower common capacitor electrode CCPEa described above. For example, as shown in FIG. 21, the intermediate common capacitor electrode CCPEb may include at least one first extension electrode EXb1 extending along the first direction DR1 and at least one second extension electrode EXb2 extending along the second direction DR2. The first extension electrode EXb1 and the second extension electrode EXb2 may be integrally formed.

As shown in FIG. 21, the first intermediate capacitor electrode CPEb1 may be connected to the first lower capacitor electrode CPEa1 through the fourth type contact hole CTd penetrating the fourth interlayer insulating layer VA4. For example, as shown in FIG. 24, the first intermediate capacitor electrode CPEb1 may be connected to the first lower capacitor electrode CPEa1 through a tenth contact hole CT10, an eleventh contact hole CT11, a fifteenth contact hole CT15, and a sixteenth contact hole CT16 penetrating the fourth interlayer insulating layer VA4. The tenth contact hole CT10, the eleventh contact hole CT11, the fifteenth contact hole CT15, and the sixteenth contact hole CT16 may belong to the fourth type contact hole CTd described above. The first intermediate capacitor electrode CPEb1 may have the same shape and the same size (e.g., the same size in the first direction, the second direction, and the third direction) as the first lower capacitor electrode CPEa1. For example, as shown in FIG. 21, the first intermediate capacitor electrode CPEb1 may include at least one first extension electrode EXb11 extending along the first direction DR1 and at least one second extension electrode EXb12 extending along the second direction DR2. The first extension electrode EXb11 and the second extension electrode EXb12 may be integrally formed. The first extension electrode EXb11 of the first intermediate capacitor electrode CPEb1 may be disposed adjacent to the first extension electrode EXb1 of the intermediate common capacitor electrode CCPEb. The first capacitor C1 may be formed between the intermediate common capacitor electrode CCPEb and the first intermediate capacitor electrode CPEb1. For example, the intermediate common capacitor electrode CCPEb may include the first electrode of the first capacitor C1, and the first intermediate capacitor electrode CPEb1 may include the second electrode of the first capacitor C1.

As shown in FIG. 21, the second intermediate capacitor electrode CPEb2 may be connected to the second lower capacitor electrode CPEa2 through the fourth type contact hole CTd penetrating the fourth interlayer insulating layer VA4. The second intermediate capacitor electrode CPEb2 may have the same shape and size (e.g., the same size in the first direction, the second direction, and the third direction) as the second lower capacitor electrode CPEa2. For example, the second intermediate capacitor electrode CPEb2 may include at least one first extension electrode EXb21 extending along the first direction DR1 and at least one second extension electrode EXb22 extending along the second direction DR2. The first extension electrode EXb21 and the second extension electrode EXb22 may be integrally formed. The first extension electrode EXb21 of the second intermediate capacitor electrode CPEb2 may be disposed adjacent to the first extension electrode EXb1 of the intermediate common capacitor electrode CCPEb. The second capacitor C2 may be formed between the intermediate common capacitor electrode CCPEb and the second intermediate capacitor electrode CPEb2. For example, the intermediate common capacitor electrode CCPEb may include the second electrode of the second capacitor C2, and the second intermediate capacitor electrode CPEb2 may include the first electrode of the second capacitor C2.

As shown in FIG. 21, the third data connection electrode DTCE3 may be connected to the second data connection electrode DTCE2 through the fourth type contact hole CTd penetrating the fourth interlayer insulating layer VA4.

As shown in FIG. 21, the third pixel connection electrode PCE3 may be connected to the second pixel connection electrode PCE2 through the fourth type contact hole CTd penetrating the fourth interlayer insulating layer VA4. For example, as shown in FIG. 24, the third pixel connection electrode PCE3 may be connected to the second pixel connection electrode PCE2 through a twelfth contact hole CT12 penetrating the fourth interlayer insulating layer VA4. The twelfth contact hole CT12 may belong to the fourth type contact hole CTd described above.

The fourth metal layer may be made of, for example, titanium (Ti) and/or aluminum (Al). In addition, the fourth metal layer may have, for example, a multilayer structure including titanium and aluminum described above.

In one or more embodiments, an adhesive layer and a diffusion barrier layer may be further disposed between the fourth metal layer and the inner wall of the fourth type contact hole CTd. The adhesive layer may serve to improve adhesion between the fourth metal layer and the inner wall of the fourth type contact hole CTd (e.g., the material of the fourth interlayer insulating layer VA4). The diffusion barrier layer may serve to prevent diffusion of the fourth metal layer in the fourth type contact hole CTd. The adhesive layer may be disposed between the inner wall of the fourth type contact hole CTd and the fourth metal layer. The diffusion barrier layer may be disposed between the adhesive layer and the fourth metal layer.

The adhesive layer may be formed of, for example, titanium. The diffusion barrier layer may be formed of a titanium nitride layer.

As shown in FIG. 24, a fifth interlayer insulating layer VA5 may be disposed on the fourth metal layer. For example, the fifth interlayer insulating layer VA5 may be disposed on the entire surface of the substrate SUB including the intermediate common capacitor electrode CCPEb, the first intermediate capacitor electrode CPEb1, the second intermediate capacitor electrode CPEb2, the third data connection electrode DTCE3, and the third pixel connection electrode PCE3 described above.

The fifth interlayer insulating layer VA5 may be made of the same material as the first interlayer insulating layer VA1 described above.

As shown in FIGS. 22 and 24, a fifth metal layer may be disposed on the fifth interlayer insulating layer VA5. As in the example shown in FIG. 22, the fifth metal layer may include an upper common capacitor electrode CCPEc, a first upper capacitor electrode CPEc1, a second upper capacitor electrode CPEc2, a fourth data connection electrode DTCE4, and a fourth pixel connection electrode PCE4. As an example, FIG. 24 illustrates that the upper common capacitor electrode CCPEc, the first upper capacitor electrode CPEc1, the second upper capacitor electrode CPEc2, and the fourth pixel connection electrode PCE4 are disposed on the fifth interlayer insulating layer VA5.

As shown in FIG. 22, the upper common capacitor electrode CCPEc may be connected to the intermediate common capacitor electrode CCPEb through the fifth type contact hole CTe penetrating the fifth interlayer insulating layer VA5. For example, the upper common capacitor electrode CCPEc may be connected to the intermediate common capacitor electrode CCPEb through a twentieth contact hole CT20 and a twenty-first contact hole CT21 penetrating the fifth interlayer insulating layer VA5. The twentieth contact hole CT20 and the twenty-first contact hole CT21 may belong to the fifth type contact hole CTe. The upper common capacitor electrode CCPEc may have the same shape and the same size (e.g., the same size in the first direction DR1, the second direction DR2, and the third direction DR3) as, for example, the intermediate common capacitor electrode CCPEb described above. For example, as shown in FIG. 22, the upper common capacitor electrode CCPEc may include at least one first extension electrode EXc1 extending along the first direction DR1 and at least one second extension electrode EXc2 extending along the second direction DR2. The first extension electrode EXc1 and the second extension electrode EXc2 may be integrally formed.

As shown in FIG. 22, the first upper capacitor electrode CPEc1 may be connected to the first intermediate capacitor electrode CPEb1 through the fifth type contact hole CTe penetrating the fifth interlayer insulating layer VA5. For example, as shown in FIG. 24, the first upper capacitor electrode CPEc1 may be connected to the first intermediate capacitor electrode CPEb1 through a seventeenth contact hole CT17, an eighteenth contact hole CT18, a twenty-second contact hole CT22, and a twenty-third contact hole CT23 penetrating the fifth interlayer insulating layer VA5. The seventeenth contact hole CT17, the eighteenth contact hole CT18, the twenty-second contact hole CT22, and the twenty-third contact hole CT23 may belong to the fifth type contact hole CTe described above. The first upper capacitor electrode CPEc1 may have the same shape and the same size (e.g., the same size in the first direction, the second direction, and the third direction) as the first intermediate capacitor electrode CPEb1. For example, as shown in FIG. 22, the first upper capacitor electrode CPEc1 may include at least one first extension electrode EXc11 extending along the first direction DR1 and at least one second extension electrode EXc12 extending along the second direction DR2. The first extension electrode EXc11 and the second extension electrode EXc12 may be integrally formed. The first extension electrode EXc11 of the first upper capacitor electrode CPEc1 may be disposed adjacent to the first extension electrode EXc1 of the upper common capacitor electrode CCPEc. The first capacitor C1 may be formed between the upper common capacitor electrode CCPEc and the first upper capacitor electrode CPEc1. For example, the upper common capacitor electrode CCPEc may include the first electrode of the first capacitor C1, and the first upper capacitor electrode CPEc1 may include the second electrode of the first capacitor C1.

As shown in FIG. 22, the second upper capacitor electrode CPEc2 may be connected to the second intermediate capacitor electrode CPEb2 through the fifth type contact hole CTe penetrating the fifth interlayer insulating layer VA5. The second upper capacitor electrode CPEc2 may have the same shape and size (e.g., the same size in the first direction, the second direction, and the third direction) as the second intermediate capacitor electrode CPEb2. For example, the second upper capacitor electrode CPEc2 may include at least one first extension electrode EXc21 extending along the first direction DR1 and at least one second extension electrode EXc22 extending along the second direction DR2. The first extension electrode EXc21 and the second extension electrode EXc22 may be integrally formed. The first extension electrode EXc21 of the second upper capacitor electrode CPEc2 may be disposed adjacent to the first extension electrode EXc1 of the upper common capacitor electrode CCPEc. The second capacitor C2 may be formed between the upper common capacitor electrode CCPEc and the second upper capacitor electrode CPEc2. For example, the upper common capacitor electrode CCPEc may include the second electrode of the second capacitor C2, and the second upper capacitor electrode CPEc2 may include the first electrode of the second capacitor C2.

As shown in FIG. 22, the fourth data connection electrode DTCE4 may be connected to the third data connection electrode DTCE3 through the fifth type contact hole CTe penetrating the fifth interlayer insulating layer VA5.

As shown in FIG. 22, the fourth pixel connection electrode PCE4 may be connected to the third pixel connection electrode PCE3 through the fifth type contact hole CTe penetrating the fifth interlayer insulating layer VA5. For example, as shown in FIG. 24, the fourth pixel connection electrode PCE4 may be connected to the third pixel connection electrode PCE3 through a nineteenth contact hole CT19 penetrating the fifth interlayer insulating layer VA5. The nineteenth contact hole CT19 may belong to the fifth type contact hole CTe described above.

The fifth metal layer may be made of, for example, titanium (Ti) and/or aluminum (Al). In addition, the fifth metal layer may have, for example, a multilayer structure including titanium and aluminum described above.

In one or more embodiments, an adhesive layer and a diffusion barrier layer may be further disposed between the fifth metal layer and the inner wall of the fifth type contact hole CTe. The adhesive layer may serve to improve adhesion between the fifth metal layer and the inner wall of the fifth type contact hole CTe (e.g., the material of the fifth interlayer insulating layer VA5). The diffusion barrier layer may serve to prevent diffusion of the fifth metal layer in the fifth type contact hole CTe. The adhesive layer may be disposed between the inner wall of the fifth type contact hole CTe and the fifth metal layer. The diffusion barrier layer may be disposed between the adhesive layer and the fifth metal layer.

The adhesive layer may be formed of, for example, titanium. The diffusion barrier layer may be formed of a titanium nitride layer.

In one or more embodiments, all of the third metal layer, the fourth metal layer, and the fifth metal layer described above may have the same shape and the same size. Here, the size may mean the size in at least one of the first direction DR1, the second direction DR2, or the third direction DR3.

As shown in FIG. 24, a sixth interlayer insulating layer VA6 may be disposed on the fifth metal layer. For example, the sixth interlayer insulating layer VA6 may be disposed on the entire surface of the substrate SUB including the upper common capacitor electrode CCPEc, the first upper capacitor electrode CPEc1, the second upper capacitor electrode CPEc2, the fourth data connection electrode DTCE4, and the fourth pixel connection electrode PCE4 described above.

The sixth interlayer insulating layer VA6 may be made of the same material as the first interlayer insulating layer VA1 described above.

As shown in FIGS. 23 and 24, a sixth metal layer may be disposed on the sixth interlayer insulating layer VA6. As in the example shown in FIGS. 23 and 24, the sixth metal layer may include the driving voltage line VDL, the data line DL, and a fifth pixel connection electrode PCE5.

As shown in FIG. 23, the driving voltage line VDL may be connected to the first upper capacitor electrode CPEc1 through the sixth type contact hole CTf penetrating the sixth interlayer insulating layer VA6. For example, as shown in FIG. 24, the driving voltage line VDL may be connected to the first upper capacitor electrode CPEc1 through a twenty-fourth contact hole CT24, a twenty-fifth contact hole CT25, a twenty-sixth contact hole CT26, and a twenty-seventh contact hole CT27 penetrating the sixth interlayer insulating layer VA6. The twenty-fourth contact hole CT24, the twenty-fifth contact hole CT25, the twenty-sixth contact hole CT26, and the twenty-seventh contact hole CT27 may belong to the sixth type contact hole CTf.

As shown in FIG. 23, the data line DL may be connected to the fourth data connection electrode DTCE4 through the sixth type contact hole CTf penetrating the sixth interlayer insulating layer VA6.

As shown in FIG. 23, the fifth pixel connection electrode PCE5 may be connected to the fourth pixel connection electrode PCE4 through the sixth type contact hole CTf penetrating the sixth interlayer insulating layer VA6. For example, as shown in FIG. 24, the fifth pixel connection electrode PCE5 may be connected to the fourth pixel connection electrode PCE4 through a twenty-eighth contact hole CT28 penetrating the sixth interlayer insulating layer VA6. The twenty-eighth contact hole CT28 may belong to the sixth type contact hole CTf described above.

The sixth metal layer may be made of, for example, titanium (Ti) and/or aluminum (Al). In addition, the sixth metal layer may have, for example, a multilayer structure including titanium and aluminum described above.

In one or more embodiments, an adhesive layer and a diffusion barrier layer may be further disposed between the sixth metal layer and the inner wall of the sixth type contact hole CTf. The adhesive layer may serve to improve adhesion between the sixth metal layer and the inner wall of the sixth type contact hole CTf (e.g., the material of the sixth interlayer insulating layer VA6). The diffusion barrier layer may serve to prevent diffusion of the sixth metal layer in the sixth type contact hole CTf. The adhesive layer may be disposed between the inner wall of the sixth type contact hole CTf and the sixth metal layer. The diffusion barrier layer may be disposed between the adhesive layer and the sixth metal layer.

The adhesive layer may be formed of, for example, titanium. The diffusion barrier layer may be formed of a titanium nitride layer.

As shown in FIG. 24, a seventh interlayer insulating layer VA7 may be disposed on the sixth metal layer. For example, the seventh interlayer insulating layer VA7 may be disposed on the entire surface of the substrate SUB including the driving voltage line VDL, the data line DL, and the fifth pixel connection electrode PCE5 described above.

The seventh interlayer insulating layer VA7 may be made of the same material as the first interlayer insulating layer VA1 described above.

As shown in FIG. 24, the light emitting element layer EMTL including the pixel electrode PE may be disposed on the seventh interlayer insulating layer VA7. The pixel electrode PE may be connected to the fifth pixel connection electrode PCE5 through a seventh type contact hole penetrating the seventh interlayer insulating layer VA7. In other words, the pixel electrode PE may be connected to the fifth pixel connection electrode PCE5 through a twenty-ninth contact hole CT29 penetrating the seventh interlayer insulating layer VA7. The twenty-ninth contact hole CT29 may belong to the seventh type contact hole described above.

The above-described light emitting element layer EMTL may include the plurality of light emitting elements LEL having a plurality of pixel electrodes PE and a bank PDL (or the pixel defining layer) defining a plurality of emission areas EA.

The light emitting elements LEL may include, for example, a first light emitting element (e.g., LEL), a second light emitting element, and a third light emitting element. The first light emitting element LEL may include a first pixel electrode (e.g., PE), a first light emitting layer (e.g., EL) and a common electrode CM. The second light emitting element may include a second pixel electrode, a second light emitting layer and a common electrode CM. The third light emitting element may include a third pixel electrode, a light emitting layer, and a common electrode CM.

A first emission area (e.g., EA), in which the first pixel electrode PE, the first light emitting layer EL, and the common electrode CM are sequentially stacked, indicates an area in which holes from the first pixel electrode PE and electrons from the common electrode CM are combined with each other in the light emitting layer to emit light. In this case, the first pixel electrode PE may be an anode electrode of the first light emitting element LEL, and the common electrode CM may be a cathode electrode of the first light emitting element LEL.

In a top emission structure that emits light toward the common electrode CM with respect to the first light emitting layer EL, the first pixel electrode PE may be formed of a single layer of molybdenum (Mo), titanium (Ti), copper (Cu), or aluminum (Al), or may be formed to have a laminated structure of aluminum and/or titanium (Ti/Al/Ti), a laminated structure of aluminum and ITO (ITO/Al/ITO), an APC alloy, and/or a laminated structure of APC alloy and ITO (ITO/APC/ITO) to increase the reflectivity. The APC alloy may be an alloy of silver (Ag), palladium (Pd) and copper (Cu).

The bank PDL (or the pixel defining layer) may define each emission area of each pixel PX. To this end, the bank PDL may be disposed to expose a partial region of each of the first pixel electrode PE, the second pixel electrode, and the third pixel electrode on, for example, the seventh interlayer insulating layer VA7. The bank PDL may cover the edge of each of the first pixel electrode PE, the second pixel electrode, and the third pixel electrode. In one or more embodiments, the bank PDL may be disposed in the seventh type contact hole (e.g., CT29) penetrating the seventh interlayer insulating layer VA7. Accordingly, the twenty-ninth contact hole CT29 penetrating the seventh interlayer insulating layer VA7 may be filled with the bank PDL. The bank PDL may be formed of an organic layer such as acryl resin, epoxy resin, phenolic resin, polyamide resin, polyimide resin, and the like.

As shown in FIG. 24, a spacer SPC may be disposed on the bank PDL. The spacer SPC may serve to support a mask during a process of manufacturing the light emitting layer (e.g., EL). The spacer SPC may be formed of an organic layer such as acryl resin, epoxy resin, phenolic resin, polyamide resin, polyimide resin and the like.

The first light emitting layer EL may be formed on the first pixel electrode PE. The first light emitting layer EL may include an organic material to emit light in a desired color (e.g., a predetermined color). For example, the first light emitting layer EL may include a hole transporting layer, an organic material layer, and an electron transporting layer. The organic material layer may include a host and a dopant. The organic material layer may include a material that emits desired light (e.g., predetermined light), and may be formed using a phosphorescent material or a fluorescent material.

For example, the organic material layer of the first light emitting layer EL in the first emission area EA, which emits light of a first color (e.g., blue), may include a host material having CBP or mCP, and may be a phosphorescent material including a dopant material having (4,6-F2ppy) 2Irpic or L2BD111, but the present disclosure is not limited thereto.

An organic material layer of a second light emitting layer of a second emission area EA2 emitting light of a second color (e.g., green) may be a phosphorescent material including a host material including CBP or mCP, and a dopant material including Ir(ppy)3(fac tris(2-phenylpyridine) iridium. Alternatively, the organic material layer of the second light emitting layer of the second emission area EA2 emitting the light of the second color may be a fluorescent material including tris(8-hydroxyquinolino)aluminum (Alq3), but the present disclosure is not limited thereto.

For example, an organic material layer of a third light emitting layer of a third emission area EA3 emitting light of a third color (e.g., red) may be a phosphorescent material including a host material including carbazole biphenyl (CBP) or mCP (1,3-bis(carbazol-9-yl), and a dopant including at least one selected from the group consisting of PIQIr(acac)(bis(1-phenylisoquinoline)acetylacetonate iridium), PQIr(acac)(bis(1-phenylquinoline) acetylacetonate iridium), PQIr(tris(1-phenylquinoline)iridium)) and PtOEP (octaethylporphyrin platinum). Alternatively, the organic material layer of the third light emitting layer of the third emission area EA3 may be a fluorescent material including PBD:Eu(DBM)3(Phen) or Perylene, but the present disclosure is not limited thereto.

The common electrode CM may be disposed on the first emission layer EL, the second emission layer, and the third emission layer. The common electrode CM may be disposed to cover the first, second, and third light emitting layers. The common electrode CM may be a common layer commonly disposed in the first to third light emitting layers. A capping layer may be formed on the common electrode CM.

In the top emission structure, the common electrode CM may be formed of a transparent conductive material (TCO) such as ITO or IZO capable of transmitting light or a semi-transmissive conductive material such as magnesium (Mg), silver (Ag), or an alloy of magnesium (Mg) and silver (Ag). When the common electrode CM is formed of a semi-transmissive conductive material, the light emission efficiency can be increased due to a micro-cavity effect.

The encapsulation layer ENC may be formed on the light emitting element layer EMTL. The encapsulation layer ENC may include at least one inorganic layer TFE1 and TFE3 to prevent oxygen or moisture from permeating into the light emitting element layer EMTL. In addition, the encapsulation layer ENC may include at least one organic layer to protect the light emitting element layer EMTL from foreign substances such as dust. For example, the encapsulation layer ENC may include a first inorganic encapsulation layer TFE1, an organic encapsulation layer TFE2, and a second inorganic encapsulation layer TFE3.

The first inorganic encapsulation layer TFE1 may be disposed on the common electrode CM, the organic encapsulation layer TFE2 may be disposed on the first inorganic encapsulation layer TFE1, and the second inorganic encapsulation layer TFE3 may be disposed on the organic encapsulation layer TFE2. The first inorganic encapsulation layer TFE1 and the second inorganic encapsulation layer TFE3 may be formed of multiple layers in which one or more inorganic layers of a silicon nitride layer, a silicon oxynitride layer, a silicon oxide layer, a titanium oxide layer and an aluminum oxide layer are alternately stacked. The encapsulation organic layer TFE2 may be an organic layer such as acryl resin, epoxy resin, phenolic resin, polyamide resin, polyimide resin or the like.

Figure 25:
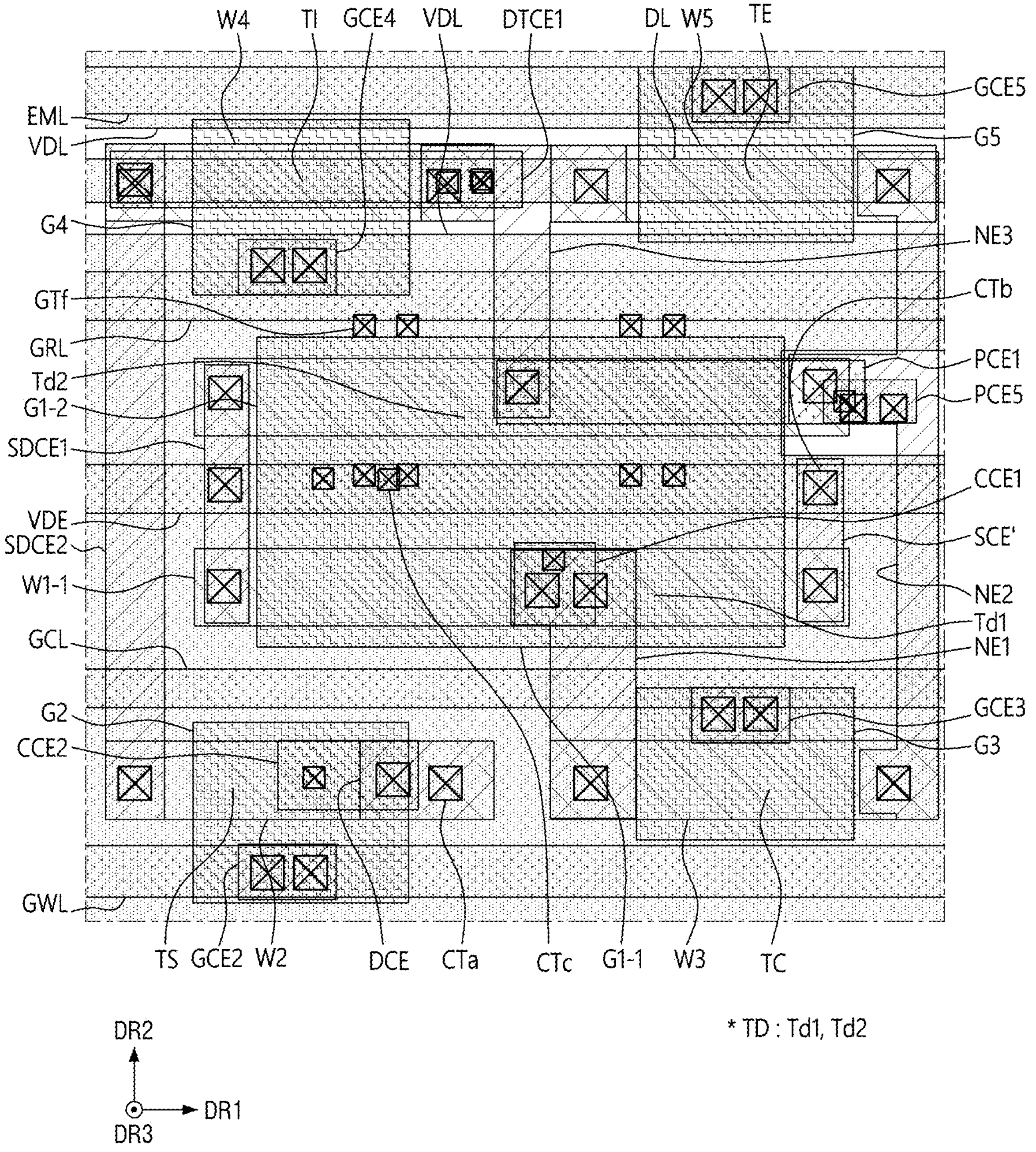
FIG. 25 is a plan view of a pixel array according to one or more embodiments.
Figure 26:
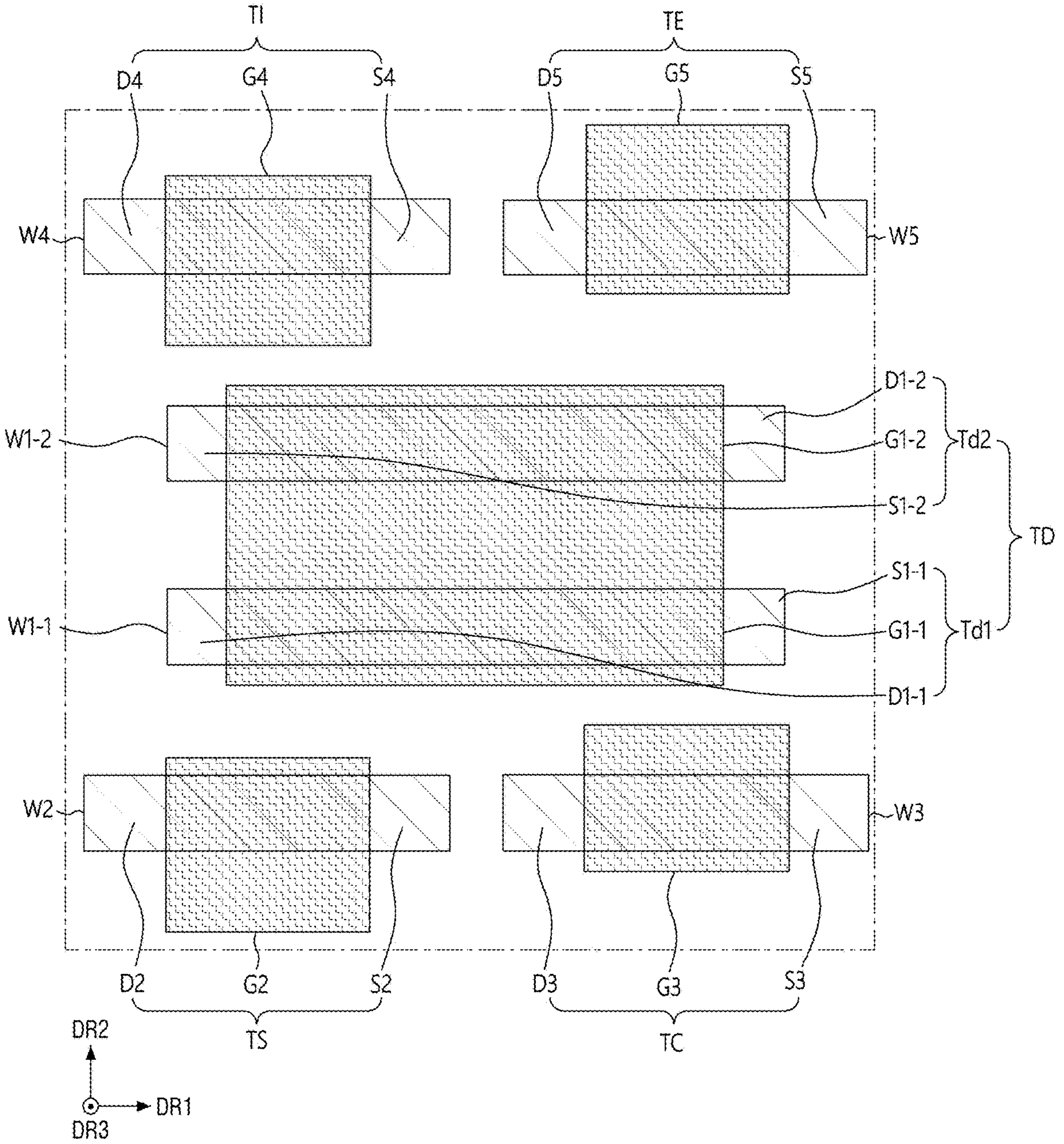
FIG. 26 is a view selectively illustrating well regions and gate electrodes from among the components of FIG. 25.
Figure 27:
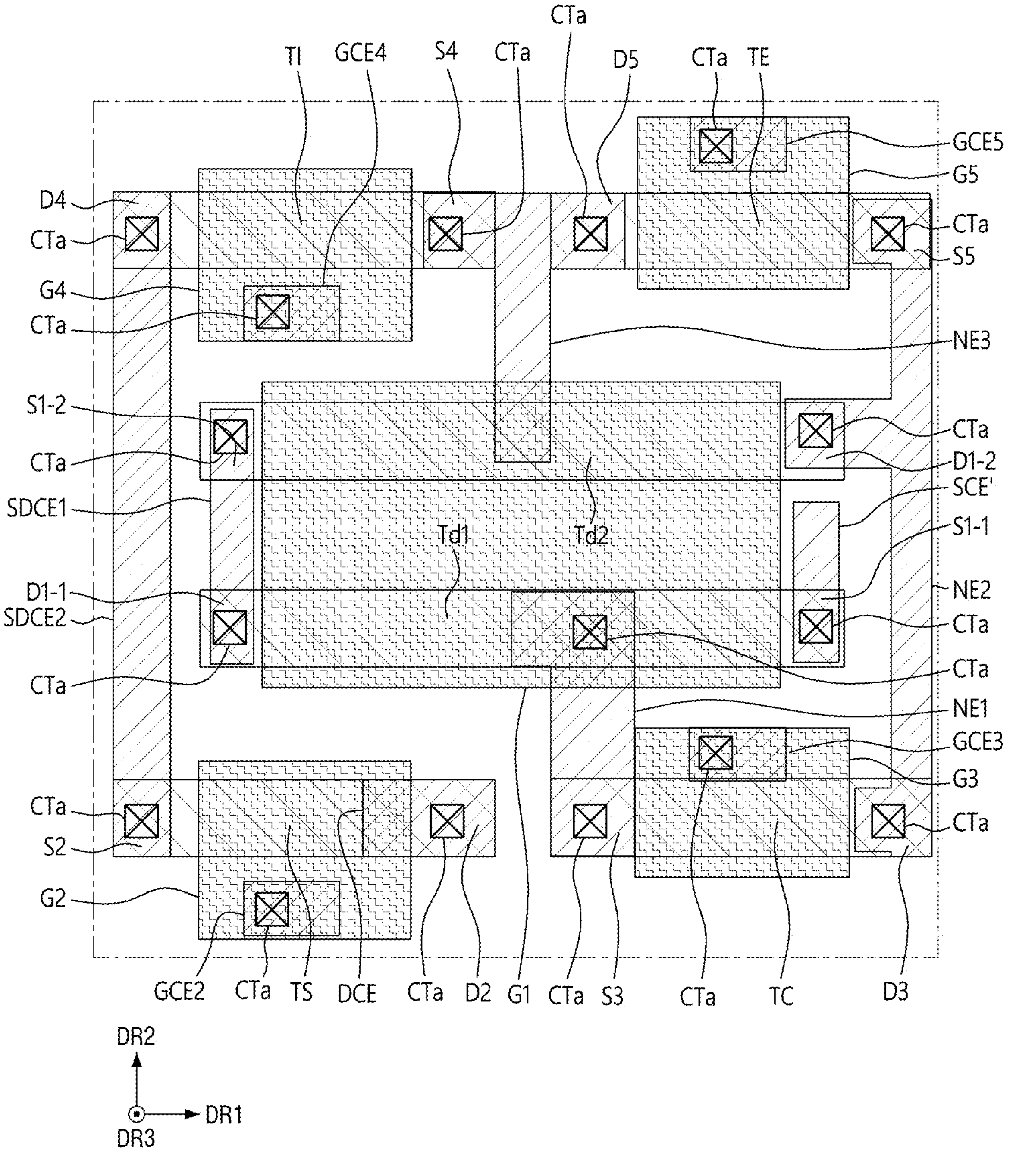
FIG. 27 is a view selectively illustrating only well regions, gate electrodes, a first metal layer, and the first type contact hole from among the components of FIG. 25.

FIG. 25 is a plan view of a pixel array according to one or more embodiments. FIG. 26 is a view selectively illustrating only well regions and gate electrodes from among the components of FIG. 25. FIG. 27 is a view selectively illustrating well regions, gate electrodes, a first metal layer, and the first type contact hole CTa from among the components of FIG. 25.

Because the embodiment of FIGS. 25 to 27 is different from the embodiment of FIGS. 16-18 in that the driving transistor TD includes a dual-gate transistor having a first sub-transistor Td1 and a second sub-transistor Td2, the following description will focus on the difference.

The first sub-transistor Td1 of the driving transistor TD may include a first-first gate electrode G1-1, and a first-first source region S1-1 and a first-first drain region D1-1 of a first-first well region W1-1. The first-first well region W1-1 may be a region doped with the above-described second type impurities. Further, the first-first source region S1-1 and the first-first drain region D1-1 may be regions doped with the above-described first type impurities.

The first-first gate electrode G1-1 of the first sub-transistor Td1 may cross and overlap the first-first well region W1-1. In a plan view, the first-first well region W1-1 crossing the first-first gate electrode G1-1 may be defined as two parts. The first-first source region S1-1 may be disposed in any one of the two parts, and the first-first drain region D1-1 may be disposed in the other part thereof. In other words, in the first-first well region W1-1, the first-first source region S1-1 and the first-first drain region D1-1 may be disposed on both sides of the first-first gate electrode G1-1, respectively, with the first-first gate electrode G1-1 interposed therebetween. A channel region of the first sub-transistor Td1 may be disposed in a region of the first-first well region W1-1, which overlaps the first-first gate electrode G1-1.

The second sub-transistor Td2 of the driving transistor TD may include a first-second gate electrode G1-2, and a first-second source region S1-2 and a first-second drain region D1-2 of a first-second well region W1-2. The first-second well region W1-2 may be a region doped with the above-described second type impurities. Further, the first-second source region S1-2 and the first-second drain region D1-2 may be regions doped with the above-described first type impurities.

The first-second gate electrode G1-2 of the second sub-transistor Td2 may cross and overlap the first-second well region W1-2. In a plan view, the first-second well region W1-2 crossing the first-second gate electrode G1-2 may be defined as two parts. The first-second source region S1-2 may be disposed in any one of the two parts, and the first-second drain region D1-2 may be disposed in the other part thereof. In other words, in the first-second well region W1-2, the first-second source region S1-2 and the first-second drain region D1-2 may be disposed on both sides of the first-second gate electrode G1-2, respectively, with the first-second gate electrode G1-2 interposed therebetween. A channel region of the second sub-transistor Td2 may be disposed in a region of the first-second well region W1-2, which overlaps the first-second gate electrode G1-2.

As shown in FIGS. 25 and 27, a source connection electrode SCE' may be connected to the first-first source region S1-1 through the first type contact hole CTa penetrating the first interlayer insulating layer VA1 and the passivation layer 135.

As shown in FIGS. 25 and 27, a first source-drain connection electrode SDCE1 may be connected to the first-first drain region D1-1 and the first-second source region S1-2 through the first type contact hole CTa penetrating the first interlayer insulating layer VA1 and the passivation layer 135.

As shown in FIGS. 25 and 27, the second node electrode NE2 may be connected to the first-second drain region D1-2 through the first type contact hole CTa penetrating the first interlayer insulating layer VA1 and the passivation layer 135.

A second source-drain connection electrode SDCE2 of FIGS. 25 and 27 is the same as the source-drain connection electrode SDCE of FIG. 16.

As shown in FIG. 25, the driving connection electrode VDE may be connected to the source connection electrode SCE' through the second type contact hole CTb penetrating the second interlayer insulating layer VA2.

Another structure of the light emitting element LEL (e.g., LEL of FIG. 24) will be described with reference to FIGS. 28 to 35.

Figure 28:
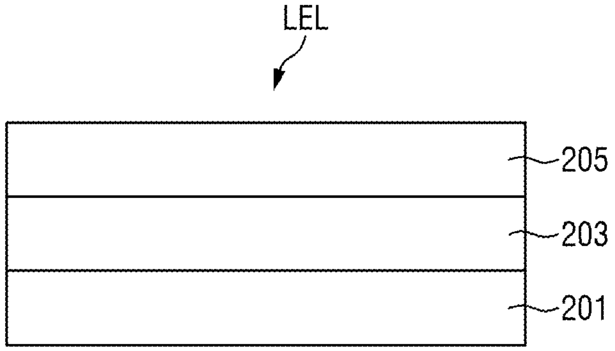
FIG. 28 is a cross-sectional view illustrating a structure of a display element according to one or more embodiments.

FIG. 28 is a cross-sectional view illustrating a structure of a display element according to one or more embodiments, and FIGS. 29 to 32 are cross-sectional views illustrating a structure of the light emitting element LEL according to one or more embodiments.

Referring to FIG. 28, the light emitting element LEL (e.g., an organic light emitting diode) according to one or more embodiments may include a pixel electrode 201, a common electrode 205, and an intermediate layer 203 between the pixel electrode 201 and the common electrode 205 described above.

The pixel electrode 201 may include a light-transmitting conductive oxide such as indium tin oxide (ITO), indium zinc oxide (IZO), zinc oxide (ZnO), indium oxide ($In_2O_3$), indium gallium oxide (IGO), and/or aluminum zinc oxide (AZO). The pixel electrode 201 may include a reflective layer containing silver (Ag), magnesium (Mg), aluminum (Al), platinum (Pt), palladium (Pd), gold (Au), nickel (Ni), neodymium (Nd), iridium (Ir), chromium (Cr), and/or a compound thereof. For example, the pixel electrode 201 may have a three-layer structure of ITO/Ag/ITO.

The common electrode 205 may be disposed on the intermediate layer 203. The common electrode 205 may include a low work function metal, an alloy, an electrically conductive compound, or any combination thereof. For example, the common electrode 205 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, and/or any combination thereof. The common electrode 205 may be a transmissive electrode, a semi-transmissive electrode, and/or a reflective electrode.

The intermediate layer 203 may include a high molecular material or a low molecular material that emits light of a suitable color (e.g., a predetermined color). In addition to various organic materials, the intermediate layer 203 may further include metal-containing compounds such as organometallic compounds, inorganic materials such as quantum dots, and the like.

In one or more embodiments, the intermediate layer 203 may include one light emitting layer and a first functional layer and a second functional layer respectively disposed below and above the one light emitting layer. The first functional layer may include, for example, a hole transport layer HTL or may include the hole transport layer HTL and a hole injection layer HIL. The second functional layer is a component disposed on the light emitting layer and is optional. For example, the intermediate layer 203 may include or may not include the second functional layer. The second functional layer may include an electron transport layer ETL and/or an electron injection layer EIL.

In one or more embodiments, the intermediate layer 203 may include two or more light emitting units EL1 and EL2 that are sequentially stacked between the pixel electrode 201 and the common electrode 205, and a charge generation layer CGL disposed between the two light emitting units EL1 and EL2. When the intermediate layer 203 includes a light emitting unit and a charge generation layer, the light emitting element LEL (e.g., an organic light emitting diode) may be a tandem light emitting element. The light emitting element LEL (e.g., an organic light emitting diode) may improve color purity and luminous efficiency by having a stacked structure of a plurality of light emitting units.

One light emitting unit may include a light emitting layer and a first functional layer and a second functional layer respectively disposed below and above the light emitting layer. The charge generation layer CGL may include a negative charge generation layer and a positive charge generation layer. The luminous efficiency of an organic light emitting diode, which is a tandem light emitting element having a plurality of light emitting layers, may be further increased by the negative charge generation layer and the positive charge generation layer.

The negative charge generation layer may be an n-type charge generation layer. The negative charge generation layer may supply electrons. The negative charge generation layer may include a host and a dopant. The host may include an organic material. The dopant may include a metal material. The positive charge generation layer may be a p-type charge generation layer. The positive charge generation layer may supply holes. The positive charge generation layer may include a host and a dopant. The host may include an organic material. The dopant may include a metal material.

Figure 29:
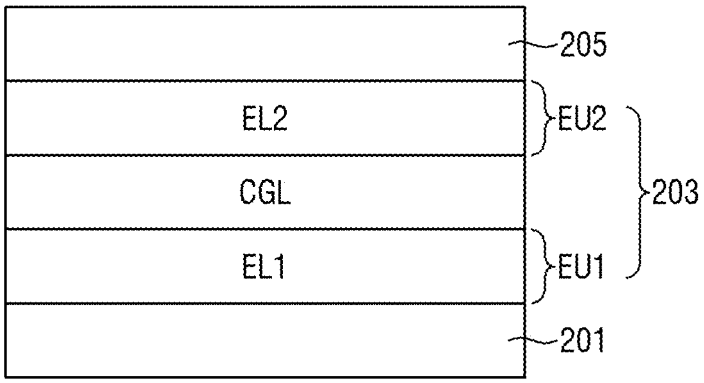
FIGS. 29 to 32 are cross-sectional views illustrating a structure of the light emitting element LEL according to one or more embodiments.

In one or more embodiments, as illustrated in FIG. 29, the light emitting element LEL (e.g., an organic light emitting diode) may include a first light emitting unit EU1 including a first light emitting layer EL1 and a second light emitting unit EU2 including a second light emitting layer EL2 that are sequentially stacked. The charge generation layer CGL may be disposed between the first light emitting unit EU1 and the second light emitting unit EU2. For example, the light emitting element LEL (e.g., an organic light emitting diode) may include the pixel electrode 201, the first light emitting layer EL1, the charge generation layer CGL, the second light emitting layer EL2, and the common electrode 205 that are sequentially stacked. The first functional layer and the second functional layer may be disposed on and under the first light emitting layer EL1, respectively. The first functional layer and the second functional layer may be included below and above the second light emitting layer EL2, respectively. The first light emitting layer EL1 may be a blue light emitting layer, and the second light emitting layer EL2 may be a yellow light emitting layer.

Figure 30:
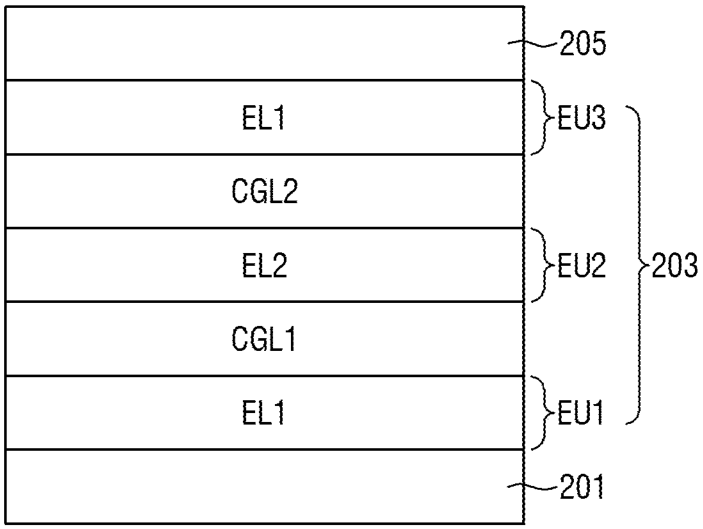

In one or more embodiments, as illustrated in FIG. 30, the light emitting element LEL (e.g., an organic light emitting diode) may include the first light emitting unit EU1 and the third light emitting unit EU3 including the first light emitting layer EL1, and the second light emitting unit EU2 including the second light emitting layer EL2. The first charge generation layer CGL1 may be disposed between the first light emitting unit EU1 and the second light emitting unit EU2, and the second charge generation layer CGL2 may be disposed between the second light emitting unit EU2 and the third light emitting unit EU3. For example, the light emitting element LEL (e.g., an organic light emitting diode) may include the pixel electrode 201, the first light emitting layer EL1, the first charge generation layer CGL1, the second light emitting layer EL2, the second charge generation layer CGL2, the first light emitting layer EL1, and the common electrode 205 that are sequentially stacked. The first functional layer and the second functional layer may be disposed on and under the first light emitting layer EL1, respectively. The first functional layer and the second functional layer may be disposed on and below the second light emitting layer EL2, respectively. The first light emitting layer EL1 may be a blue light emitting layer, and the second light emitting layer EL2 may be a yellow light emitting layer.

In one or more embodiments, in the light emitting element LEL (e.g., an organic light emitting diode), the second light emitting unit EU2 may further include a third light emitting layer EL3 and/or a fourth light emitting layer EL4 in direct contact with the second light emitting layer EL2 below and/or above the second light emitting layer EL2, in addition to the second light emitting layer EL2. Here, direct contact may mean that no other layer is disposed between the second light emitting layer EL2 and the third light emitting layer EL3 and/or between the second light emitting layer EL2 and the fourth light emitting layer EL4. The third light emitting layer EL3 may be a red light emitting layer, and the fourth light emitting layer EL4 may be a green light emitting layer.

Figure 31:
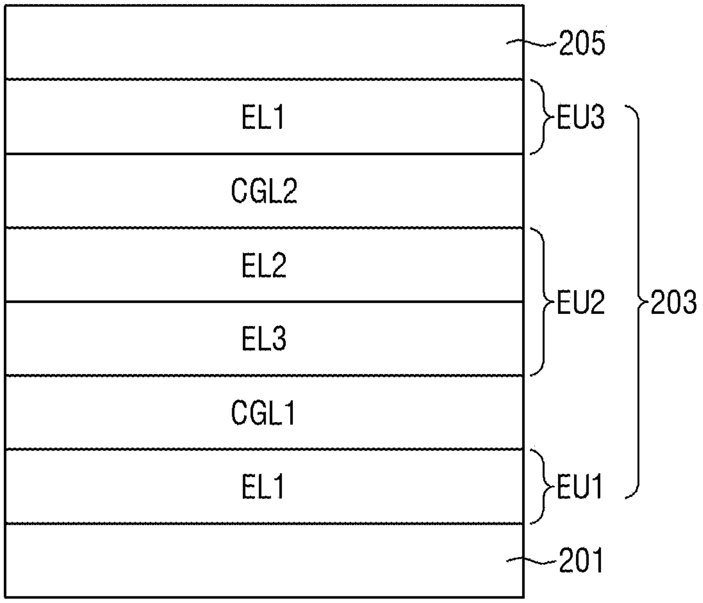

For example, as illustrated in FIG. 31, the light emitting element LEL (e.g., an organic light emitting diode) may include the pixel electrode 201, the first light emitting layer EL1, the first charge generation layer CGL1, the third light emitting layer EL3, the second light emitting layer EL2, the second charge generation layer CGL2, the first light emitting layer EL1, and the common electrode 205 that are sequentially stacked. Alternatively, as illustrated in FIG. 29, the light emitting element LEL (e.g., an organic light emitting diode) may include the pixel electrode 201, the first light emitting layer EL1, the first charge generation layer CGL1, the third light emitting layer EL3, the second light emitting layer EL2, the fourth light emitting layer EL4, the second charge generation layer CGL2, the first light emitting layer EL1, and the common electrode 205 that are sequentially stacked.

Figure 32:
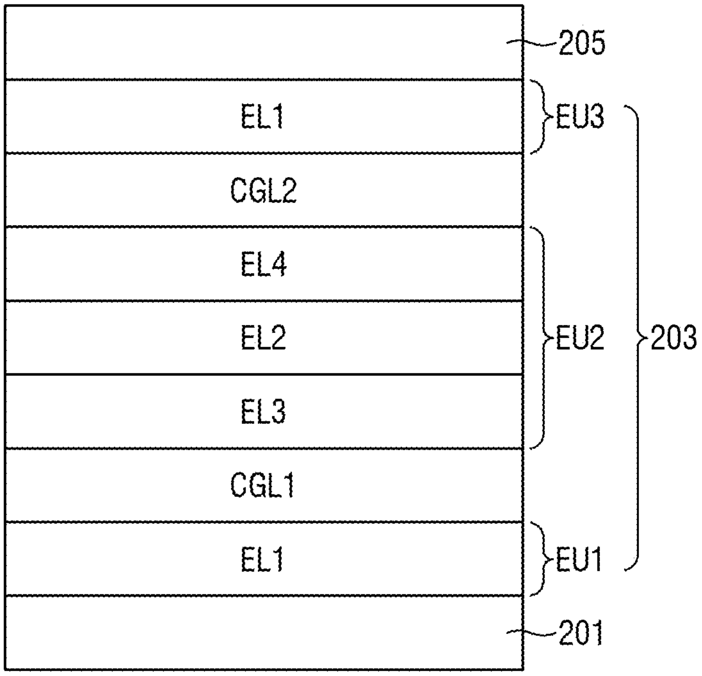
Figure 33:
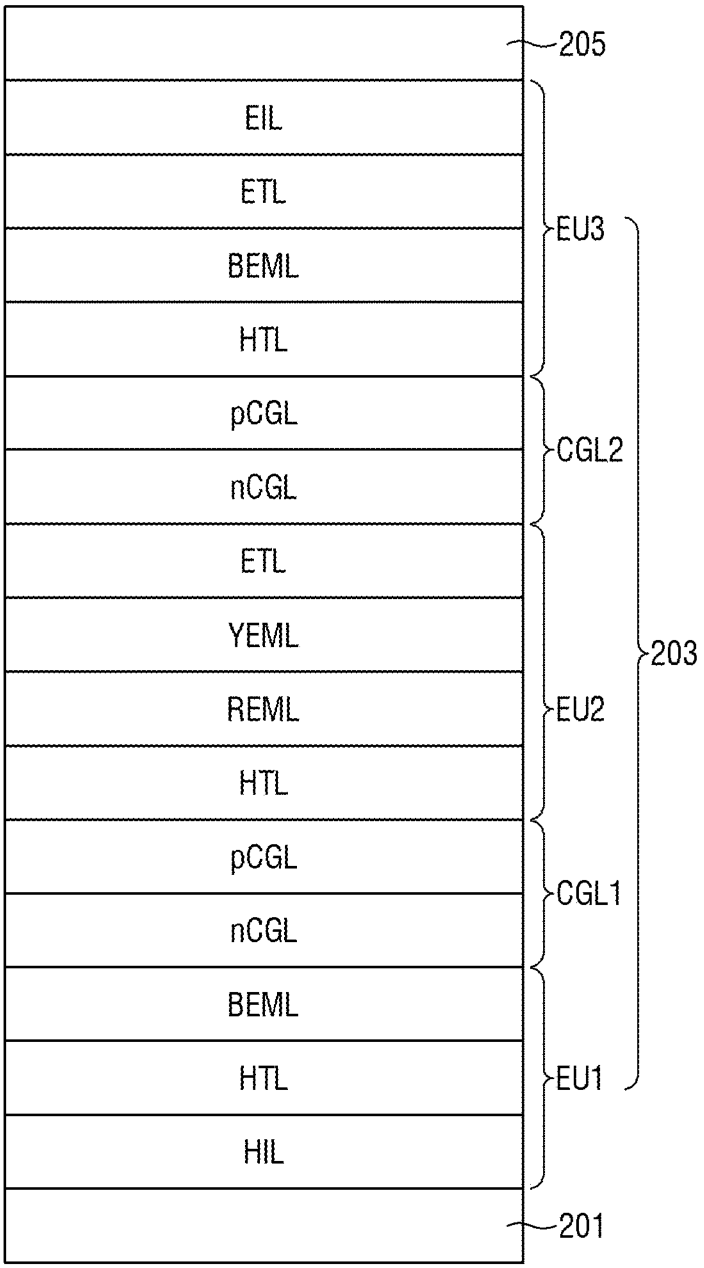
FIG. 33 is a cross-sectional view illustrating an example of the organic light emitting diode of FIG. 31.
Figure 34:
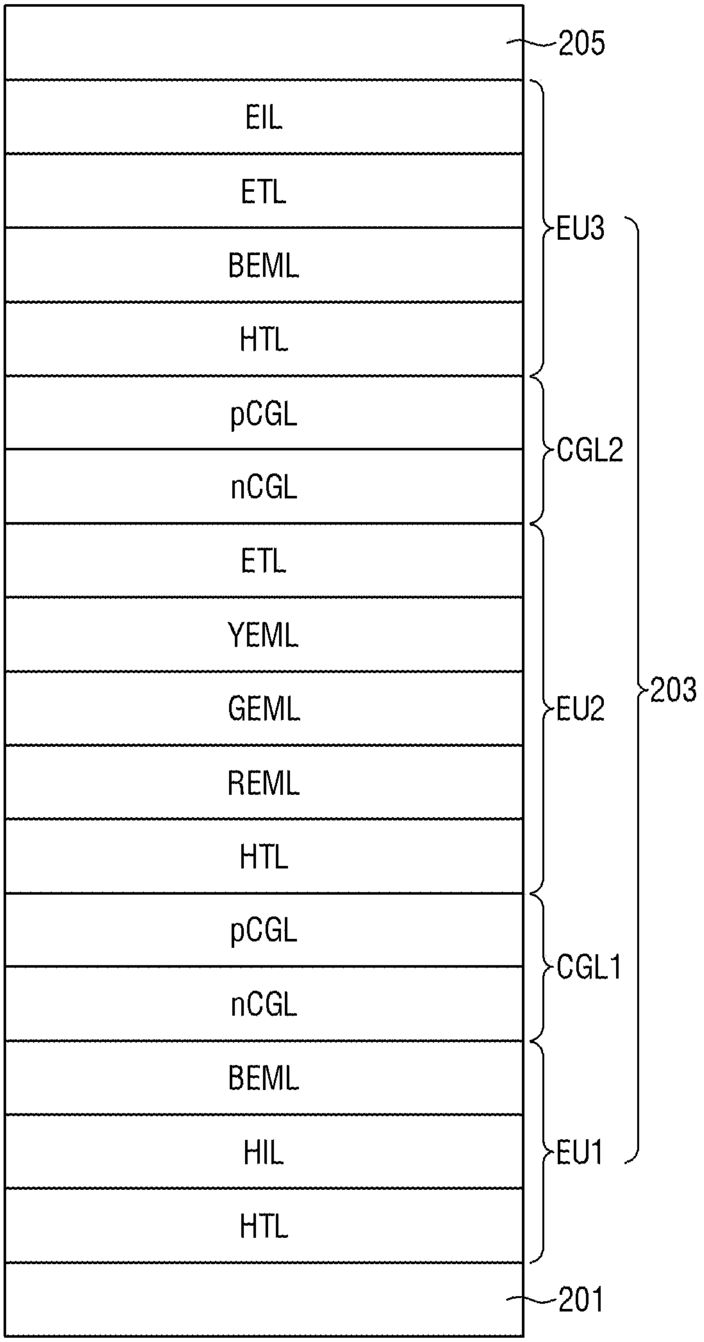
FIG. 34 is a cross-sectional view illustrating an example of the organic light emitting diode of FIG. 32.

FIG. 33 is a cross-sectional view illustrating an example of the organic light emitting diode of FIG. 31, and FIG. 34 is a cross-sectional view illustrating an example of the organic light emitting diode of FIG. 32.

Referring to FIG. 33, the light emitting element LEL (e.g., an organic light emitting diode) may include the first light emitting unit EU1, the second light emitting unit EU2, and the third light emitting unit EU3 that are sequentially stacked. The first charge generation layer CGL1 may be disposed between the first light emitting unit EU1 and the second light emitting unit EU2, and the second charge generation layer CGL2 may be disposed between the second light emitting unit EU2 and the third light emitting unit EU3. The first charge generation layer CGL1 and the second charge generation layer CGL2 may include a negative charge generation layer nCGL and a positive charge generation layer pCGL, respectively.

The first light emitting unit EU1 may include a blue light emitting layer BEML. The first light emitting unit EU1 may further include the hole injection layer HIL and the hole transport layer HTL between the pixel electrode 201 and the blue light emitting layer BEML. In one or more embodiments, a p-doped layer may be further included between the hole injection layer HIL and the hole transport layer HTL. The P-doped layer may be formed by doping the hole injection layer HIL with a p-type doping material. In one or more embodiments, at least one of a blue light auxiliary layer, an electron blocking layer, or a buffer layer may be further included between the blue light emitting layer BEML and the hole transport layer HTL. The blue light auxiliary layer may increase light emission efficiency of the blue light emitting layer BEML. The blue light auxiliary layer may increase light emission efficiency of the blue light emitting layer BEML by adjusting hole charge balance. The electron blocking layer may prevent electron injection into the hole transport layer HTL. The buffer layer may compensate for a resonance distance according to a wavelength of light emitted from the light emitting layer.

The second light emitting unit EU2 may include a yellow light emitting layer YEML and a red light emitting layer REML in direct contact with the yellow light emitting layer YEML below the yellow light emitting layer YEML. The second light emitting unit EU2 may further include the hole transport layer HTL between the positive charge generation layer pCGL of the first charge generation layer CGL1 and the red light emitting layer REML, and may further include the electron transport layer ETL between the yellow light emitting layer YEML and the negative charge generation layer nCGL of the second charge generation layer CGL2.

The third light emitting unit EU3 may include the blue light emitting layer BEML. The third light emitting unit EU3 may further include the hole transport layer HTL between the positive charge generation layer pCGL of the second charge generation layer CGL2 and the blue light emitting layer BEML. The third light emitting unit EU3 may further include the electron transport layer ETL and the electron injection layer EIL between the blue light emitting layer BEML and the common electrode 205. The electron transport layer ETL may have a single layer or a multilayer. In one or more embodiments, at least one of a blue light auxiliary layer, an electron blocking layer, or a buffer layer may be further included between the blue light emitting layer BEML and the hole transport layer HTL. At least one of a hole blocking layer or a buffer layer may be further included between the blue light emitting layer BEML and the electron transport layer ETL. The hole blocking layer may prevent hole injection into the electron transport layer ETL.

The light emitting element LEL (e.g., an organic light emitting diode) illustrated in FIG. 34 is different from the light emitting element LEL (e.g., an organic light emitting diode) illustrated in FIG. 33 in the stacked structure of the second light emitting unit EU2, and other configurations are the same. Referring to FIG. 34, the second light emitting unit EU2 may include the yellow light emitting layer YEML, the green light emitting layer GEML in direct contact with the yellow light emitting layer YEML below the yellow light emitting layer YEML, and the electron transport layer ETL in direct contact with the yellow light emitting layer YEML above the yellow light emitting layer YEML. The second light emitting unit EU2 may further include the hole transport layer HTL between the positive charge generation layer pCGL of the first charge generation layer CGL1 and the red light emitting layer REML, and may further include the electron transport layer ETL between the yellow light emitting layer YEML and the negative charge generation layer nCGL of the second charge generation layer CGL2.

Figure 35:
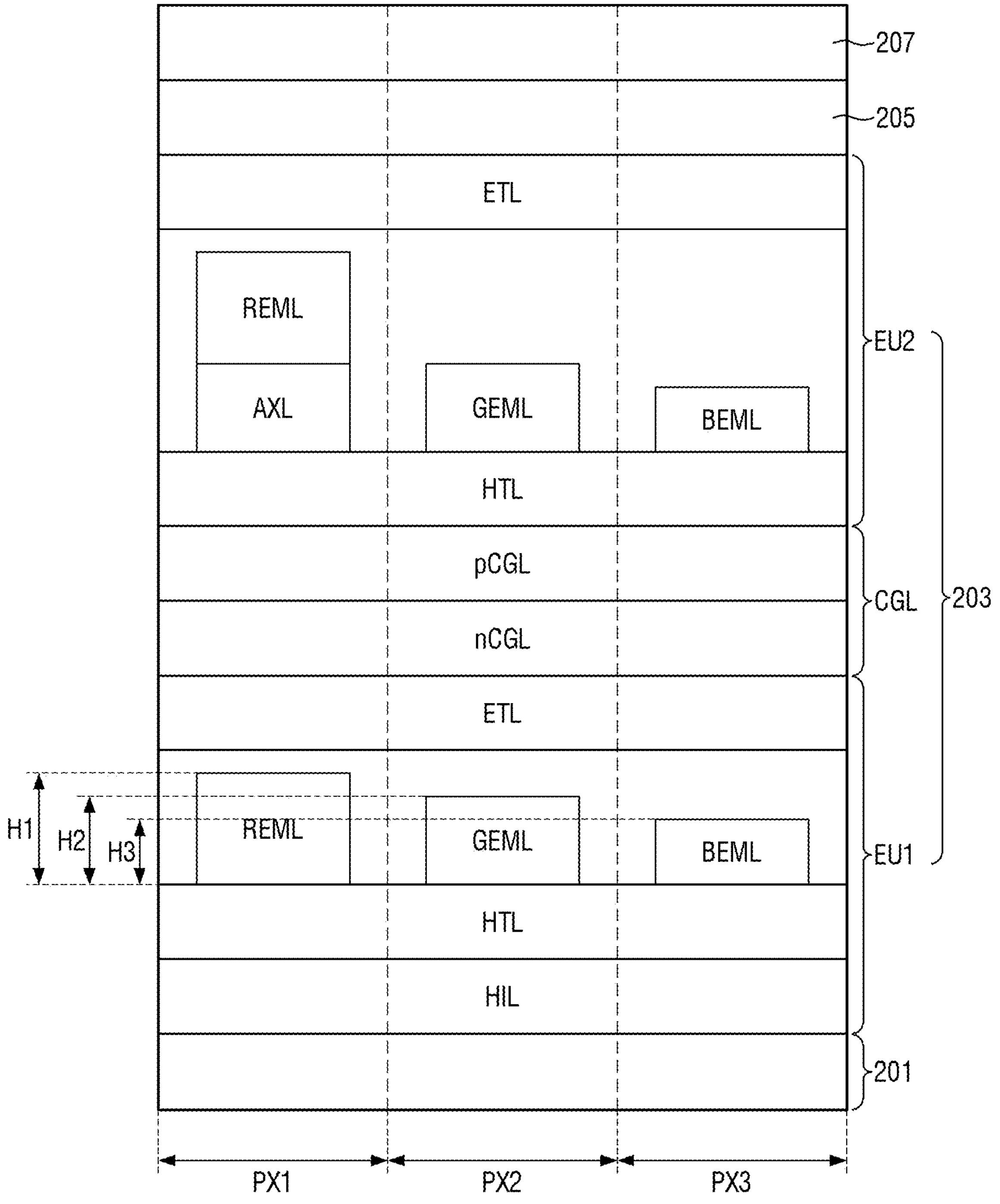
FIG. 35 is a cross-sectional view illustrating a structure of a pixel of a display device according to one or more embodiments.

FIG. 35 is a cross-sectional view illustrating a structure of a pixel of a display device according to one or more embodiments.

Referring to FIG. 35, the display panel 100 of the display device 10 may include a plurality of pixels (e.g., the sub-pixels described above). The plurality of pixels may include the first pixel PX1, the second pixel PX2, and the third pixel PX3. Each of the first pixel PX1, the second pixel PX2, and the third pixel PX3 may include the pixel electrode 201, the common electrode 205, and the intermediate layer 203. In one or more embodiments, the first pixel PX1 may be a red pixel, the second pixel PX2 may be a green pixel, and the third pixel PX3 may be a blue pixel.

The pixel electrode 201 may be independently provided in each of the first pixel PX1, the second pixel PX2, and the third pixel PX3.

The intermediate layer 203 of each of the first pixel PX1, the second pixel PX2, and the third pixel PX3 may include the first light emitting unit EU1 and the second light emitting unit EU2 that are sequentially stacked, and the charge generation layer CGL between the first light emitting unit EU1 and the second light emitting unit EU2. The charge generation layer CGL may include the negative charge generation layer nCGL and the positive charge generation layer pCGL. The charge generation layer CGL may be a common layer continuously formed in the first pixel PX1, the second pixel PX2, and the third pixel PX3.

The first light emitting unit EU1 of the first pixel PX1 may include the hole injection layer HIL, the hole transport layer HTL, the red light emitting layer REML, and the electron transport layer ETL that are sequentially stacked on the pixel electrode 201. The first light emitting unit EU1 of the second pixel PX2 may include the hole injection layer HIL, the hole transport layer HTL, the green light emitting layer GEML, and the electron transport layer ETL that are sequentially stacked on the pixel electrode 201. The first light emitting unit EU1 of the third pixel PX3 may include the hole injection layer HIL, the hole transport layer HTL, the blue light emitting layer BEML, and the electron transport layer ETL that are sequentially stacked on the pixel electrode 201. Each of the hole injection layer HIL, the hole transport layer HTL, and the electron transport layer ETL of the first light emitting unit EU1 may be a common layer continuously formed in the first pixel PX1, the second pixel PX2, and the third pixel PX3.

The second light emitting unit EU2 of the first pixel PX1 may include the hole transport layer HTL, an auxiliary layer AXL, the red light emitting layer REML, and the electron transport layer ETL that are sequentially stacked on the charge generation layer CGL. The second light emitting unit EU2 of the second pixel PX2 may include the hole transport layer HTL, the green light emitting layer GEML, and the electron transport layer ETL that are sequentially stacked on the charge generation layer CGL. The second light emitting unit EU2 of the third pixel PX3 may include the hole transport layer HTL, the blue light emitting layer BEML, and the electron transport layer ETL that are sequentially stacked on the charge generation layer CGL. Each of the hole transport layer HTL and the electron transport layer ETL of the second light emitting unit EU2 may be a common layer continuously formed in the first pixel PX1, the second pixel PX2, and the third pixel PX3. In one or more embodiments, at least one of a hole blocking layer or a buffer layer may be further included between the light emitting layer and the electron transport layer ETL in the second light emitting unit EU2 of the first pixel PX1, the second pixel PX2, and the third pixel PX3.

A thickness H1 of the red light emitting layer REML, a thickness H2 of the green light emitting layer GEML, and a thickness H3 of the blue light emitting layer BEML may be determined according to the resonance distance. The auxiliary layer AXL may be a layer added to adjust the resonance distance, and may include a resonance auxiliary material. For example, the auxiliary layer AXL may include the same material as the hole transport layer HTL.

In FIG. 35, the auxiliary layer AXL may be disposed only in the first pixel PX1, but the present disclosure is not limited thereto. For example, the auxiliary layer AXL may be disposed in at least one of the first pixel PX1, the second pixel PX2, or the third pixel PX3 to adjust the resonance distance of each of the first pixel PX1, the second pixel PX2, and the third pixel PX3.

The display panel of the display device 1 may further include a capping layer 207 disposed outside the common electrode 205. The capping layer 207 may serve to improve luminous efficiency by the principle of constructive interference. Accordingly, the light extraction efficiency of the light emitting element LEL (e.g., an organic light emitting diode) may be increased, so that the luminous efficiency of the light emitting element LEL (e.g., an organic light emitting diode) may be improved.

Figure 36:
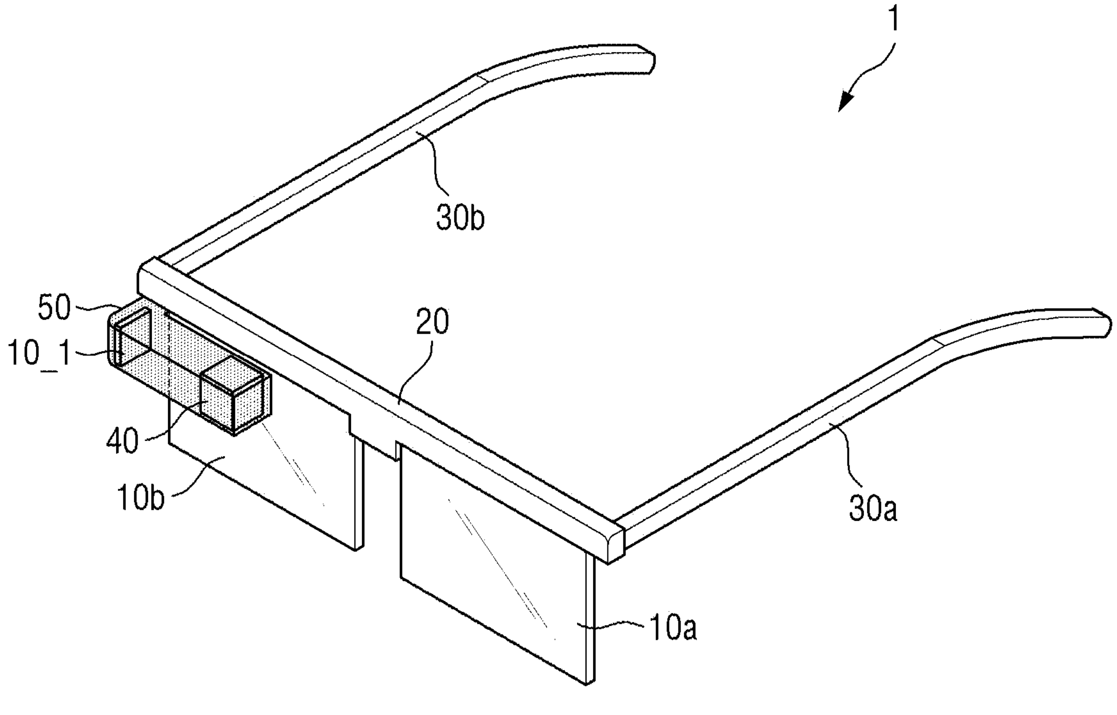
FIG. 36 is a diagram illustrating a virtual reality device including a display device according to one or more embodiments.

FIG. 36 is an example diagram illustrating a virtual reality device including a display device according to one or more embodiments. FIG. 36 illustrates a virtual reality device 1 to which a display device 10_1 according to one or more embodiments is applied. Here, the display device 10_1 may be, for example, a display device including the components of FIGS. 1 to 35 described above.

Referring to FIG. 36, the virtual reality device 1 according to one or more embodiments may be a glass-type device. The virtual reality device 1 according to one or more embodiments may include the display device 10_1, a left lens 10*a*, a right lens 10*b*, a support frame 20, temples 30*a* and 30*b*, a reflection member 40, and a display device housing 50.

Although FIG. 36 illustrates the virtual reality device 1 including the temples 30*a* and 30*b*, the virtual reality device 1 according to one or more embodiments may be applied to a head mounted display including a head mounted band that may be worn on a head, instead of the temples 30*a* and 30*b*. That is, the virtual reality device 1 according to one or more embodiments is not limited to that shown in FIG. 36, and may be applied in various forms to various electronic devices.

The display device housing 50 may include the display device 10_1 and the reflection member 40. The image displayed on the display device 10_1 may be reflected by the reflection member 40 and provided to a user's right eye through the right lens 10*b*. Accordingly, the user can view the virtual reality image displayed on the display device 10_1 through the right eye.

FIG. 36 illustrates that the display device housing 50 is disposed at the right end of the support frame 20, but the present disclosure is not limited thereto. For example, the display device housing 50 may be disposed at the left end of the support frame 20, and in this case, the image displayed on the display device 10_1 may be reflected by the reflection member 40 and provided to a user's left eye through the left lens 10*a*. Accordingly, the user can view the virtual reality image displayed on the display device 10_1 through the left eye. Alternatively, the display device housing 50 may be disposed at both the left end and the right end of the support frame 20. In that case, the user can view the virtual reality image displayed on the display device 10_1 through both the left eye and the right eye.

Figure 37:
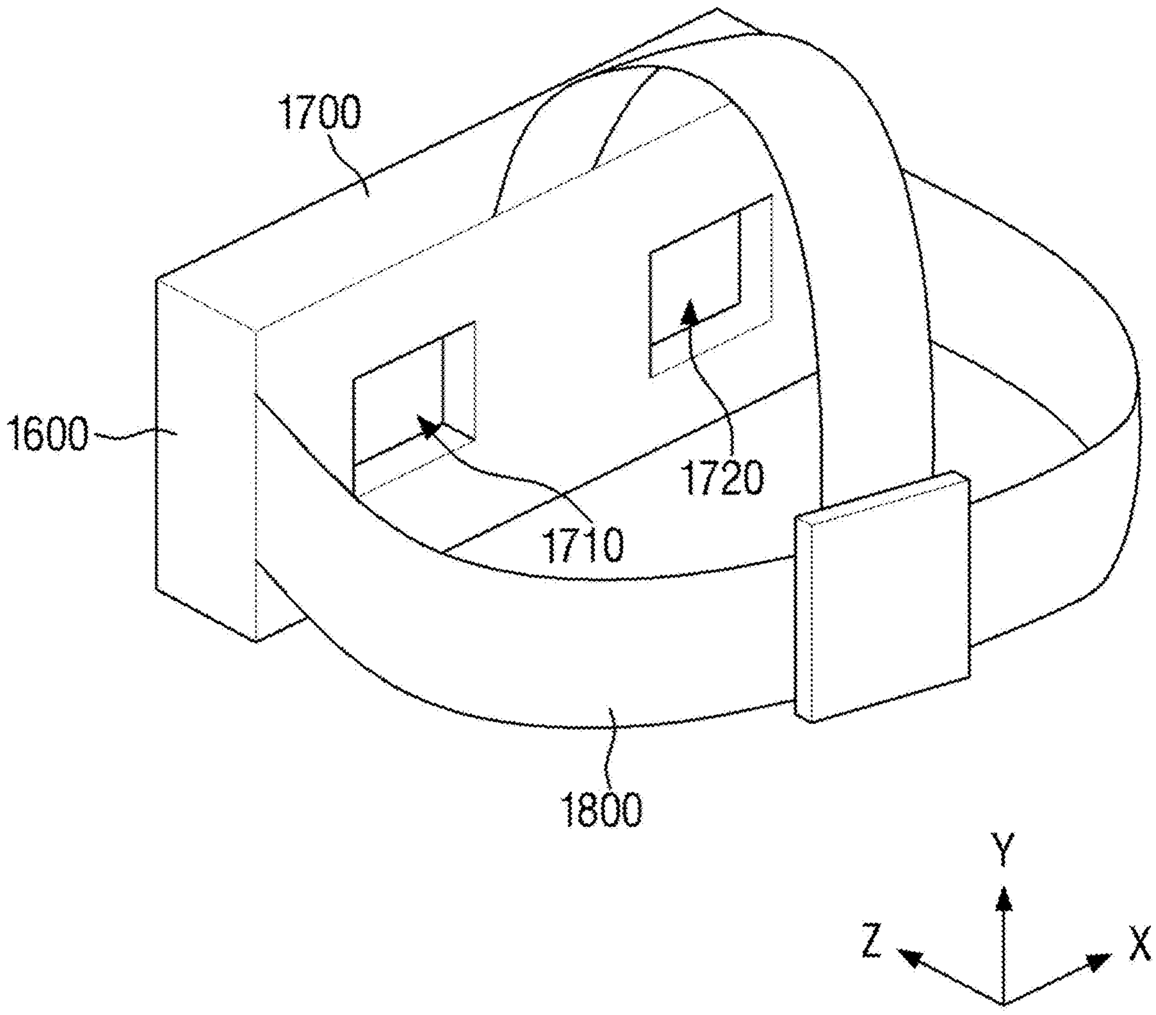
FIGS. 37 and 38 are example views illustrating a head mounted display device to which a display device according to one or more embodiments is applied.
Figure 38:
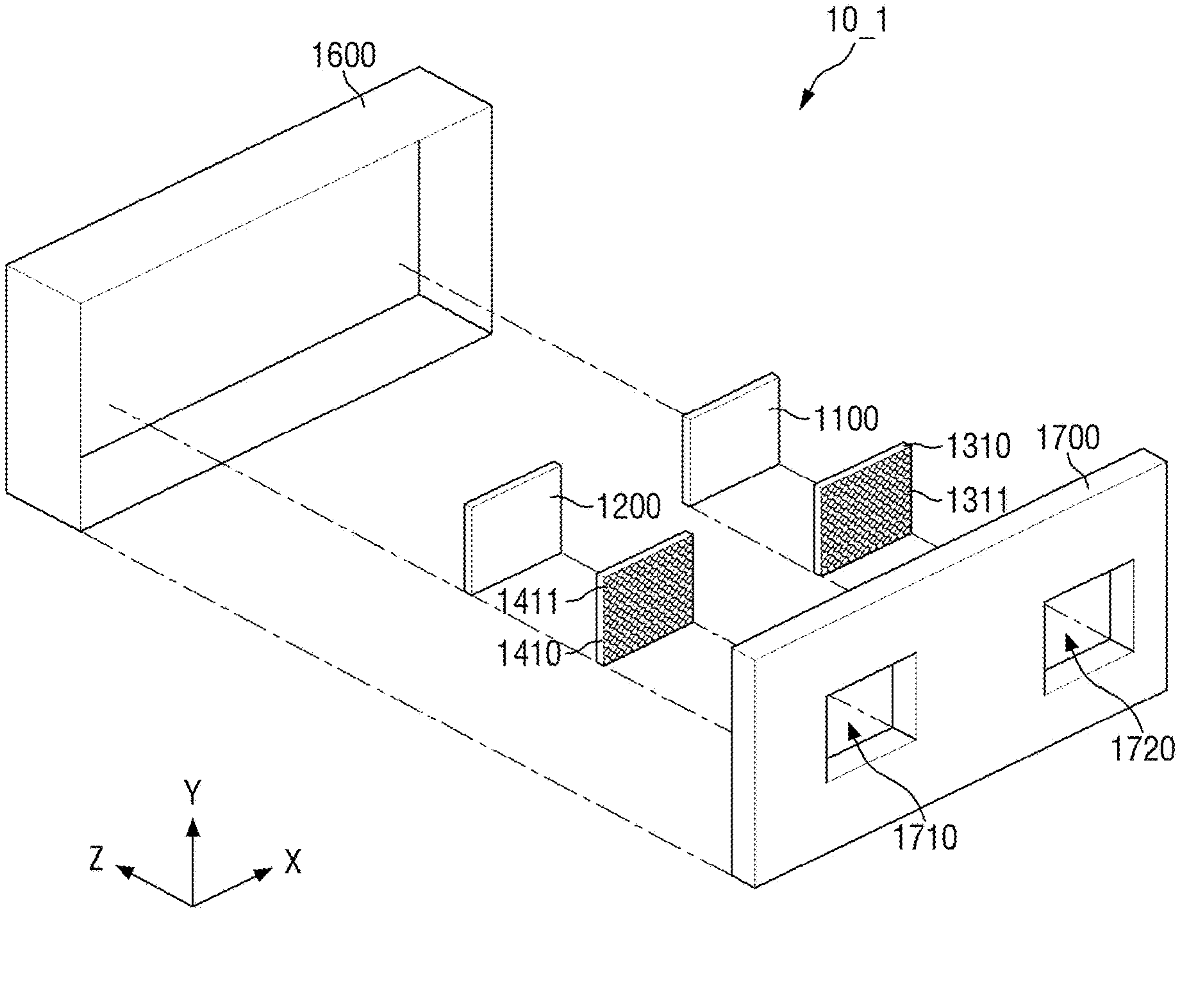

FIGS. 37 and 38 are example views illustrating a head mounted display device to which a display device according to one or more embodiments is applied.

Referring to FIGS. 37 and 38, the display device 10-1 (of FIG. 36) according to one embodiment may be applied to a head mounted display. A first display device 1100 provides an image to the user's right eye, and a second display device 1200 provides an image to the user's left eye.

A first lens array 1310 may be disposed between the first display device 1100 and a housing cover 1700. The first lens array 1310 may include a plurality of lenses 1311. The plurality of lenses 1311 may be formed as convex lenses that are convex in the direction toward the housing cover 1700.

A second lens array 1410 may be disposed between the second display device 1200 and the housing cover 1700. The second lens array 1410 may include a plurality of lenses 1411. The plurality of lenses 1411 may be formed as convex lenses that are convex in the direction toward the housing cover 1700.

A display panel housing 1600 serves to accommodate the first display device 1100, the second display device 1200, the first lens array 1310, and the second lens array 1410. One surface of the display panel housing 1600 may be opened to accommodate the first display device 1100, the second display device 1200, the first lens array 1310, and the second lens array 1410.

The housing cover 1700 is disposed to cover the opened surface of the display panel housing 1600. The housing cover 1700 may include a first opening 1710 where the user's left eye is positioned and a second opening 1720 where the user's right eye is positioned. FIGS. 37 and 38 illustrate that the first opening 1710 and the second opening 1720 are formed in a rectangular shape, but the present disclosure is not limited thereto. The first opening 1710 and the second opening 1720 may be formed in a circular shape or an elliptical shape. Alternatively, the first opening 1710 and the second opening 1720 may be combined to be formed as one opening.

The second opening 1720 may be aligned with the first display device 1100 and the first lens array 1310, and the first opening 1710 may be aligned with the second display device 1200 and the second lens array 1410. Accordingly, the user may view an image of the first display device 1100, which is a virtual image enlarged by the first lens array 1310, through the second opening 1720, and an image of the second display device 1200, which is a virtual image enlarged by the second lens array 1410, through the first opening 1710.

A head mounting band 1800 functions to fix the display panel housing 1600 to the user's head so that the first opening 1710 and the second opening 1720 of the housing cover 1700 are positioned above the user's left and right eyes, respectively. The head mounting band 1800 may be connected to the top, left and right surfaces of the display panel housing 1600.

What is claimed is:

1. A display device comprising:
a data line;
a driving transistor connected to the data line through a first node;
a pixel electrode connected to the driving transistor;
a switching transistor connected between the data line and the first node; and
an initialization transistor connected between the data line and the pixel electrode,
wherein one of a source electrode or a drain electrode of the initialization transistor is directly connected to the data line,
wherein an other one of the source electrode or the drain electrode of the initialization transistor is directly connected to the pixel electrode, and
wherein the switching transistor and the initialization transistor are configured to be concurrently turned on with each other during an initialization period.

2. The display device of claim 1, further comprising a gate line connected to a gate electrode of the initialization transistor.

3. The display device of claim 1, wherein the data line is configured to transmit an initialization voltage in the initialization period, and is configured to transmit a data voltage in a data writing period.

4. The display device of claim 3, wherein the initialization transistor is turned on during the initialization period.

5. The display device of claim 4, wherein the data line is configured to transmit the initialization voltage in a threshold voltage detection period, and
wherein the initialization transistor is turned on during the threshold voltage detection period.

6. The display device of claim 5, wherein the threshold voltage detection period is located between the initialization period and the data writing period.

7. The display device of claim 5, wherein in a period other than the initialization period and the threshold voltage detection period, the initialization transistor is turned off.

8. The display device of claim 7, wherein a gate signal applied to a gate electrode of the initialization transistor has an active level in the initialization period and the threshold voltage detection period, and
has a non-active level in a period other than the initialization period and the threshold voltage detection period.

9. The display device of claim 1, wherein the driving transistor is a dual gate transistor.

10. A display device comprising:
a data line;
a driving transistor connected to the data line through a first node;
a pixel electrode connected to the driving transistor;
an initialization transistor connected between the data line and the pixel electrode;
a first capacitor connected between the first node and a driving voltage line;
a switching transistor connected between the data line and the first node; and
a second capacitor connected between the switching transistor and the first node,
wherein one of a source electrode or a drain electrode of the initialization transistor is directly connected to the data line, and
wherein an other one of the source electrode or the drain electrode of the initialization transistor is directly connected to the pixel electrode.

11. The display device of claim 10, further comprising:
a compensation transistor connected between the first node and a second node connected to the driving transistor; and
an emission control transistor connected between the second node and the pixel electrode.

12. The display device of claim 11, wherein a gate electrode of the driving transistor is connected to the first node,
wherein one of a source electrode or a drain electrode of the driving transistor is connected to the driving voltage line, and
wherein an other one of the source electrode or the drain electrode of the driving transistor is connected to the second node.

13. The display device of claim 11, wherein at least one of the driving transistor, the initialization transistor, the switching transistor, the compensation transistor, or the emission control transistor is a P-type metal-oxide-semiconductor field effect transistor.

14. The display device of claim 12, further comprising:
a first gate line connected to a gate electrode of the switching transistor;
a second gate line connected to a gate electrode of the compensation transistor;
a third gate line connected to the gate electrode of the initialization transistor; and
an emission control line connected to a gate electrode of the emission control transistor.

15. The display device of claim 14, wherein in an initialization period, each of a first gate signal of the first gate line, a second gate signal of the second gate line, a third gate signal of the third gate line, and an emission control signal of the emission control line has an active level,
wherein in a threshold voltage detection period after the initialization period, each of the first gate signal, the second gate signal, and the third gate signal has the active level,
wherein in a data writing period after the threshold voltage detection period, the first gate signal has the active level,
wherein in an emission period after the data writing period, the emission control signal has the active level,
wherein in the initialization period and the threshold voltage detection period, an initialization voltage is applied to the data line, and
wherein in the data writing period, a data voltage is applied to the data line.

16. The display device of claim 14, wherein the second gate line and the third gate line are connected to each other.

17. The display device of claim 15, wherein in the threshold voltage detection period, the emission control signal has a non-active level,
wherein in the data writing period, each of the second gate signal, the third gate signal, and the emission control signal has the non-active level, and
wherein in the emission period, each of the first gate signal, the second gate signal, and the third gate signal has the non-active level.

18. The display device of claim 15, wherein the initialization period, the threshold voltage detection period, and the data writing period are comprised in a one horizontal period.

19. The display device of claim 15, wherein the second gate signal and the third gate signal are substantially similar to each other.

20. The display device of claim 15, wherein at least one of the second gate signal or the third gate signal has at least two discontinuous active levels in the initialization period.

21. The display device of claim 15, wherein the initialization period comprises at least two sub-periods, and
wherein at least one of the second gate signal or the third gate signal has the active level and a non-active level in adjacent sub-periods, respectively.

22. A method for driving a display device comprising:
a driving transistor having a gate electrode connected to a first node, a source electrode connected to a driving voltage line, and a drain electrode connected to a second node; a switching transistor having a gate electrode connected to a first gate line, a source electrode connected to a data line, and a drain electrode connected to the first node; a compensation transistor comprising a gate electrode connected to a second gate line, a source electrode connected to the first node, and a drain electrode connected to the second node; an initialization transistor having a gate electrode connected to a third gate line, a drain electrode connected to the data line, and a source electrode connected to a pixel electrode; an emission control transistor having a gate electrode connected to an emission control line, a source electrode connected to the second node, and a drain electrode connected to the pixel electrode; a first capacitor connected between the first node and a source electrode of the driving transistor; and a second capacitor connected between the drain electrode of the switching transistor and the first node, the method comprising:
in an initialization period, applying an initialization voltage to the data line, applying a first gate signal of an active level to the first gate line, applying a second gate signal of the active level to the second gate line, applying a third gate signal of the active level to the third gate line, and applying an emission control signal of the active level to the emission control line.

23. The method of claim 22, further comprising:
in a threshold voltage detection period after the initialization period, applying the initialization voltage to the data line, applying the first gate signal of the active level to the first gate line, applying the second gate signal of the active level to the second gate line, and applying the third gate signal of the active level to the third gate line;
in a data writing period after the threshold voltage detection period, applying a data voltage to the data line, and applying the first gate signal of the active level to the first gate line; and
in an emission period after the data writing period, applying the initialization voltage to the data line, and applying the emission control signal of the active level to the emission control line.

* * * * *